United States Patent
Chang et al.

(10) Patent No.: US 12,451,911 B2
(45) Date of Patent: Oct. 21, 2025

(54) WIRELESS COMMUNICATIONS SYSTEM, POWER SUPPLY SYSTEM, AND TERMINAL DEVICE

(71) Applicant: HUAWEI TECHNOLOGIES CO., LTD., Shenzhen (CN)

(72) Inventors: Hsiang Hui Chang, Shenzhen (CN); Daiping Tang, Shanghai (CN); Feiyang Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 694 days.

(21) Appl. No.: 17/789,011

(22) PCT Filed: Dec. 25, 2020

(86) PCT No.: PCT/CN2020/139220
§ 371 (c)(1),
(2) Date: Jun. 24, 2022

(87) PCT Pub. No.: WO2021/129781
PCT Pub. Date: Jul. 1, 2021

(65) Prior Publication Data
US 2023/0027340 A1   Jan. 26, 2023

(30) Foreign Application Priority Data
Dec. 26, 2019  (CN) .......................... 201911367567.1

(51) Int. Cl.
*H03F 1/06* (2006.01)
*H03F 3/68* (2006.01)
(Continued)

(52) U.S. Cl.
CPC ............. *H04B 1/0458* (2013.01); *H03F 1/06* (2013.01); *H03F 3/68* (2013.01); *H04B 1/0475* (2013.01);
(Continued)

(58) Field of Classification Search
CPC ...... H04B 1/0458; H04B 1/0475; H04B 1/40; H04B 2001/0408; H04B 1/04;
(Continued)

(56) References Cited

U.S. PATENT DOCUMENTS 9,685,864 B2    6/2017  Lerdworatawee et al.
11,031,994 B2*  6/2021  Ashworth .......... H04B 7/15535
(Continued)

FOREIGN PATENT DOCUMENTS

CN    103430603 A    12/2013
CN    105703716 A    6/2016
(Continued)

OTHER PUBLICATIONS

Yazhou Wang et al., "Hysteresis Current Control for Multilevel Converter in Parallel-Form Switch-Linear Hybrid Envelope Tracking Power Supply," IEEE Transactions on Power Electronics, vol. 34, No. 2, Feb. 2019; pp. 1950-1959.

*Primary Examiner* — Marcos Batista
(74) *Attorney, Agent, or Firm* — Rimon PC

(57) ABSTRACT

A power supply circuit in a wireless communications system includes an envelope tracking modulator coupled to a first power amplifier circuit and a second power amplifier circuit, so that the power supply circuit supplies power to the first power amplifier circuit and the second power amplifier circuit. When a transmit signal output by a processor is within a first bandwidth range, the power supply circuit supplies power to the first power amplifier circuit, and the first power amplifier circuit amplifies power of the transmit signal. When the transmit signal output by the processor meets a second bandwidth range, the power supply circuit supplies power to the second power amplifier circuit, and the second power amplifier circuit amplifies the transmit signal.

19 Claims, 24 Drawing Sheets

(51) Int. Cl.
  *H04B 1/04*    (2006.01)
  *H04B 1/40*    (2015.01)

(52) U.S. Cl.
  CPC ....... *H04B 1/40* (2013.01); *H04B 2001/0408* (2013.01)

(58) Field of Classification Search
  CPC ....... H04B 2001/045; H03F 1/06; H03F 3/68; H03F 2200/451; H03F 3/187; H03F 3/245; H03F 1/025; H03F 1/00
  USPC .......... 455/455, 2.1, 552.1; 370/338
  See application file for complete search history.

(56)     References Cited

U.S. PATENT DOCUMENTS

2016/0164466 A1    6/2016  Briffa et al.
2016/0173031 A1*   6/2016  Langer .................... H03F 3/189
                                                    330/126
2016/0294284 A1    10/2016 Lerdworatawee et al.
2017/0006543 A1    1/2017  Khlat
2018/0123516 A1    5/2018  Kim et al.

FOREIGN PATENT DOCUMENTS

CN         105811893 A    7/2016
CN         108011724 A    5/2018
KR         20180047668 A  5/2018

\* cited by examiner

Power supply circuit 320a

Power supply circuit 320b

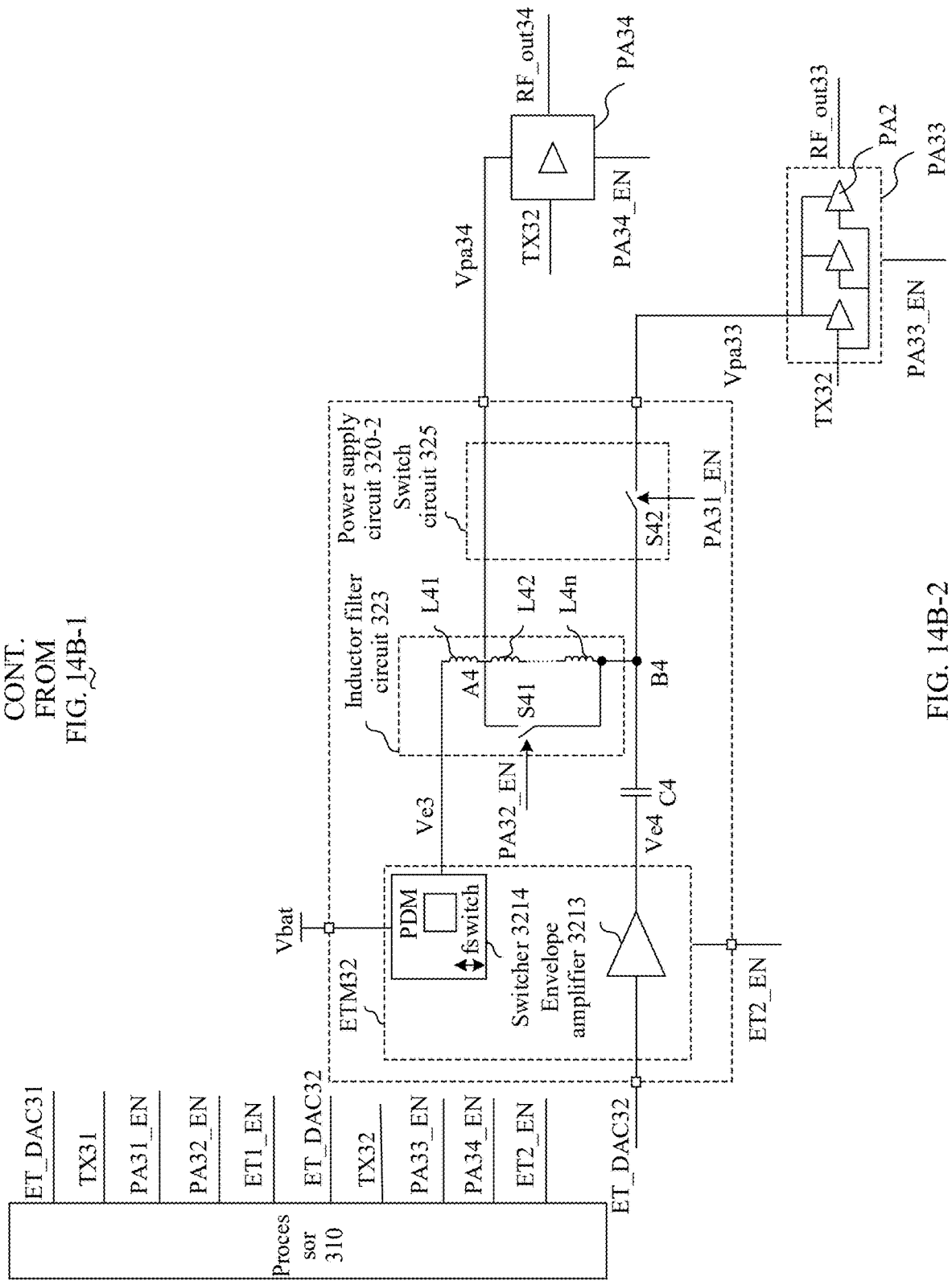

WIRELESS COMMUNICATIONS SYSTEM, POWER SUPPLY SYSTEM, AND TERMINAL DEVICE

CROSS-REFERENCE TO RELATED APPLICATIONS

This application is a national stage of International Application No. PCT/CN2020/139220, filed on Dec. 25, 2020, which claims priority to Chinese Patent Application No. 201911367567.1 filed on Dec. 26, 2019. Both of the aforementioned applications are hereby incorporated by reference in their entireties.

TECHNICAL FIELD

This application relates to the field of communications technologies, and in particular, to a wireless communications system, a power supply system, and a terminal device.

BACKGROUND

An electronic device having a mobile communications function or a wireless communications function has become more popular in the current society for providing a wireless communications service. The electronic device usually performs corresponding processing on a radio frequency (RF) signal. For example, before sending a radio frequency signal, a power amplifier (PA) needs to increase the output power of the radio frequency signal (for example, maintain sufficient energy per bit).

When transmitting a signal at a relatively high output power level, the power amplifier consumes a large amount of current, affecting an operation time or a call time of the electronic device. In addition, in an electronic device that supports a plurality of communications technologies (for example, a plurality of communications technologies such as wideband code division multiple access (WCDMA), a global system for mobile communications (GSM), a general packet radio service (GPRS), a long term evolution (LTE) technology, a wireless local area network (WLAN), and Bluetooth (BT)), a new requirement is imposed on improving the transmission efficiency of a power amplifier.

SUMMARY

This application provides a wireless communications system, a wireless communications method, a power supply system, and a terminal device, so that one envelope tracking modulator can supply power to power amplifier circuits that have different bandwidths. This can reduce the quantity of power supply circuits, effectively save the space of a printed circuit board, and help reduce costs.

To achieve the foregoing objectives, the following technical solutions are used in embodiments of this application.

According to a first aspect, an embodiment of this application provides a wireless communications system. The wireless communications system may include a power supply circuit, a first power amplifier circuit, and a second power amplifier circuit. The power supply circuit includes an envelope tracking modulator, and the envelope tracking modulator may be coupled to the first power amplifier circuit and the second power amplifier circuit, so that the power supply circuit supplies power to the first power amplifier circuit and the second power amplifier circuit that have different bandwidths. When a transmit signal meets a first bandwidth range, the power supply circuit supplies power to the first power amplifier circuit, and the first power amplifier circuit amplifies power of the transmit signal. When the transmit signal meets a second bandwidth range, the power supply circuit supplies power to the second power amplifier circuit, and the second power amplifier circuit amplifies the transmit signal.

For example, the first bandwidth range includes a bandwidth of a frequency band in a 4G technology and a bandwidth of a first part of frequency band in a 5G technology, the second bandwidth range is a bandwidth of a second part of frequency band in the 5G technology, the first part of frequency band is a frequency band on which a bandwidth in the 5G technology overlaps a bandwidth in the 4G technology, and the second part of frequency band is a frequency band on which a bandwidth in the 5G technology is greater than a bandwidth in the 4G technology.

The bandwidth supported by the first power amplifier circuit is relatively small, and the bandwidth supported by the second power amplifier circuit is relatively large. The first power amplifier circuit and the second power amplifier circuit may share one power supply circuit. This helps reduce the quantity of circuits in a wireless communications system and reduce costs, and can reduce the quantity of circuits on a printed circuit board and save the space of the printed circuit board.

With reference to the first aspect, in a possible implementation, the envelope tracking modulator receives an envelope signal, and outputs an envelope voltage. The wireless communications system may further include an inductor filter circuit. The inductor filter circuit receives the envelope voltage, and is coupled to the first power amplifier circuit and the second power amplifier circuit. The inductor filter circuit may perform filtering on noise in the envelope voltage. This improves the precision of supplying power to the first power amplifier circuit and the second power amplifier circuit.

With reference to the first aspect or the foregoing possible implementation, in another possible implementation, when the bandwidth of the transmit signal meets the first bandwidth range, the part of the inductor filter circuit that is coupled between the envelope tracking modulator and the first power amplifier circuit has a first inductance value; and when the bandwidth of the transmit signal meets the second bandwidth range, the part of the inductor filter circuit that is coupled between the envelope tracking modulator and the second power amplifier circuit has a second inductance value. The largest value in the first bandwidth range is less than the smallest value in the second bandwidth range, and the first inductance value is greater than the second inductance value. When transmit signals have different bandwidths, the wireless communications system has different requirements on efficiency and precision. To be specific, when the transmit signal has a relatively large bandwidth, the wireless communications system needs to first ensure higher efficiency, so that a requirement on precision can be reduced, and some noise is allowed; or when the transmit signal has a relatively small bandwidth, the wireless communications system needs to first ensure higher precision and lower noise, so that a requirement on efficiency can be reduced. By adjusting the inductance value of the inductor filter circuit, requirements of the wireless communications system can be met when transmit signals have different bandwidths.

With reference to the first aspect or the foregoing possible implementations, in another possible implementation, the power supply circuit further includes a switch circuit, and the switch circuit is coupled to the power supply circuit and the first power amplifier circuit. When the bandwidth of the transmit signal meets the first bandwidth range, the switch circuit controls to enable the coupling of the power supply circuit to the first power amplifier circuit, so that power is supplied to the second power amplifier circuit, and the transmit signal can be amplified. When the bandwidth of the transmit signal meets the second bandwidth range, the second power amplifier circuit amplifies the transmit signal, and the switch circuit controls to disable the coupling of the power supply circuit to the first power amplifier circuit, so that parasitic capacitance of the first power amplifier circuit can be prevented from affecting the second power amplifier circuit.

According to a second aspect, an embodiment of this application provides a wireless communications method. The wireless communications method includes: An envelope tracking modulator receives an envelope signal that is output by a processor, and the envelope tracking modulator supplies power to a first power amplifier circuit and a second power amplifier circuit. When a transmit signal that is output by the processor meets a first bandwidth range, a power supply circuit supplies power to the first power amplifier circuit, and the first power amplifier circuit amplifies power of the transmit signal. When the transmit signal that is output by the processor meets a second bandwidth range, the power supply circuit supplies power to the second power amplifier circuit, and the second power amplifier circuit amplifies the transmit signal.

According to a third aspect, an embodiment of this application provides a power supply system. The power supply system includes an envelope tracking modulator, a first output end, and a second output end. The envelope tracking modulator is coupled to the first output end and the second output end. The envelope tracking modulator is configured to separately supply power to the first output end and the second output end based on an envelope signal. The first output end outputs a first power supply voltage, and the second output end outputs a second power supply voltage.

According to a fourth aspect, an embodiment of this application provides a terminal device. The terminal device includes a housing, a battery, a baseband chip, a radio frequency circuit, a power supply circuit, a first power amplifier circuit, a second power amplifier circuit, and an antenna circuit. The baseband chip is configured to output a baseband signal and an envelope signal. The radio frequency circuit is coupled to the baseband chip. The radio frequency circuit is configured to: receive the baseband signal, and output a transmit signal. The power supply circuit is coupled to the baseband chip, the radio frequency circuit, and the battery. The power supply circuit is configured to receive the envelope signal. The power supply circuit includes an envelope tracking modulator. The envelope tracking modulator is configured to: be coupled to the first power amplifier circuit and the second power amplifier circuit, and supply power to the first power amplifier circuit and the second power amplifier circuit based on the envelope signal. The first power amplifier circuit is configured to: when a bandwidth of the transmit signal meets a first bandwidth range, amplify power of the transmit signal to output a first amplified output signal. The first amplified output signal is transmitted through the antenna circuit. The second power amplifier circuit is configured to: when the bandwidth of the transmit signal meets a second bandwidth range, amplify the power of the transmit signal to output a second amplified output signal. The second amplified output signal is transmitted through the antenna circuit.

According to a fifth aspect, an embodiment of this application provides a chip system. The chip system includes a baseband chip, a radio frequency circuit, a power supply circuit, a first power amplifier circuit, a second power amplifier circuit, and an antenna circuit. The baseband chip is configured to output a baseband signal and an envelope signal. The radio frequency circuit is coupled to the baseband chip. The radio frequency circuit is configured to: receive the baseband signal, and output a transmit signal. The power supply circuit is coupled to the baseband chip, the radio frequency circuit, and a battery. The power supply circuit is configured to receive the envelope signal. The power supply circuit includes an envelope tracking modulator. The envelope tracking modulator is configured to: be coupled to the first power amplifier circuit and the second power amplifier circuit, and supply power to the first power amplifier circuit and the second power amplifier circuit based on the envelope signal. The first power amplifier circuit is configured to: when a bandwidth of the transmit signal meets a first bandwidth range, amplify power of the transmit signal to output a first amplified output signal. The second power amplifier circuit is configured to: when the bandwidth of the transmit signal meets a second bandwidth range, amplify the power of the transmit signal to output a second amplified output signal. The antenna circuit is coupled to the first power amplifier circuit and the second power amplifier circuit to transmit the first amplified output signal and the second amplified output signal.

For beneficial effects that can be achieved by the wireless communications method, the power supply circuit, the terminal device, and the chip system, refer to the beneficial effects in the corresponding wireless communications system provided above. Details are not described herein again.

BRIEF DESCRIPTION OF DRAWINGS

FIG. 14B-1 and FIG. 14B-2 are a schematic diagram of a structure of a wireless communications system according to an embodiment of this application.

DESCRIPTION OF EMBODIMENTS

The following describes the technical solutions in embodiments of this application with reference to accompanying drawings in embodiments of this application. In embodiments of this application, a word "example", "for example", or the like is used to represent giving an example, an illustration, or a description. Exactly, use of the word "example", "for example", or the like is intended to present a related concept in a specific manner. It should be understood that, in the descriptions of embodiments of this application, "coupling" includes direct coupling or indirect coupling, and "connection" includes a direct connection or an indirect connection.

For example, a wireless communications system, a wireless communications method, a power supply system, and a terminal device provided in embodiments of this application may be applied to an electronic device such as a mobile phone, a tablet computer, a personal computer (PC), a personal digital assistant (PDA), a smartwatch, a netbook, a wearable electronic device, an augmented reality (AR) device, a virtual reality (VR) device, a vehicle-mounted device, a smart car, a smart acoustic system, a robot, or smart glasses. This is not limited in embodiments of this application.

Figure 1A:
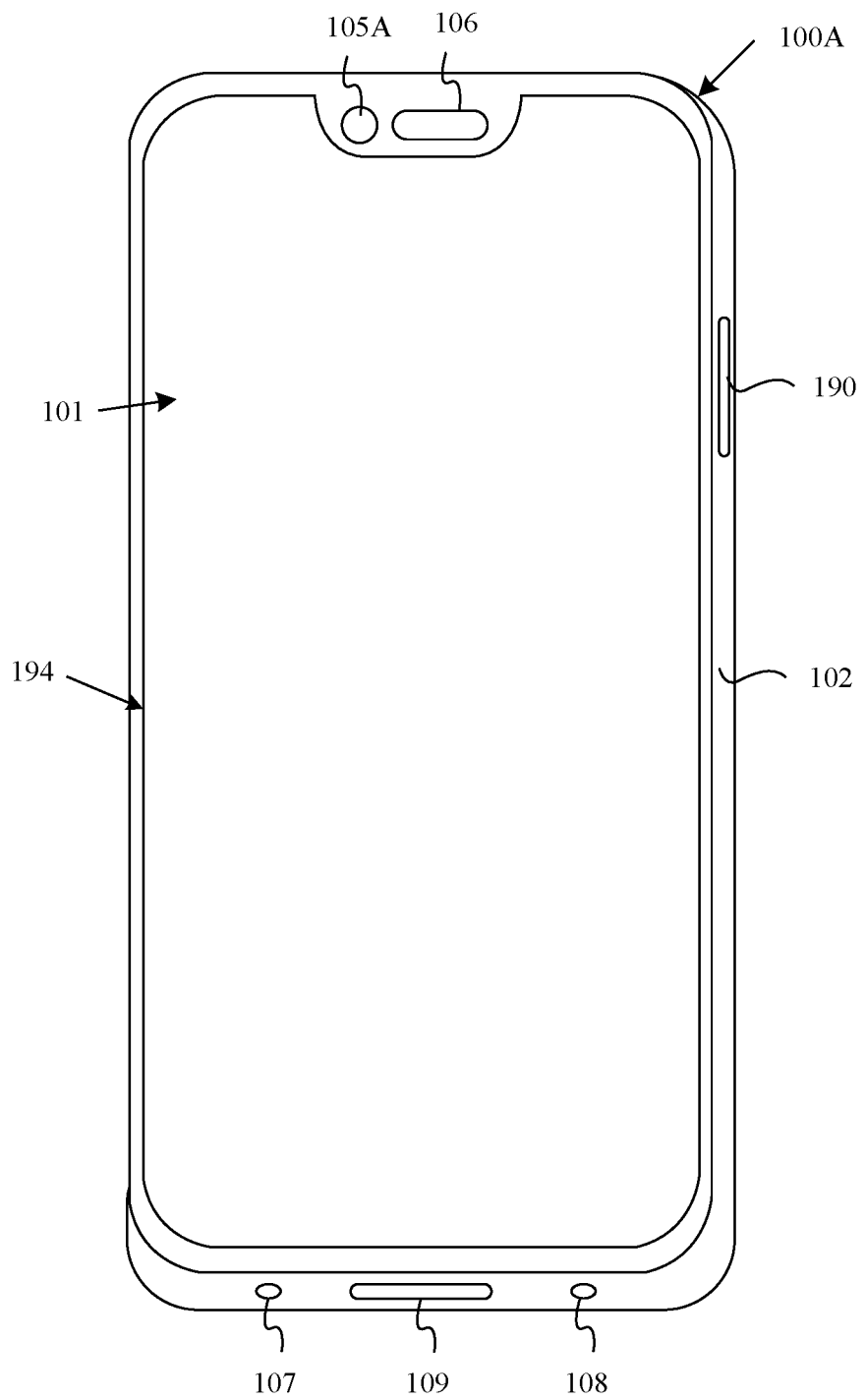
FIG. 1A to FIG. 1C are schematic diagrams of a structure of an electronic device according to an embodiment of this application.
Figure 1B:
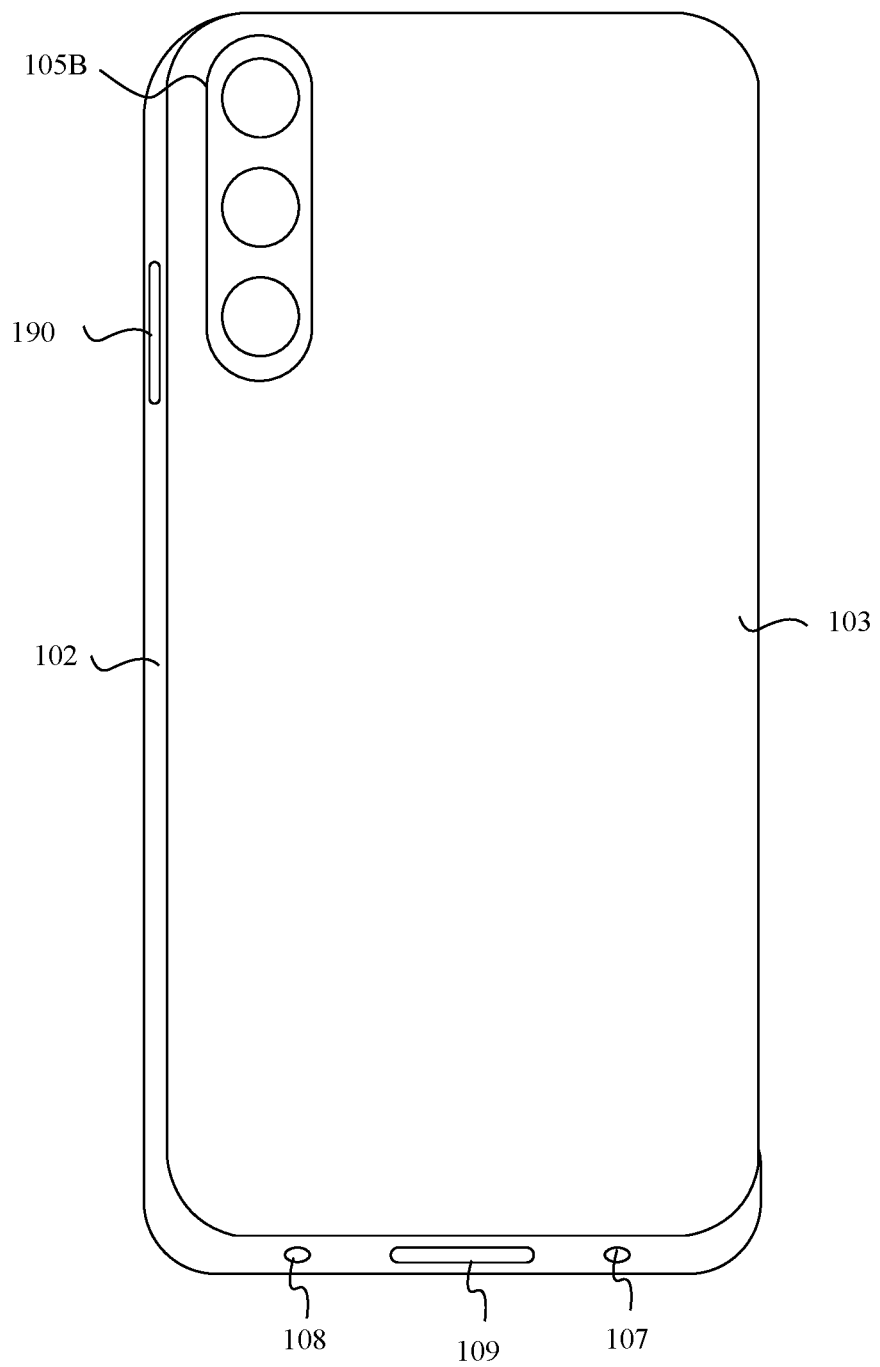
Figure 1C:
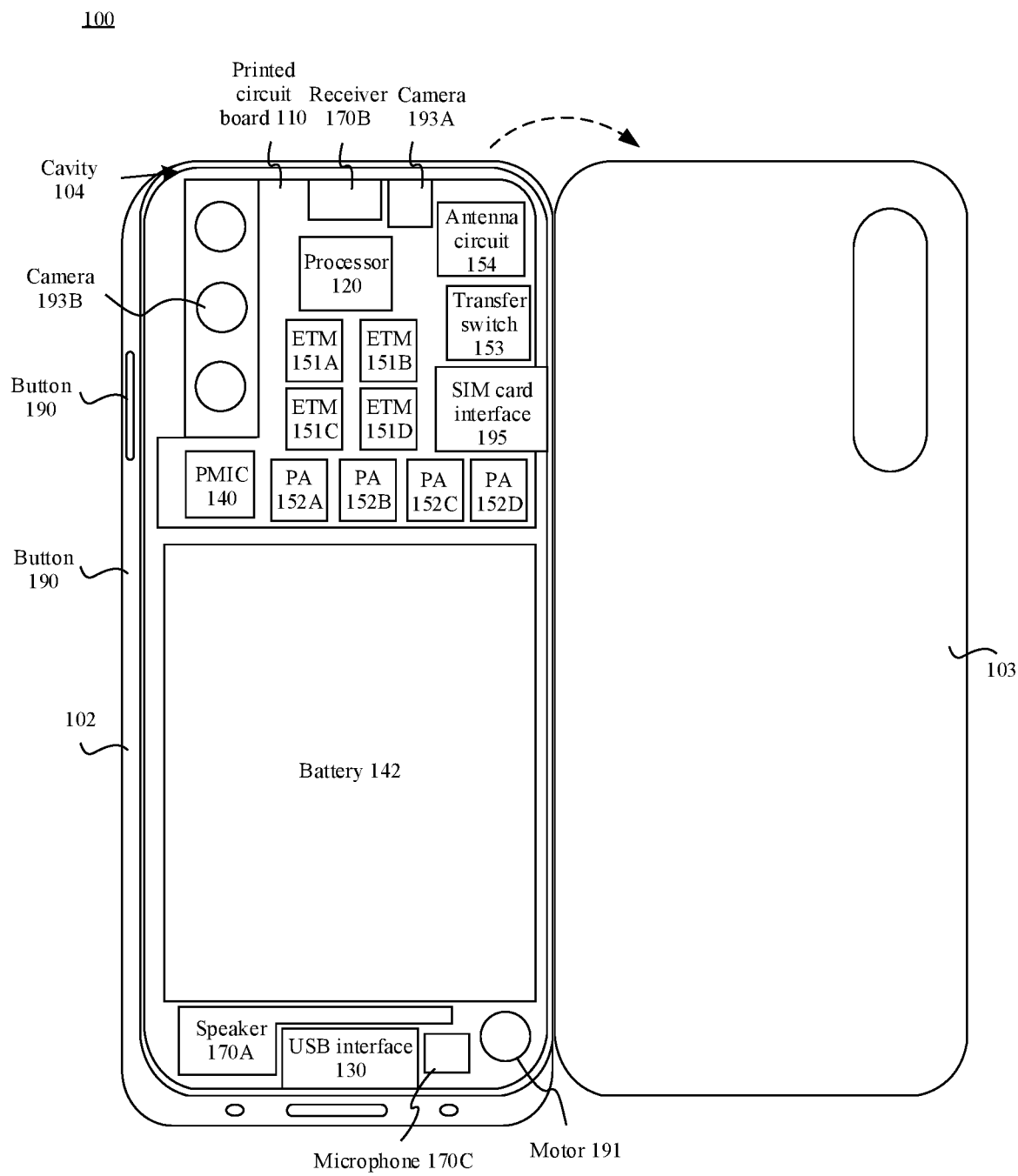

FIG. 1A to FIG. 1C are schematic diagrams of a structure of an electronic device 100. FIG. 1A is a top view of the electronic device 100 according to an embodiment. FIG. 1B is a bottom view of the electronic device 100 according to an embodiment. FIG. 1C is a top view after a rear cover of the electronic device 100 is opened, and shows specific configurations of various internal parts according to an embodiment. A dashed arrow in FIG. 1C indicates a direction in which the rear cover is opened. It may be understood that the structure shown in embodiments does not constitute a specific limitation on the electronic device 100. In some other embodiments of this application, the electronic device 100 may include more or fewer components than those shown in the figure, or combine some components, or split some components, or have different component arrangements.

As shown in FIG. 1A and FIG. 1B, the electronic device 100 may include a housing 100A. The housing 100A may include a front cover 101, a rear cover 102, and a frame 101. The front cover 101 and the rear cover 102 are disposed opposite to each other. The frame 101 surrounds the front cover 101 and the rear cover 102, and connects the front cover 101 and the rear cover 102. The front cover 101 may be a glass cover, and a display 194 is disposed below the front cover 101. The electronic device 100 may be provided with an input/output component peripherally around the housing 100A. For example, a hole 105 of a front-facing camera and a hole 106 of a receiver may be disposed on the top of the front cover 101; a button 190 may be disposed at an edge of the frame 101, and a hole 107 of a microphone, a hole 108 of a speaker, and a hole 109 of a USB interface are disposed at the bottom of the frame 101; and a hole 105B of a rear-facing camera may be disposed on the top of the rear cover 102.

The housing 100A may have a cavity, and the internal components are packaged in the cavity. As shown in FIG. 1C, the internal components may be accommodated in the cavity 104, and the internal components may include a printed circuit board (PCB) 110, a speaker 170A configured to convert an audio electrical signal into a sound signal, a receiver 170B configured to convert an audio electrical signal into a sound signal, a microphone 170C configured to convert a sound signal into an electrical signal, a USB interface 130, a camera 193A, a camera 193B, a motor 191 configured to generate a vibration prompt, and the like. The printed circuit board 110 may be provided with components such as a processor 120, a power management integrated circuit (PMIC) 140, at least one power amplifier (in an embodiment, the at least one power amplifier includes a power amplifier PA 152A, a power amplifier PA 152B, a power amplifier PA 152C, and a power amplifier PA 152D, and different power amplifiers PAs support different frequency bands and are configured to amplify transmit signals of different frequency bands. For example, the power amplifier PA 152A and the power amplifier PA 152B may be configured to amplify a transmit signal within a first bandwidth range, and the power amplifier PA 152C and the power amplifier PA 152D may be configured to amplify a transmit signal within a second bandwidth range), at least one envelope tracking modulator ETM configured to supply power to the power amplifier (in an embodiment, the at least one envelope tracking modulator includes an envelope tracking modulator ETM 151A and an envelope tracking modulator ETM 151B, and different envelope tracking modulators ETMs support different bandwidths. For example, the envelope tracking modulator ETM 151A supplies power to the power amplifier PA 152A and the power amplifier PA 152B, and the envelope tracking modulator ETM 151B supplies power to the power amplifier PA 152C and the power amplifier PA 152D), a radio circuit 160, a transfer switch 153, and an antenna 154. In addition, the printed circuit board 110 may further include components such as a filter, a low noise amplifier, an audio codec, an internal memory, a sensor, an inductor, and a capacitor. For ease of clarity in this embodiment, the filter, the low noise amplifier, the audio codec, the internal memory, the sensor, the inductor, and the capacitor are not shown in FIG. 1C. The components on the printed circuit board 110 are closely arranged, so that all the components are placed in limited space. A manner of arranging the components on the printed circuit board 110 is not limited. In some embodiments, the components on the printed circuit board 110 may be disposed on a side of the printed circuit board 110 (for example, a side facing the rear cover 102). In some embodiments, the components on the printed circuit board 110 may be disposed on two sides of the printed circuit board 110 (for example, a side facing the rear cover 102 and a side facing the front cover 101).

The processor 110 may include one or more processing units. For example, the processor 110 may include an application processor (AP), a modem processor, a graphics processing unit (GPU), an image signal processor (ISP), a neural network processing unit (NPU), a controller, a video codec, a digital signal processor (DSP), a baseband, and/or a radio frequency circuit. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

The baseband is configured to synthesize a to-be-transmitted baseband signal and/or decode a received baseband signal. Specifically, during transmission, the baseband encodes a voice signal or another data signal into a baseband signal (baseband code) for transmission; and during receiving, the baseband decodes a received baseband signal (baseband code) into a voice signal or another data signal. The baseband may include components such as an encoder, a decoder, and a baseband processor. The encoder is configured to synthesize a to-be-transmitted baseband signal, and the decoder is configured to decode a received baseband signal. The baseband processor may be a microprocessor (MCU). The baseband processor may be configured to control the encoder and the decoder. For example, the baseband processor may be configured to complete scheduling of encoding and decoding, communication between the encoder and the decoder, and peripheral driving (may send an enabling signal to a component outside the baseband to enable the component outside the baseband).

The radio frequency circuit is configured to: process a baseband signal to form a transmit (TX) signal, and transfer the transmit signal to the power amplifier PA for amplification; and/or the radio frequency circuit is configured to: process a receive (RX) signal to form a baseband signal, and send the formed baseband signal to the baseband for decoding.

The processor 110 may perform frequency modulation on a signal according to a mobile communications technology or a wireless communications technology. The mobile communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), an emerging wireless communications technology (which may also be referred to as a fifth generation mobile communications technology, 5th generation mobile network, 5th generation wireless system, 5th Generation, or 5th Generation New Radio in English, 5G, 5G technology, or 5G NR for short), or the like. The wireless communications technology may include a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like.

The processor 110 may further include at least one baseband and at least one radio frequency circuit. In some embodiments, each baseband corresponds to one radio frequency circuit, to perform frequency modulation on a signal based on one or more communications technologies. For example, a first baseband and a first radio frequency circuit perform frequency modulation on a signal according to a 5G technology, a second baseband and a second radio frequency circuit perform frequency modulation on a signal according to a 4G technology, a third baseband and a third radio frequency circuit perform frequency modulation on a signal according to a Wi-Fi technology, and a fourth baseband and a fourth radio frequency circuit perform frequency modulation on a signal according to a Bluetooth technology; or a first baseband and a first radio frequency circuit may perform frequency modulation on a signal based on both a 4G technology and a 5G technology, and a second baseband and a second radio frequency circuit perform frequency modulation on a signal based on a Wi-Fi technology. In some embodiments, one baseband may alternatively correspond to a plurality of radio frequency circuits, to improve integration.

In some embodiments, the baseband, the radio frequency circuit, and another component of the processor 110 may be integrated into one integrated circuit. In some embodiments, the baseband and the radio frequency circuit each may be an independent component independent of the processor 110. In some embodiments, one baseband and one radio frequency circuit may be integrated into a device independent of the processor 110.

In the processor 110, different processing units may be independent components, or may be integrated into one or more integrated circuits.

The antenna circuit 154 is configured to transmit and receive electromagnetic wave signals (radio frequency signals). The antenna circuit 154 may include a plurality of antennas or a plurality of groups of antennas (the plurality of groups of antennas include more than two antennas), and each antenna or the plurality of groups of antennas may be configured to cover one or more communications frequency bands. The plurality of antennas each may be one or more of a multi-band antenna, an array antenna, or an on-chip antenna.

The processor 110 is coupled to the antenna circuit 154, to implement various functions related to radio frequency signal transmission and receiving. For example, when the electronic device 100 transmits a signal, the baseband synthesizes to-be-transmitted data (a digital signal) into a to-be-transmitted baseband signal, the radio frequency circuit converts the baseband signal into a transmit signal (a radio frequency signal), the power amplifier amplifies the transmit signal, and an amplified output signal that is output by the power amplifier is transferred to the transfer switch 153 and then is transmitted through the antenna circuit 154. A path through which a transmit signal is sent by the processor 110 to the transfer switch 153 is a transmit link (or referred to as a transmit path). When the electronic device 100 needs to receive a signal, the antenna circuit 154 sends a received signal (radio frequency signal) to the transfer switch 153, the transfer switch 153 sends the radio frequency signal to the radio frequency circuit, the radio frequency circuit processes the radio frequency signal to obtain a baseband signal, and the radio frequency circuit converts the baseband signal obtained after the processing into data and then sends the data to a corresponding application processor. A path through which a radio frequency signal is sent by the transfer switch 153 to the processor 110 is a receive link (or referred to as a receive path).

The transfer switch 153 may be configured to selectively connect the antenna circuit 154 to the transmit link or the receive link electrically. In some embodiments, there may be a plurality of transfer switches 153. The transfer switch 153 may be further configured to provide additional functions, including signal filtering and/or duplexing.

A SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. Each SIM card may support one or more communications standards, and each communications standard has a specified frequency band and specifies different maximum bandwidths. The SIM card interface 195 is also compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

The PMIC 140 is configured to manage power in the electronic device 100. For example, the PMIC 140 may include a charging management circuit and a power supply management circuit. The charging management circuit is configured to receive a charging input from a charger. For example, in some embodiments of wired charging, the charging management circuit may receive a charging input of a wired charger through the USB interface 130. The power supply management circuit is configured to receive an input from a battery 142 and/or the charging management circuit, and supply power to components such as the processor 110, the display 194, the camera 193A, the camera 193B, and the motor 191. In some other embodiments, the charging management circuit and the power supply management circuit may alternatively be disposed in the processor 110. In some other embodiments, the charging management circuit and the power supply management circuit may alternatively be disposed in different components.

More functions of the electronic device 100 indicate more internal components. In some embodiments, the cavity 104 may further include a sensor such as a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, or a bone conduction sensor. However, space of the cavity 104 is limited. To package many internal components in the housing 100A, integration of the internal components needs to be improved.

With development of communications technologies, a fifth generation (5G) mobile communications system has been widely considered as a next generation wireless communications standard surpassing a current third generation (3G) communications standard (for example, WCDMA) and a fourth generation (4G) communications standard (for example, long term evolution LTE). Compared with a wireless communications system of the 3G communications standard and the 4G communications standard, the 5G wireless communications system provides a higher data rate and a lower latency. In addition, a radio frequency signal of the 5G communications system covers a wider frequency band, including a 5G low frequency band (lower than 1 GHz), a 5G medium frequency band (1 GHz to 6 GHz), and a 5G high frequency band (above 24 GHz). Different communications standards specify different frequency bands and different maximum bandwidths. For example, a maximum bandwidth specified in a 2G standard is 200 KHz (an uplink bandwidth is less than 100 KHz, and the uplink bandwidth is an uplink bandwidth allocated by an operator), a maximum bandwidth specified in the 3G standard is 10 MHz (an uplink bandwidth is less than 2 kHz), a maximum bandwidth specified in the 4G standard can reach 100 MHz (an uplink bandwidth can reach 20 MHz), and a maximum bandwidth specified in the 5G standard can reach 1 GHz to 2 GHz (an uplink bandwidth can reach more than 100 MHz). It is common that one operator may simultaneously operate communications systems of a plurality of different standards and a plurality of different communications standards may be simultaneously applied to one electronic device having a mobile communications function and/or a wireless communications function. In addition, in one communications standard, bandwidths of different frequency bands may differ greatly.

Because the electronic device 100 supports more communications types, different communications standards and different frequency bands have different requirements on internal components of the electronic device 100. Therefore, independent internal components usually need to be separately disposed for different communications standards or different frequency bands. For example, on a transmit link in the 4G technology, most scenarios are single-input scenarios (requiring single-channel transmission), a bandwidth is less than that in 5G, and each frequency band has one power amplifier. However, on a transmit link in the 5G technology, dual-channel transmission is required to support a multiple-input multiple-output (MIMO) technology, or transmit power needs to be increased to expand uplink coverage, and power consumption on the transmit link in the 5G technology is higher. To reduce power consumption of the electronic device 100, the envelope tracking modulator dynamically adjusts, based on an envelope signal, a power supply voltage for supplying power to the power amplifier, so that the power amplifier works in a saturation high-efficiency region as much as possible. This improves transmission efficiency of the power amplifier, thereby reducing the power consumption of the electronic device 100. In addition, compared with the 4G technology, the 5G technology has a wider frequency band range and a larger maximum bandwidth. Therefore, more power amplifiers and more envelope tracking modulators need to be disposed on the printed circuit board. However, because the space of the cavity 104 is limited, and components such as the battery 142 and the camera 193B already occupy a large amount of space, space left for the printed circuit board 110 is relatively small. Various components have been arranged on the printed circuit board 110. Consequently, it is difficult to accommodate more components.

According to the wireless communications system, the wireless communications method, the power supply system, and the terminal device provided in this application, fewer components can be used to support a scenario of a plurality of bandwidths, thereby saving some space on a printed circuit board. All technologies in the following embodiments may be implemented in the electronic device 100. In the following embodiments, a component or a signal having a same name as a component or a signal in the electronic device 100 may be configured as a same component or a same signal in the electronic device 100. The wireless communications system, the wireless communications method, the power supply system, and the terminal device provided in embodiments of this application are described below by using examples.

Figure 2:
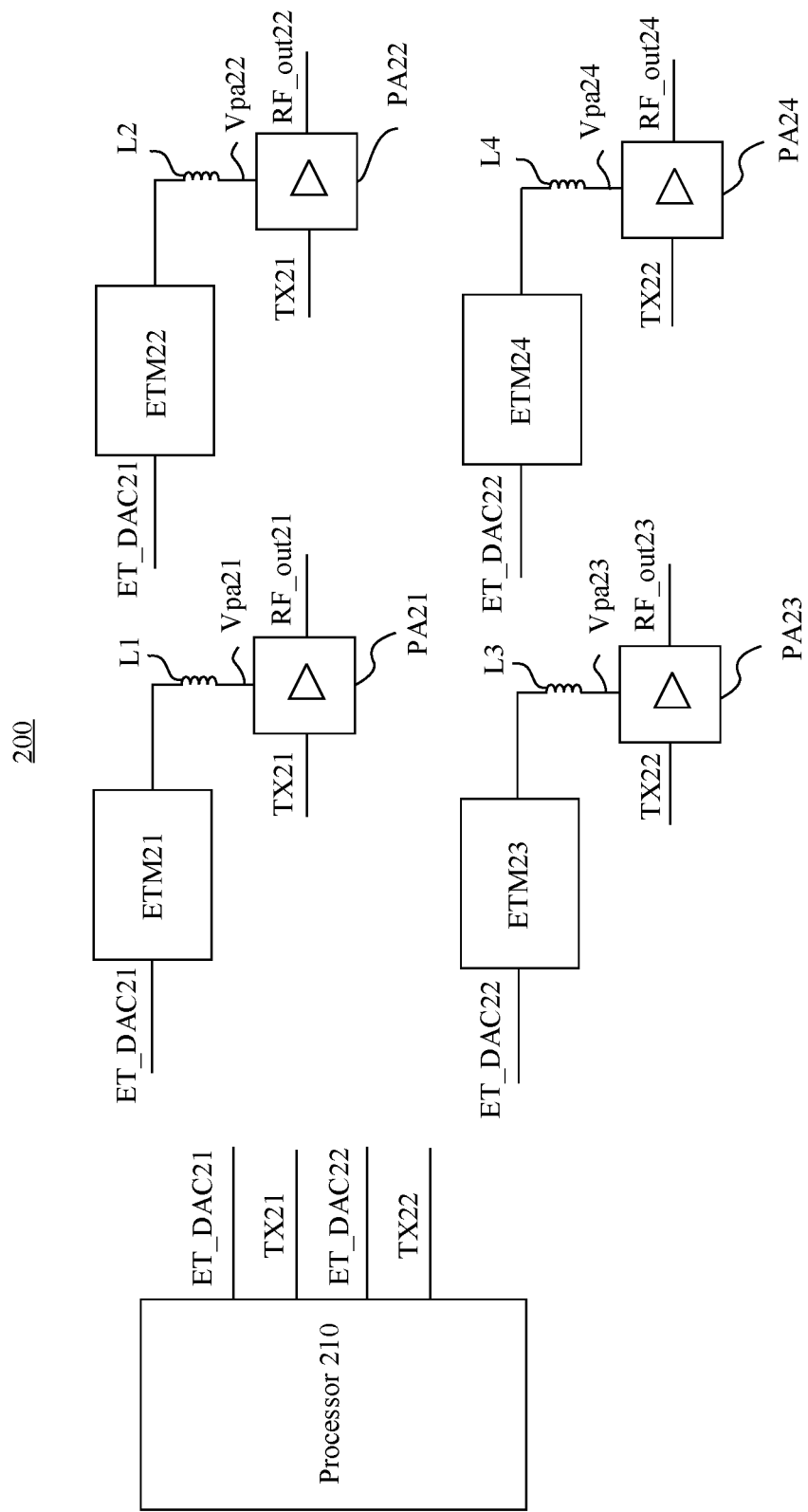
FIG. 2 is a schematic diagram of a structure of a wireless communications system according to an embodiment of this application.

FIG. 2 is a block diagram of a wireless communications system 200 having a plurality of bandwidths. The wireless communications system 200 may be applied to the electronic device 100 in FIG. 1A to FIG. 1C, to transmit a radio frequency signal. The wireless communications system 200 includes a processor 210, a power amplifier circuit PA21, a power amplifier circuit PA22, a power amplifier circuit PA23, a power amplifier circuit PA24, an envelope tracking modulator ETM21, an envelope tracking modulator ETM22, an envelope tracking modulator ETM23, and an envelope tracking modulator ETM24.

The processor 210 may be the processor 110 in FIG. 1A to FIG. 1C, or the processor 210 is a part of the processor 110. The processor 210 may be configured to perform processing (which may include encoding, modulation, conversion to analog, or the like) on to-be-transmitted data, to provide a transmit signal. The wireless communications system 200 may support a MIMO technology. The MIMO technology provides a plurality of channels. When the wireless communications system 200 has dual channels, the processor 210 may provide a transmit signal TX21 and a transmit signal TX22 based on the to-be-transmitted data. The transmit signal TX21 and the transmit signal TX22 are signals on different channels. For example, a baseband in the processor 210 may perform channel encoding to respectively generate two baseband signals, and a radio frequency circuit separately performs conversion to analog on the two baseband signals to form the transmit signal TX21 and the transmit signal TX22. Both the transmit signal TX21 and the transmit signal TX22 are radio frequency signals.

Figure 3A:
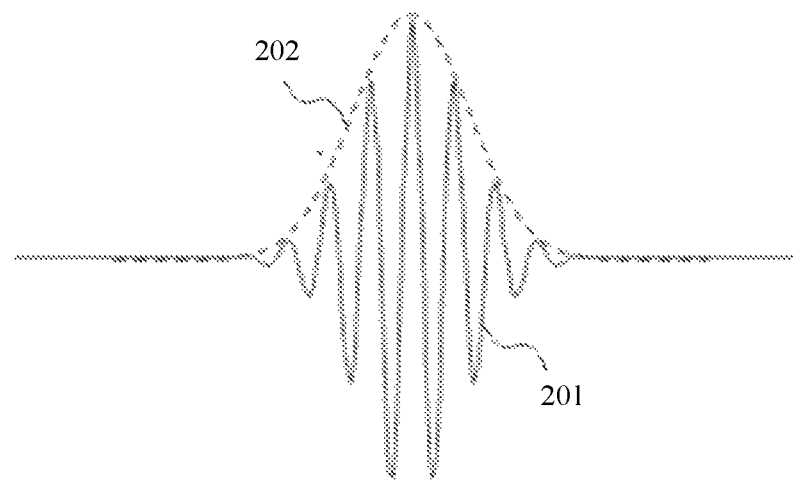
FIG. 3A is a waveform diagram of a radio frequency signal and an envelope curve of the radio frequency signal according to an embodiment of this application.

The processor 210 may further provide an envelope signal ET_DAC21 and an envelope signal ET_DAC22. As shown in FIG. 3A, a curve 201 represents a vibration curve of a radio frequency signal, a curve 202 is a curve formed by connecting highest amplitude points of the radio frequency signal at different frequencies, and the curve 202 is an envelope of the curve 201. An amplitude of the envelope signal ET_DAC21 varies with an amplitude of the transmit signal TX21. For example, when a waveform diagram of the transmit signal TX21 is shown by the curve 201, a waveform diagram of the envelope signal ET_DAC21 is shown by the curve 202. The envelope signal ET_DAC22 varies with an envelope of the transmit signal TX22. For example, when a waveform diagram of the transmit signal TX22 is shown by the curve 201, a waveform diagram of the envelope signal ET_DAC22 is shown by the curve 202.

The envelope tracking modulator ETM21 is configured to supply power to the power amplifier circuit PA21 based on the envelope signal ET_DAC21. An inductor L1 is coupled between the power amplifier circuit PA21 and the envelope tracking modulator ETM21, to provide a power supply voltage Vpa21 that is obtained after filtering. When the transmit signal TX21 meets a first bandwidth range (for example, the transmit signal TX21 is a bandwidth of a 4G frequency band), the power amplifier circuit PA21 is configured to: amplify output power of the transmit signal TX21 based on the power supply voltage Vpa21, and output a first amplified output signal RF_out21.

The envelope tracking modulator ETM22 is configured to supply power to the power amplifier circuit PA22 based on the envelope signal ET_DAC21. An inductor L2 is coupled between the power amplifier circuit PA22 and the envelope tracking modulator ETM22, to provide a power supply voltage Vpa22 that is obtained after filtering. When the transmit signal TX21 meets a second bandwidth range (for example, the transmit signal TX21 is a bandwidth specified by a frequency band n41, a frequency band n77, a frequency band n78, or a frequency band n79 in a 5G technology), the power amplifier circuit PA22 is configured to: amplify output power of the transmit signal TX21 based on the power supply voltage Vpa22, and output a second amplified output signal RF_out22.

The envelope tracking modulator ETM23 is configured to supply power to the power amplifier circuit PA23 based on the envelope signal ET_DAC22. An inductor L3 is coupled between the power amplifier circuit PA23 and the envelope tracking modulator ETM23, to provide a power supply voltage Vpa23 that is obtained after filtering. When the transmit signal TX22 meets the first bandwidth range, the power amplifier circuit PA23 is configured to: amplify output power of the transmit signal TX22 based on the power supply voltage Vpa23, and output a third amplified output signal RF_out23.

The envelope tracking modulator ETM24 is configured to supply power to the power amplifier circuit PA24 based on the envelope signal ET_DAC22. An inductor L4 is coupled between the power amplifier circuit PA24 and the envelope tracking modulator ETM24, to provide a power supply voltage Vpa24 that is obtained after filtering. When the transmit signal TX22 meets the second bandwidth range, the power amplifier circuit PA24 is configured to: amplify output power of the transmit signal TX22 based on the power supply voltage Vpa24, and output a fourth amplified output signal RF_out24.

Figure 3B:
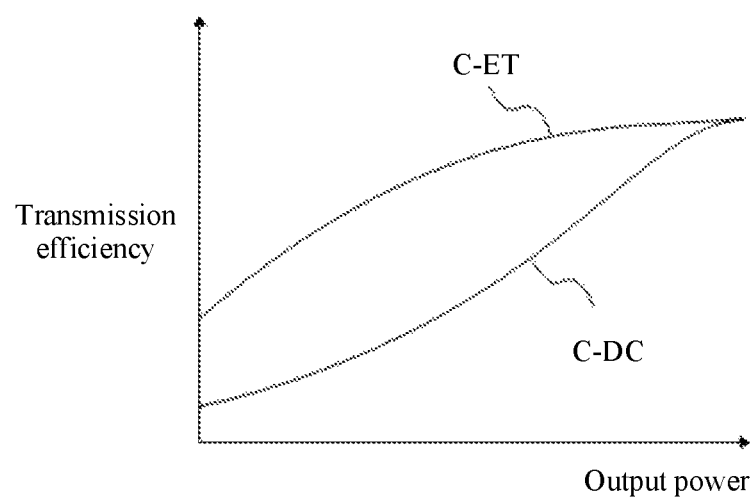
FIG. 3B is a curve diagram of transmit efficiency relative to output power according to an embodiment of this application.

By using the envelope tracking modulators shown in FIG. 2, transmission efficiency of the power amplifier can be improved. An example in which the envelope tracking modulator ETM21 supplies power to the power amplifier circuit PA21 is used below for description with reference to FIG. 3A and FIG. 3B. When a waveform diagram of the first amplified output signal RF_out21 is shown by the curve 201, a waveform diagram of the power supply voltage Vpa21 is shown by the curve 202, and the power supply voltage Vpa21 varies with an envelope of the first amplified output signal RF_out21. In FIG. 3B, a curve C-ET indicates that, when the power supply voltage Vpa21 shown in FIG. 3A is applied to supply power to the power amplifier circuit PA21, transmission efficiency of the power amplifier circuit PA21 varies with output power of the power amplifier circuit PA21. The envelope tracking modulator ETM21 may dynamically adjust the power supply voltage Vpa21 of the power amplifier circuit PA21 based on an envelope change, so that the power amplifier circuit PA21 can work in a saturation high-efficiency region. A curve C-DC indicates that, when a fixed power supply voltage is applied to supply power to the power amplifier circuit PA21, the transmission efficiency of the power amplifier circuit PA21 varies with the output power of the power amplifier circuit PA21. Compared with a case of using the fixed power supply voltage, in a case of using the power supply voltage Vpa21 that varies with the envelope, the power amplifier circuit PA21 has higher transmission efficiency. Likewise, another power amplifier circuit in FIG. 2 may also effectively improve transmission efficiency by using a power supply voltage that varies with an envelope, so that overall efficiency of the wireless communications system 200 is improved.

To support dual-channel transmission of the MIMO technology, the wireless communications system 200 provides transmit signals on two channels. In addition, when transmit signals are of different bandwidths, system indicators are greatly different, and requirements on an envelope tracking modulator are also greatly different. Therefore, for a same transmit signal, a plurality of envelope tracking modulators need to be disposed. For example, the transmit signal TX21 corresponds to the envelope tracking modulator ETM21 and the envelope tracking modulator ETM22; and the transmit signal TX22 corresponds to the envelope tracking modulator ETM23 and the envelope tracking modulator ETM24. When the transmit signal TX21 and the transmit signal TX22 each are of a small bandwidth of 4G, the power supply voltage Vpa21 and the power supply voltage Vpa23 meet a first power supply mode, to be specific, the power supply voltage Vpa21 and the power supply voltage Vpa23 have relatively small noise and relatively low efficiency. When the transmit signal TX21 and the transmit signal TX22 each are of a large bandwidth of 5G, because the large bandwidth of 5G requires the wireless communications system 200 to improve uplink coverage, power of the first amplified output signal RF_out21 and power of the third amplified output signal RF_out23 need to be relatively high, power consumption of the wireless communications system 200 is high, and therefore efficiency needs to be improved. The power supply voltage Vpa22 and the power supply voltage Vpa24 meet a second power supply mode, to be specific, efficiency of the power supply voltage Vpa21 and the power supply voltage Vpa23 is relatively high, and noise may be relatively large. The wireless communications system 200 needs four envelope tracking modulators in total, to separately supply power to transmit signals on different channels in different bandwidths. However, the four envelope tracking modulators occupy a relatively large area of a PCB. Consequently, costs are increased. To save the area of the PCB and better reduce costs, in the following, for a same transmit signal, an envelope tracking modulator may be shared in different bandwidths. The following describes in detail an embodiment in which an envelope tracking modulator can be shared.

Figure 4:
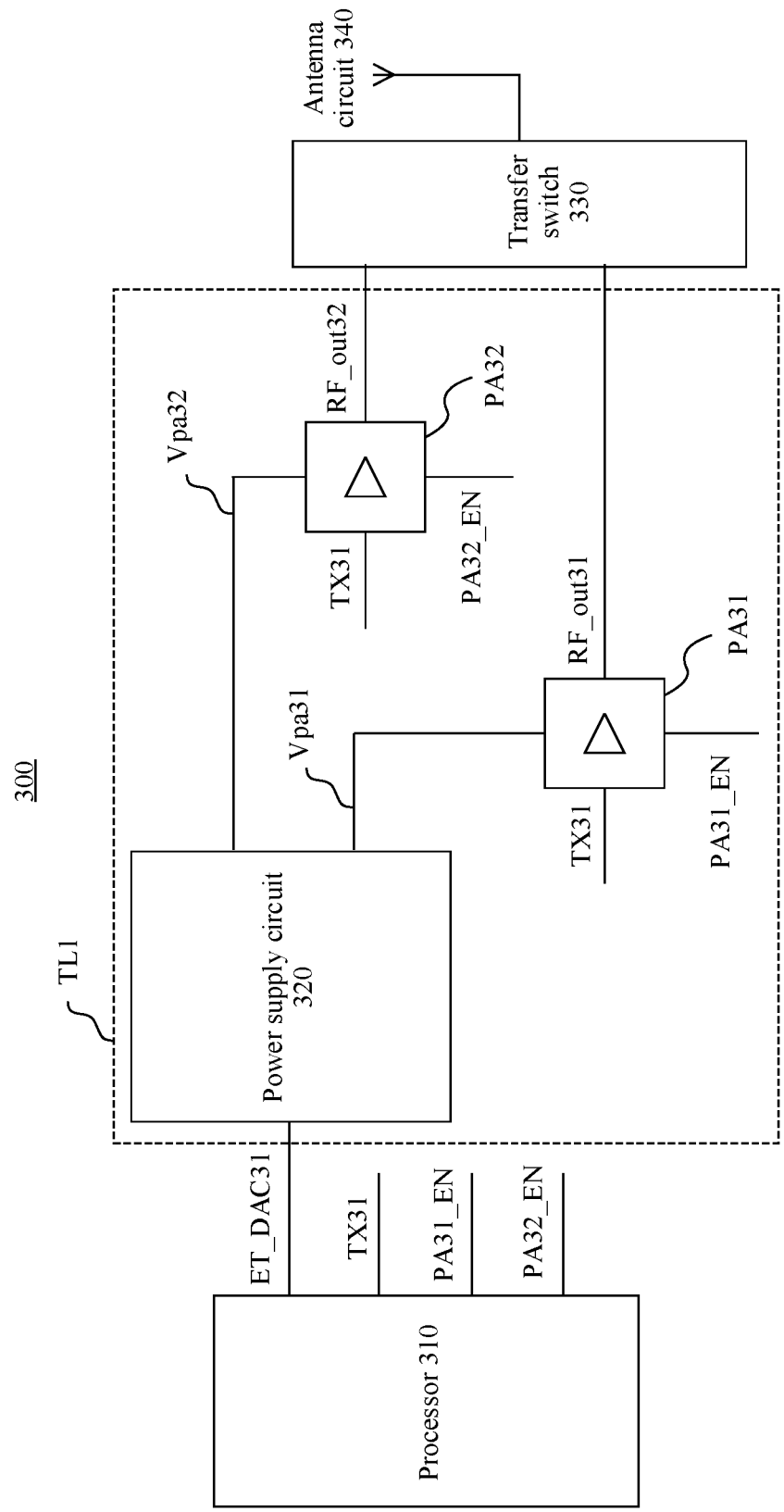
FIG. 4 is a schematic diagram of a structure of a wireless communications system according to an embodiment of this application.

FIG. 4 is a block diagram of a wireless communications system 300 having a plurality of bandwidths according to an embodiment. The wireless communications system 300 includes a processor 310, a first power amplifier circuit PA31, a second power amplifier circuit PA32, and a power supply circuit 320. The first power amplifier circuit PA31 and the second power amplifier circuit PA32 are configured to amplify a same transmit signal TX31. A transmit circuit TL1 of the transmit signal TX31 has two power amplifier circuits and one envelope tracking modulator. When the transmit signal TX31 has different bandwidths, the two power amplifier circuits separately amplify the transmit signal TX31. The transmit signal TX31 may have different bandwidths in different time periods on a same channel. When a bandwidth of the transmit signal TX31 meets a first bandwidth range, the first power amplifier circuit PA31 amplifies the transmit signal TX31. When the bandwidth of the transmit signal TX31 meets a second bandwidth range, the second power amplifier circuit PA32 amplifies the transmit signal TX31. The largest value in the first bandwidth range is less than or equal to a bandwidth value, and the smallest value in the second bandwidth range is greater than or equal to the bandwidth value. The bandwidth value may be greater than or equal to 20 MHz. For example, the bandwidth value may be 20 MHz, 30 MHz, 40 MHz, 50 MHz, 60 MHz, 70 MHz, 80 MHz, 90 MHz, 100 MHz, 150 MHz, or a higher bandwidth.

In an embodiment, the transmit signal TX31 may be a signal in a mobile communications technology, and the bandwidth value may be 60 MHz. When the transmit signal TX31 is a signal in a 4G technology, the transmit signal TX31 is amplified by the first power amplifier circuit PA31. When the transmit signal TX31 is a signal in a 5G technology, and the bandwidth of the transmit signal TX31 overlaps a bandwidth of a frequency band in the 4G technology (for example, a frequency band of the transmit signal TX31 is a frequency band n1, a frequency band n2, a frequency band n3, a frequency band n5, a frequency band n7, or a frequency band n8), the transmit signal TX31 is amplified by the first power amplifier circuit PA31. When the transmit signal TX31 is a signal in the 5G technology, and the bandwidth of the transmit signal TX31 does not overlap a bandwidth of a frequency band in the 4G technology (for example, the frequency band of the transmit signal TX31 is a frequency band below 6 GHz such as a frequency band n41, a frequency band n77, a frequency band n78, or a frequency band n79), the transmit signal TX31 is amplified by the second power amplifier circuit PA32.

In another embodiment, the transmit signal TX31 may alternatively be a signal in a Wi-Fi technology, and the bandwidth value may be 20 MHz or 30 MHz. When the transmit signal TX31 is on a 2.4G frequency band in the Wi-Fi technology, the transmit signal TX31 is amplified by the first power amplifier circuit PA31. When the transmit signal TX31 is on a 5G frequency band in the Wi-Fi technology, the transmit signal TX31 is amplified by the second power amplifier circuit PA32.

The processor 310 may be configured as the processor 110 in FIG. 1A to FIG. 1C, or the processor 210 may be configured as a part of the processor 110. The processor 310 may be configured to: receive to-be-sent data (for example, voice data of a user in a call process or request data of a user for accessing a network), perform processing (which may include encoding, modulation, conversion to analog, or the like) on the data, provide the transmit signal TX31, provide an analog envelope signal ET_DAC31, provide a first enabling signal PA31_EN of the first power amplifier circuit PA31, and provide a second enabling signal PA32_EN of the second power amplifier circuit PA32. The power supply circuit 320 is configured to provide a power supply voltage with an envelope change. The power supply circuit 320 may be configured to provide a power supply voltage Vpa31 for the first power amplifier circuit PA31 and provide a power supply voltage Vpa32 for the second power amplifier circuit PA32 based on the envelope signal ET_DAC31. Amplitudes of the power supply voltage Vpa31 and the power supply voltage Vpa32 increase as an amplitude of the envelope signal ET_DAC31 increases. This can effectively improve transmission efficiency of the first power amplifier circuit PA31 and the second power amplifier circuit PA32, thereby improving efficiency of the wireless communications system 300. In addition, for a same transmit signal TX31, the first power amplifier circuit PA31 and the second power amplifier circuit PA32 may share the power supply circuit 320. This saves space on a PCB.

A bandwidth of a first part of frequency band in the 5G technology overlaps a bandwidth of a frequency band in the 4G technology, and a bandwidth of a second part of frequency band in the 5G technology is greater than the bandwidth of the frequency band in the 4G technology. In a non-limiting example, the first power amplifier circuit PA31 may support all frequency bands in the 4G technology and the first part of frequency band in the 5G technology, and the second power amplifier circuit PA32 may support the second part of frequency band in the 5G technology. The first part of frequency band is a frequency band on which a bandwidth in the 5G technology overlaps a bandwidth in the 4G technology. For example, the first part of frequency band includes one or a combination of a plurality of frequency bands such as the frequency band n1, the frequency band n2, the frequency band n3, the frequency band n5, the frequency band n7, and the frequency band n8. A bandwidth of each frequency band in the first part of frequency band is less than the bandwidth value. The second part of frequency band is a frequency band on which a bandwidth in the 5G technology is greater than a bandwidth in the 4G technology. In some embodiments, the second part of frequency band includes one or a combination of a plurality of frequency bands in micron waves below 6 GHz such as the frequency band n41, the frequency band n77, the frequency band n78, and the frequency band n79. In some embodiments, the second part of frequency band may further include one or a combination of a plurality of frequency bands in millimeter waves such as a frequency band n257, a frequency band n258, a frequency band n260, and a frequency band n261. A bandwidth of each frequency band in the first part of frequency band is greater than the bandwidth value.

The first power amplifier circuit PA31 is configured to: when the first enabling signal PA31_EN is valid, amplify output power of the transmit signal TX31 based on the power supply voltage Vpa31, and output a first amplified output signal RF_out31. When the first enabling signal PA31_EN is low, the first power amplifier circuit PA31 may be configured to work; or when the first enabling signal PA31_EN is low, the first power amplifier circuit PA31 may be configured to work. In an embodiment, the first power amplifier circuit PA31 may include three sub power amplifiers. The three sub power amplifiers respectively support LB (low frequency, for example, 700 MHz to 1000 MHz), MB (medium frequency, for example, 1500 MHz to 2200 MHz), HB (high frequency, for example, 2300 MHz to 2700 MHz) In an implementation, the first power amplifier circuit PA31 and the second power amplifier circuit PA32 may be packaged together or independently packaged; or three sub power amplifiers in the second power amplifier circuit PA32 are independently packaged. The first power amplifier circuit PA31 and the second power amplifier circuit PA32 both may be located in the mobile communications module 150 or the wireless communications module 160 in FIG. 1A to FIG. 1C. Alternatively, one of the first power amplifier circuit PA31 and the second power amplifier circuit PA32 is located in the mobile communications module 150 in FIG. 1A to FIG. 1C, and the other is located in the wireless communications module 160.

The second power amplifier circuit PA32 is configured to: when the second enabling signal PA32_EN is valid, amplify the output power of the transmit signal TX31 based on the power supply voltage Vpa32, and output a second amplified output signal RF_out32. When the second enabling signal PA32_EN is high, the second power amplifier circuit PA32 may be configured to work; or when the second enabling signal PA32_EN is low, the second power amplifier circuit PA32 may be configured to work. In an embodiment, the second power amplifier circuit PA32 may be configured to run according to a function principle of a Doherty power amplifier circuit. When working in back-off (to be specific, when input power of the power amplifier decreases, output power of the power amplifier also decreases, so as to be far away from saturation or amplitude limiting), the Doherty power amplifier circuit may have both relatively high efficiency and relatively good linearity.

A manner of enabling the first power amplifier circuit PA31 and the second power amplifier circuit PA32 is not limited to being shown in FIG. 4. For example, in another embodiment, the processor 310 may alternatively provide the first enabling signal PA31_EN for the first power amplifier circuit PA31, and provide an inverted signal of the first enabling signal PA31_EN for the second power amplifier circuit PA32, so that the first power amplifier circuit PA31 and the second power amplifier circuit PA32 can work at different moments. In still another embodiment, the processor 310 may alternatively provide the second enabling signal PA32_EN for the second power amplifier circuit PA32, and provide an inverted signal of the second enabling signal PA32_EN for the first power amplifier circuit PA31, so that the first power amplifier circuit PA31 and the second power amplifier circuit PA32 can work at different moments.

The wireless communications system 300 may further include a transfer switch 330 and an antenna circuit 340. The transfer switch 330 is coupled to the first power amplifier circuit PA31, the second power amplifier circuit PA32, and the antenna circuit 340. When the transmit signal TX31 meets the first bandwidth range, the transfer switch 330 connects the first power amplifier circuit PA31 and the antenna circuit 340, and the first amplified output signal RF_out31 is transmitted through the antenna circuit 340. When the transmit signal TX31 meets the second bandwidth range, the transfer switch 330 connects the second power amplifier circuit PA32 and the antenna circuit 340, and the second amplified output signal RF_out32 is transmitted through the antenna circuit 340. In some embodiments, before the first amplified output signal RF_out31 or the second amplified output signal RF_out32 is transmitted, processing such as filtering may be performed. The transfer switch 330 may be configured as the transfer switch 153 in FIG. 1A to FIG. 1C, and the antenna circuit 340 may be configured as the antenna circuit 154 in FIG. 1A to FIG. 1C. In a non-limiting embodiment, when the transmit signal TX31 meets the first bandwidth range and the second bandwidth range, both the first amplified output signal RF_out31 and the second amplified output signal RF_out32 are transmitted through a same antenna or a same group of antennas (a group of antennas may include more than two antennas) in the antenna circuit 340.

When the transmit signal TX31 meets the first bandwidth range, a path between the processor 310, the first power amplifier circuit PA31, and the transfer switch 330 is a transmit link of a first bandwidth. When the transmit signal TX31 is within the second bandwidth range, a path between the processor 310, the second power amplifier circuit PA32, and the transfer switch 330 is a transmit link of a second bandwidth.

In an embodiment, when the bandwidth of the transmit signal TX meets the first bandwidth range, the processor 310 sends the transmit signal TX to only the first power amplifier circuit PA31. When the bandwidth of the transmit signal TX meets the second bandwidth range, the processor 310 sends the transmit signal TX to only the second power amplifier circuit PA32. In another embodiment, when the bandwidth of the transmit signal TX meets the first bandwidth range, the processor 310 sends the transmit signal TX to only the first power amplifier circuit PA31 and the second power amplifier circuit PA32. When the bandwidth of the transmit signal TX meets the second bandwidth range, the processor 310 sends the transmit signal TX to only the first power amplifier circuit PA31 and the second power amplifier circuit PA32.

Figure 5:
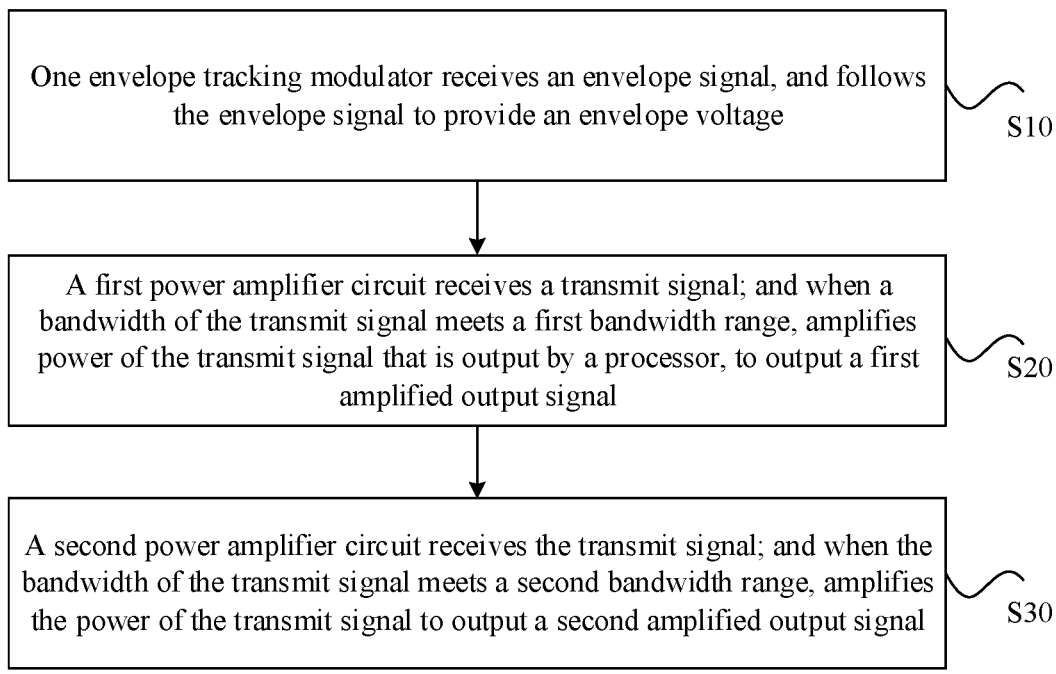
FIG. 5 is a schematic diagram of a method according to an embodiment of this application.

FIG. 5 shows a method according to an embodiment. The method may be implemented by using any wireless communications system in the embodiment. In step S10, an envelope tracking modulator receives an envelope signal, and follows the envelope signal to provide an envelope voltage. In an embodiment, an envelope signal ET_DAC31 that is output by a processor 310 is received, and an envelope tracking modulator ETM31 supplies power to a first power amplifier circuit PA31 and a second power amplifier circuit PA32. Voltages for supplying power to the first power amplifier circuit PA31 and the second power amplifier circuit PA32 are different. In step S20, the first power amplifier circuit PA31 receives a transmit signal TX1 that is output by the processor 310. When a bandwidth of the transmit signal TX1 meets a first bandwidth range, the first power amplifier circuit PA1 amplifies power of the transmit signal that is output by the processor 310, to output a first amplified output signal RF_out31. In step S30, the second power amplifier circuit PA2 receives the transmit signal. When the bandwidth of the transmit signal TX1 meets a second bandwidth range, the second power amplifier circuit PA2 amplifies the power of the transmit signal TX1, to output a second amplified output signal RF_out32. After passing through a transfer switch 330, the first amplified output signal RF_out31 and the second amplified output signal RF_out32 are transmitted through an antenna circuit 340. In an embodiment, filtering is performed on power supply voltages provided for the first power amplifier circuit and the second power amplifier circuit. In an embodiment, power supply to the first power amplifier circuit or power supply to the first power amplifier circuit is selectively disconnected based on the bandwidth of the transmit signal. The following describes in detail a technology for performing filtering on a power supply voltage and a technology for selectively disconnecting power supply.

Figure 6:
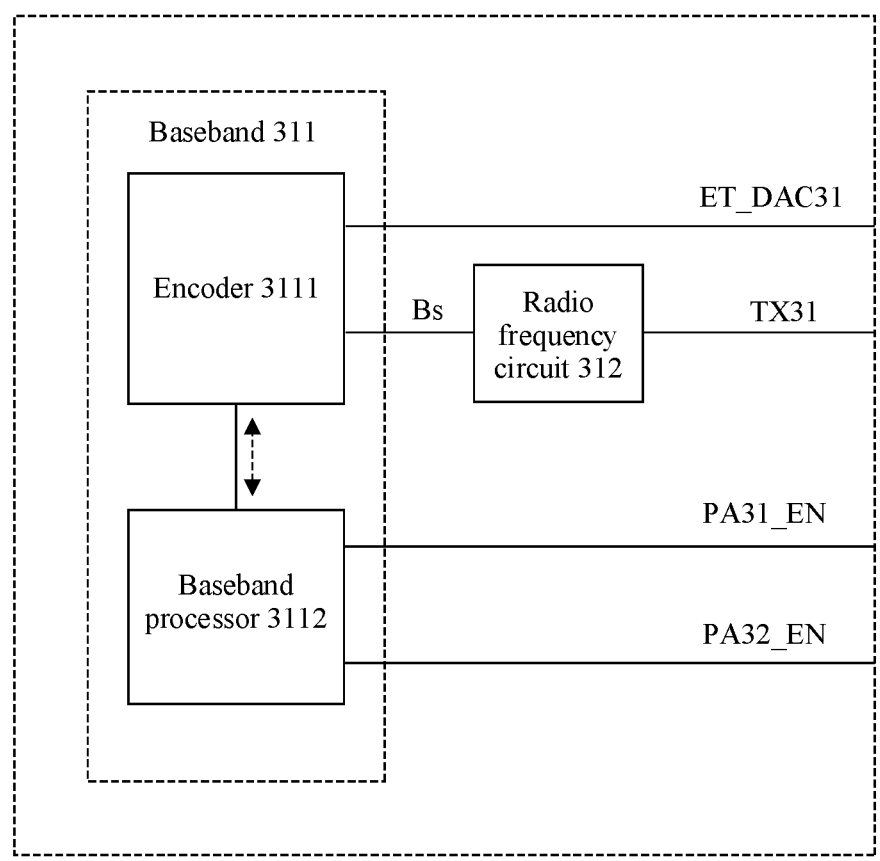
FIG. 6 is a schematic diagram of a structure of a processor according to an embodiment of this application.

FIG. 6 shows an implementation of the processor in FIG. 4. The processor 310 in FIG. 6 includes a baseband 311 and a radio frequency circuit (or referred to as a radio frequency integrated circuit, Radio Frequency Integrated Circuit in English, RFIC for short) 312. The baseband 311 provides a baseband signal Bs, an envelope signal ET_DAC31, a first enabling signal PA31_EN, and a second enabling signal PA32_EN based on to-be-transmitted data. For example, the baseband 311 may include an encoder 3111 and a baseband processor 3112. The encoder 3111 encodes a received signal source, and outputs the baseband signal Bs after the encoding. The encoder 3111 may further determine an envelope of the baseband signal Bs, for example, may calculate an amplitude of the baseband signal Bs and average a plurality of amplitudes. The encoder 3111 may output the envelope signal ET_DAC31 including envelope information of the baseband signal Bs. The baseband processor 3112 may be a central processing unit (CPU), a microprocessor (MCU), or the like. The baseband processor 3112 may have processing and control functions, so as to generate an enabling signal of a power amplifier, for example, the first enabling signal PA31_EN and/or the second enabling signal PA32_EN. The radio frequency circuit 312 is configured to: receive the baseband signal Bs from the baseband 311, and process the baseband signal Bs to generate a transmit signal TX31. For example, the radio frequency circuit 312 may perform processing such as conversion to analog, filtering, or up-conversion, to obtain the radio frequency transmit signal TX31. In some embodiments, the radio frequency circuit 312 further transmits the envelope signal ET_DAC31, the first enabling signal PA31_EN, and the second enabling signal PA32_EN. In some other embodiments, the envelope signal ET_DAC31 may alternatively be generated by the radio frequency circuit 312.

All or some of the encoder 3111, the baseband processor 3112, and the radio frequency circuit 312 in the processor 310 are integrated into an integrated circuit (IC), and all or some of the encoder 3111, the baseband processor 3112, and the radio frequency circuit 312 may be packaged together. For example, in an embodiment, the encoder 3111, the baseband processor 3112, and the radio frequency circuit 312 are separately located on bare chips of different integrated circuits, the encoder 3111 and the baseband processor 3112 are packaged as a system-on-a-chip (SOC) in a system in package (SIP) manner, and the bare chip of the radio frequency circuit 312 is independently packaged.

Figure 7A:
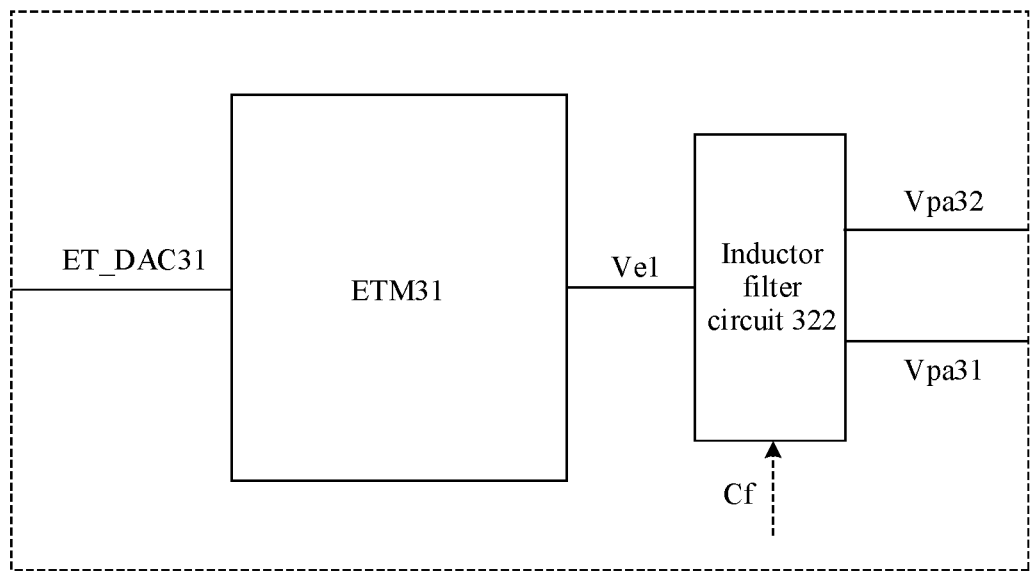
FIG. 7A is a schematic diagram of a structure of a power supply circuit according to an embodiment of this application.

FIG. 7A shows an implementation of the power supply circuit 320 in FIG. 4. The power supply circuit 320 is configured to provide a power supply voltage obtained after filtering. The power supply circuit 320a in FIG. 7A includes an envelope tracking modulator ETM31 and an inductor filter circuit 322 (which may also be referred to as an adjustment circuit). The envelope tracking modulator ETM31 outputs an envelope voltage Ve1 based on an envelope signal ET_DAC31. When current passing through the inductor filter circuit 322 changes, electromotive force appears in the inductor filter circuit 322 to resist the change of the current, so as to perform filtering on the envelope voltage Ve1, thereby suppressing noise of the envelope voltage Ve1. The inductor filter circuit 322 is coupled to a power input end of a first power amplifier circuit PA31 and a power input end of a second power amplifier circuit PA32, and is configured to supply power to the first power amplifier circuit PA31 and the second power amplifier circuit PA32.

In an embodiment, the power supply circuit 320a may further include a boost circuit. The boost circuit is configured to provide the first power amplifier circuit PA31 and the second power amplifier circuit PA32 with different power of different power supply voltages when the transmit signal has different bandwidths. When a bandwidth of the transmit signal TX31 meets a first bandwidth range, a power supply voltage Vpa31 has first power. When the bandwidth of the transmit signal TX31 meets the first bandwidth range, a power supply voltage Vpa32 has second power. The second power may be greater than the first power. This can increase transmit power of the second power amplifier circuit PA32.

Figure 7B:
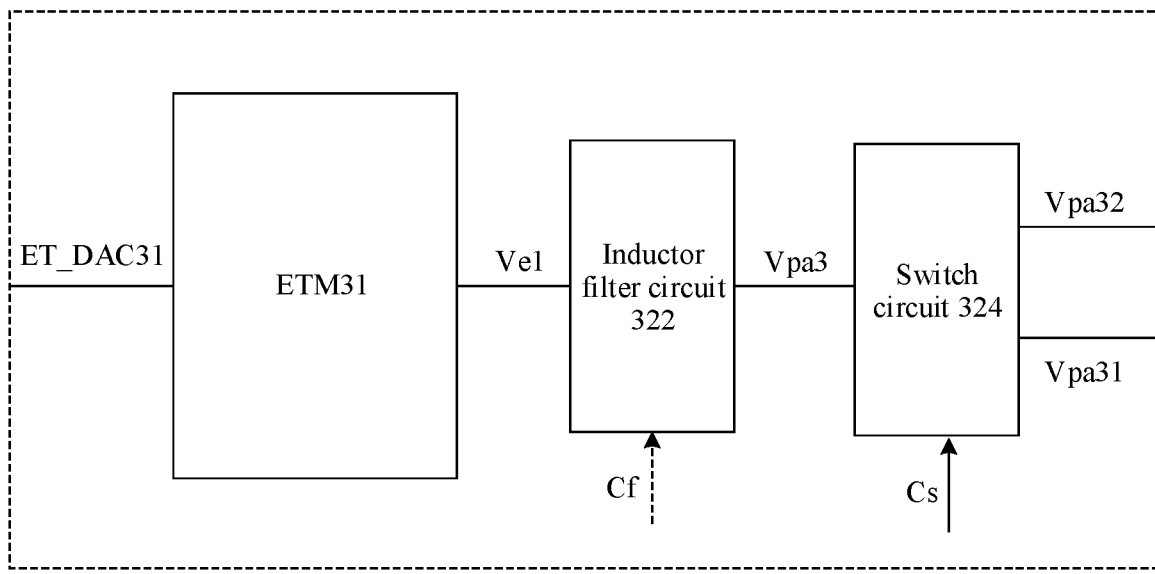
FIG. 7B is a schematic diagram of a structure of a power supply circuit according to an embodiment of this application.

FIG. 7B shows another implementation of the power supply circuit in FIG. 4. A difference between the power supply circuit 320b in FIG. 7B and the power supply circuit 320a in FIG. 7A lies in that: The power supply circuit 320b further includes a switch circuit 324. The envelope tracking modulator ETM31 generates a power supply voltage Vpa3. The power supply voltage Vpa3 is used to supply power to the first power amplifier circuit PA31 and the second power amplifier circuit PA32. In some implementations, the switch circuit 324 in FIG. 7B is configured to selectively disconnect a power supply path from the power supply circuit 320 to the second power amplifier circuit PA32, so as to isolate the first power amplifier circuit PA31 from the second power amplifier circuit PA32. In some other implementations, the switch circuit 324 in FIG. 7B is configured to: selectively disconnect a power supply path from the power supply circuit 320 to the first power amplifier circuit PA31, and selectively disconnect a power supply branch from the power supply circuit 320 to the second power amplifier circuit PA32, so as to isolate the first power amplifier circuit PA31 from the second power amplifier circuit PA32.

The inductor filter circuit 322 in FIG. 7A or FIG. 7B may have a fixed inductance value, or may have a plurality of configurable inductance values. When the transmit signal is in different bandwidth modes, an electronic device has greatly different indicators. Compared with a mode of a first bandwidth (a case in which the bandwidth of the transmit signal meets the first bandwidth range), a mode of a second bandwidth (a case in which the bandwidth of the transmit signal meets the second bandwidth range) has a lower requirement on noise but a higher requirement on efficiency. For example, in the mode of the first bandwidth, for example, through frequency division duplex (FDD), noise generated on a transmit link of the first bandwidth falls into a receive frequency band, and consequently receiver sensitivity is reduced. Therefore, in the mode of the first bandwidth, an inductance value of the inductor filter circuit is increased, so that noise of the envelope tracking modulator and the first power amplifier circuit PA31 can be suppressed. However, in the mode of the second bandwidth, to correctly track the envelope signal of the transmit signal, the envelope tracking modulator requires a high frequency width, and consequently transmission efficiency is reduced. Therefore, in the mode of the second bandwidth, for example, through time division duplex (TDD), an effective inductance value of the inductor filter circuit is reduced, so that efficiency of the electronic device is improved. Therefore, in some implementations, the inductor filter circuit 322 in FIG. 7A or FIG. 7B may be provided with a plurality of inductance values. An effective inductance value of the inductor filter circuit 322 varies with the bandwidth of the transmit signal, and a higher bandwidth indicates a smaller effective inductance value of the inductor filter circuit 322, so that the electronic device can meet a current indicator when the transmit signal has different bandwidths. For example, when a transmit signal TX2 meets the first bandwidth range, the part of the inductor filter circuit 322 that is coupled between the envelope tracking modulator ETM31 and the first power amplifier circuit PA31 has a first inductance value. When the transmit signal TX2 meets the second bandwidth range, the part of the inductor filter circuit 322 that is coupled between the envelope tracking modulator ETM31 and the second power amplifier circuit PA32 has a second inductance value. For example, when a bandwidth value in the first bandwidth range is less than a bandwidth value in the second bandwidth range, the first inductance value is greater than the second inductance value.

Dashed-line arrows in FIG. 7A and FIG. 7B indicate that, in some embodiments, the inductor filter circuit 322 may further receive a control signal Cf to configure the inductance value of the inductor filter circuit 322. The control signal Cf varies with the bandwidth of the transmit signal TX31. For example, in an embodiment, the control signal Cf is the first enabling signal PA31_EN. In another embodiment, the control signal Cf is the second enabling signal PA32_EN. In still another embodiment, the control signal Cf includes the first enabling signal PA31_EN and the second enabling signal PA32_EN. In a non-limiting embodiment, the reconfigurable inductor may include a plurality of inductors and at least one filter switch. The switch may be configured to be turned off or turned on based on the control signal Cf, to change a configuration of the reconfigurable inductor, thereby regulating an inductance value of the reconfigurable inductor. In this technology, all filter switches, switch circuits, and transfer switches may include triodes, NMOS transistors, PMOS transistors, CMOS transistors, MOSFET transistors, FET transistors, transmission gates, single pole double throw (SPDT) switches, and double pole double throw (DPDT) switches, and other configurable switches.

Figure 8A:
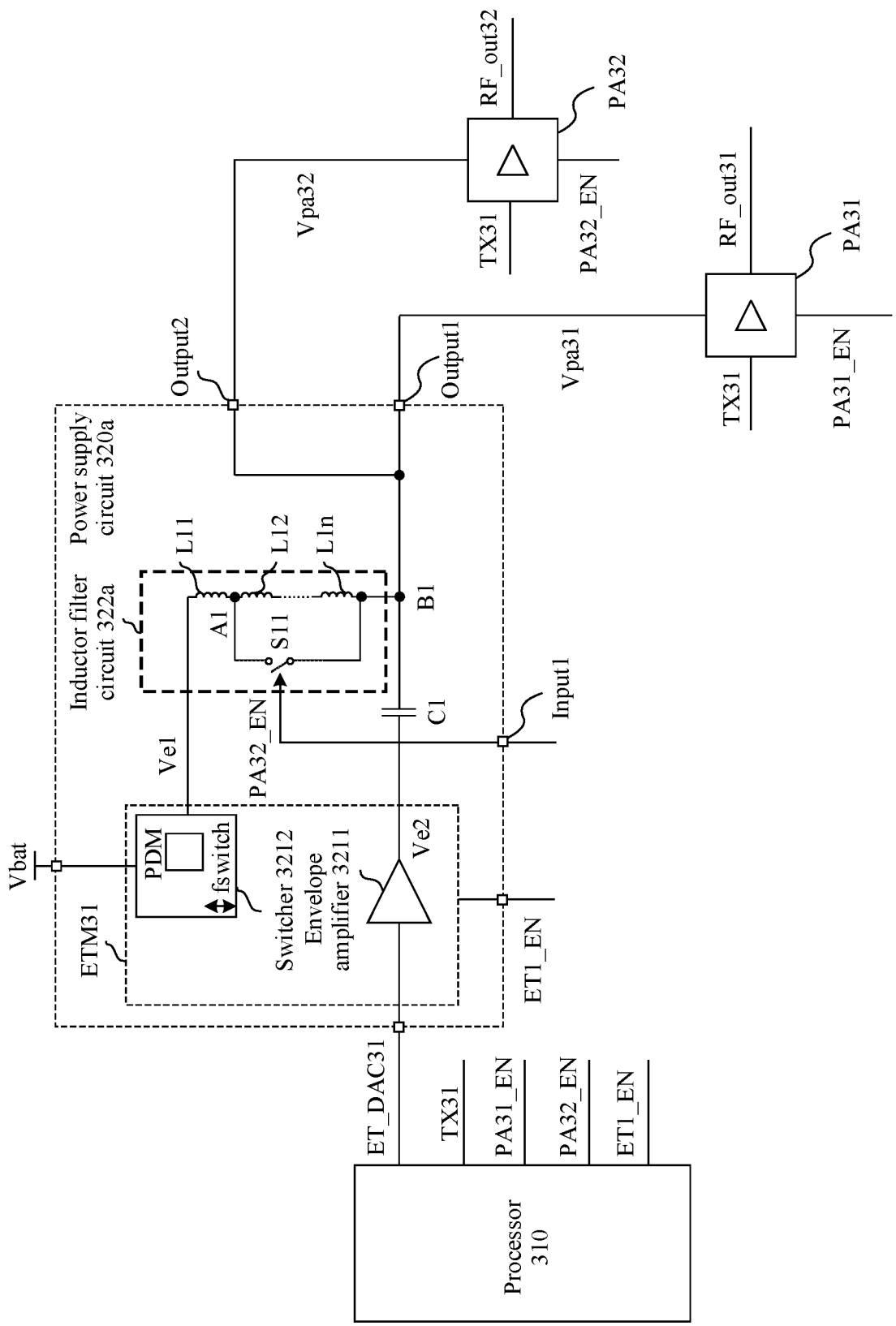
FIG. 8A is a schematic diagram of a structure of a wireless communications system according to an embodiment of this application.

FIG. 8A is a schematic diagram of a wireless communications system having a power supply circuit 320*a* according to an embodiment. The power supply circuit 320*a* includes an envelope tracking modulator ETM311 and an inductor filter circuit 322*a*. The envelope tracking modulator ETM31 receives an envelope signal ET_DAC31 (an analog signal) and an envelope enabling signal ET1_EN. The envelope enabling signal ET1_EN is used to enable the envelope tracking modulator ETM31. The envelope enabling signal ET1_EN is generated by a processor 310. For example, the envelope enabling signal ET1_EN may be generated by the baseband processor 3112 shown in FIG. 6, or the envelope enabling signal ET1_EN is obtained by performing an AND operation on the first enabling signal PA31_EN and the second enabling signal PA32_EN. In a non-limiting embodiment, the envelope tracking modulator ETM31 may include an envelope amplifier 3211 and a switcher 3212. The envelope amplifier 3211 is a linear amplifier (that is, an amplifier whose output signal is in direct proportion to an input signal). The envelope amplifier 3211 receives the envelope signal ET_DAC31, and linearly amplifies the envelope signal ET_DAC31 to generate an envelope voltage Ve2. The switcher 3212 may also be referred to as a BUCK circuit (buck/boost circuit), and periodically provides a battery voltage Vbat for an inductor filter circuit 322*d*. In an embodiment, the switcher 3212 may include a pulse density modulator (PDM) and a switch regulator. The pulse density modulator may generate a pulse density modulation signal based on the envelope signal ET_DAC31, and the pulse density modulation signal may control connection and disconnection of the switch regulator, so as to periodically provide the battery voltage Vbat for the inductor filter circuit 322*d*. A larger frequency of the envelope signal ET_DAC31 indicates a larger switch frequency fswitch of the switch regulator.

The inductor filter circuit 322*d* includes a filter switch S11 and n inductors sequentially connected in series: an inductor L11, an inductor L12, . . . , and an inductor L1*n*, where n is a natural number greater than or equal to 3. A first end of the inductor L11 is coupled to an envelope voltage Ve1, a second end of the inductor L11 is coupled to a first node A1, the inductor L12 to the inductor L1*n* are connected between the first node A1 and a second node B1 in series, and the filter switch S11 is coupled between the first node A1 and the second node B1. The second enabling signal PA32_EN is coupled to a control end of the filter switch Si 1 to selectively turn off or turn on the filter switch S11. The second node B1 is coupled to a first power amplifier circuit PA31 through a first output end Output1 to provide a power supply voltage Vpa31, and is coupled to a second power amplifier circuit PA32 through a second output end Output2 to provide a power supply voltage Vpa32. In an implementation, the power supply circuit 320*b* may further include a capacitor C1, to improve a filtering effect. For example, an output end of the envelope amplifier 3211 is coupled to a first end of the capacitor C1, and a second end of the capacitor C1 is coupled to the second node B1. The power supply circuit 320a may supply power to the first power amplifier circuit PA31 and the second power amplifier circuit PA32. This can save some space on a PCB.

Figure 8B:
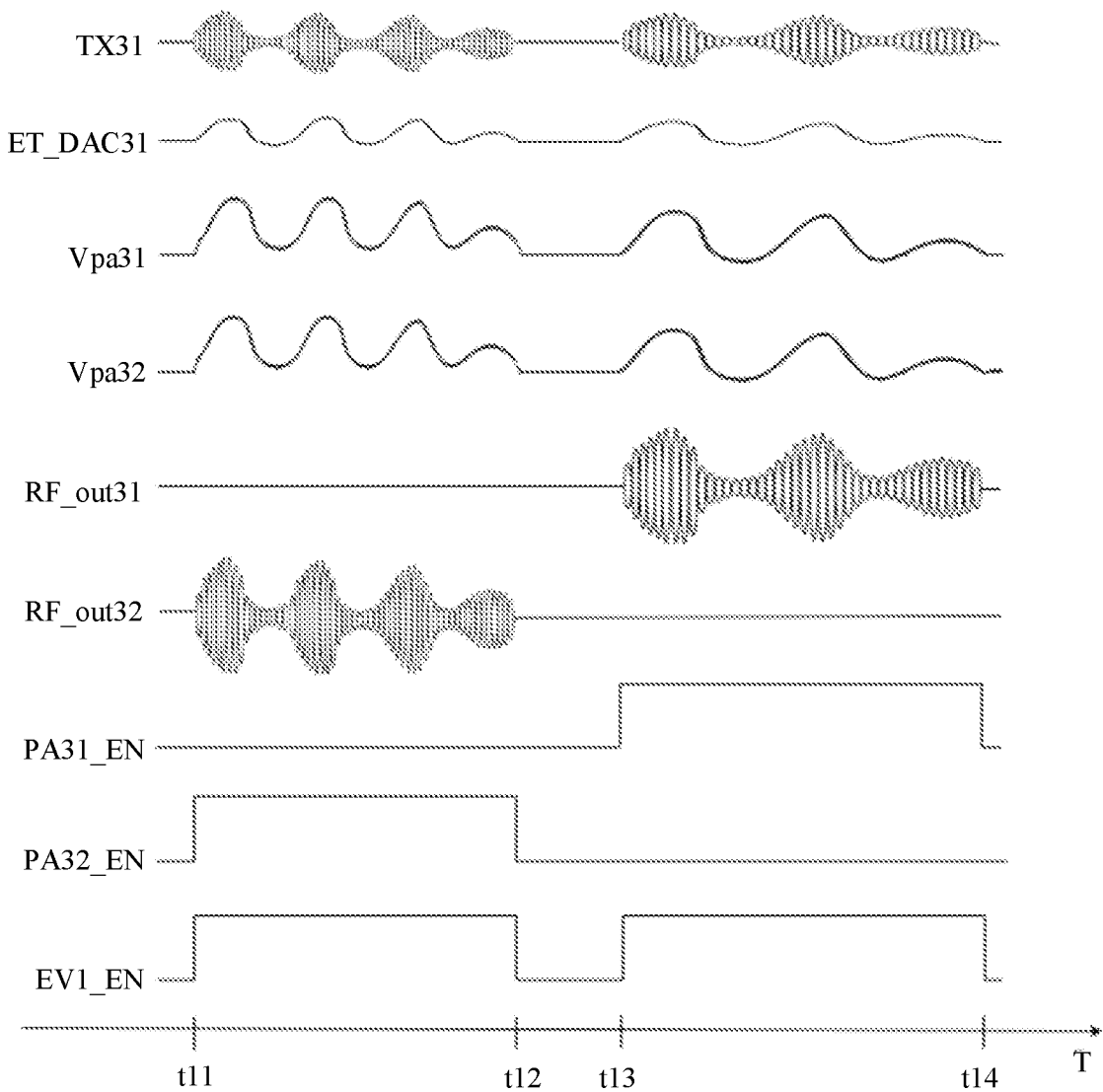
FIG. 8B is a schematic diagram of each signal in a wireless communications system according to an embodiment of this application.

FIG. 8B is a schematic diagram of each signal in FIG. 8A. A horizontal coordinate in FIG. 8B is time T. As shown in FIG. 8B, from a moment t11 to a moment t12, a bandwidth of a transmit signal TX31 meets a second bandwidth range, a frequency of the transmit signal TX31 is relatively high, and a high power or a high frequency response is required. A curve of the envelope signal ET_DAC31 matches an envelope curve of the transmit signal TX31. The envelope enabling signal ET1_EN is valid, and the envelope enabling signal ET1_EN enables the envelope tracking modulator ETM31. The second enabling signal PA32_EN controls the filter switch S11 to be turned on; the inductor L12 to the inductor L1n are short-circuited; current that is output by the envelope amplifier 3211 flows to the second node B1 through the capacitor C1, the second node B1, and the filter switch S11; current that is output by the switcher 3212 flows to the second node B1 through the inductor L11, and converges, at the second node B1, with the current that is output by the envelope amplifier 3211; and the second node B1 provides the power supply voltage Vpa32 for the second power amplifier circuit PA32. The second enabling signal PA32_EN enables the second power amplifier circuit PA32, and transmission is performed on a transmit link of a second bandwidth. The second power amplifier circuit PA32 outputs a second amplified output signal RF_out32 based on the transmit signal TX31 and the power supply voltage Vpa32. As shown in FIG. 8B, an amplitude of the power supply voltage Vpa32 is greater than an amplitude of the envelope signal ET_DAC31, a frequency of the second amplified output signal RF_out32 follows a frequency of the transmit signal TX31, and an amplitude of the second amplified output signal RF_out32 is greater than an amplitude of the transmit signal TX31. The first enabling signal PA31_EN does not enable the first power amplifier circuit PA31, and transmission is not performed on a transmit link of a first bandwidth. In addition, a frequency at which the switcher 3212 supplies power to the inductor filter circuit 322d may be increased. From the moment t11 to the moment t12, only the inductor L11 is connected to a current power supply path (a power supply path from the envelope tracking modulator ETM31 to the second power amplifier circuit PA32), the part of the inductor filter circuit 322 that is coupled between the envelope tracking modulator ETM31 and the second power amplifier circuit PA32 has a second inductance value, the second inductance value is less than a first inductance value, and power consumption of the inductor filter circuit 322 is relatively low. This helps improve efficiency of an electronic device in a second bandwidth mode.

From a moment t13 to a moment t14, the bandwidth of the transmit signal TX31 meets a first bandwidth range, and the transmit signal TX31 has a relatively low frequency and requires low noise. A curve of the envelope signal ET_DAC31 matches an envelope curve of the transmit signal TX31. The envelope enabling signal ET1_EN is valid, and the envelope enabling signal ET1_EN enables the envelope tracking modulator ETM31. The second enabling signal PA32_EN controls the filter switch S11 to be turned off; the inductor L12 to the inductor L1n are connected to a current power supply path (a power supply path from the envelope tracking modulator ETM31 to the first power amplifier circuit PA31); current that is output by the switcher 3212 flows to the second node B1 through the inductor L11 and the inductor L12 to the inductor L1n; current that is output by the envelope amplifier 3211 flows to the second node B1 through the capacitor C1, and converges, at the second node B1, with the current that is output by the switcher 3212; and the second node B1 provides the power supply voltage Vpa31 for the first power amplifier circuit PA31. The first enabling signal PA31_EN enables the first power amplifier circuit PA31, and a radio frequency signal is transmitted on a transmit link of a first bandwidth. The first power amplifier circuit PA31 outputs a first amplified output signal RF_out31 based on the transmit signal TX31 and the power supply voltage Vpa31. As shown in FIG. 8B, an amplitude of the power supply voltage Vpa31 is greater than an amplitude of the envelope signal ET_DAC31, a frequency of the first amplified output signal RF_out31 follows a frequency of the transmit signal TX31, and an amplitude of the first amplified output signal RF_out31 is greater than an amplitude of the transmit signal TX31. The second enabling signal PA32_EN does not enable the second power amplifier circuit PA32, and a radio frequency signal is not transmitted on a transmit link of a second bandwidth. In addition, a frequency at which the switcher 3212 supplies power to the inductor filter circuit 322d may be reduced. From the moment t13 to the moment t14, the inductor L11 and the inductor L12 to the inductor L1n are all connected to the current power supply path, the part is of the inductor filter circuit 322 that is coupled between the envelope tracking modulator ETM31 and the first power amplifier circuit PA31 has the first inductance value, and the first inductance value is greater than the second inductance value. This helps reduce noise of the power supply voltage Vpa31 and the power supply voltage Vpa32 in a first bandwidth mode.

The power supply circuit 320a has a first input end Input1 (that is, a control input end), the first output end Output1, and the second output end Output2. The first input end Input1 is configured to input the second enabling signal PA32_EN to the power supply circuit 320a. The first output end Output1 is configured to provide the power supply voltage Vpa31 for the first power amplifier circuit PA31. The second output end Output2 is configured to provide the power supply voltage Vpa32 for the second power amplifier circuit PA32. For example, the inductor filter circuit 322a is an independent component, the envelope tracking modulator ETM31 and the inductor filter circuit 322a are packaged together to form the packaged power supply circuit 320a, and the first output end Output1 and the second output end Output2 are two pins of the packaged power supply circuit 320b for outputting a signal. In another implementation, the inductor filter circuit 322a is an independent component, the envelope tracking modulator ETM31 is independently packaged, and the packaged envelope tracking modulator ETM31 and the inductor filter circuit 322a are mounted on the circuit board. In another embodiment, the first output end Output1 is coupled to the second node B1, and the second output end Output2 is coupled to the first node A1.

The inductor filter circuit in the power supply circuit 320a is not limited to the structure shown in FIG. 8A. For example, in another embodiment, the inductor filter circuit is L21 in the inductor filter circuit 322b shown in FIG. 9A and FIG. 9B. In still another embodiment, the inductor filter circuit 322a may include only the inductor L11 and the inductor L12. The first end of the inductor L11 is coupled to the envelope voltage Ve1, and the second end of the inductor L11 is coupled to the first node A1. The inductor L12 is coupled between the first node A1 and the second node B1.

In another embodiment, an inductance value of the inductor filter circuit 322 may alternatively be adjusted by using a switch frequency fswitch of a switch regulator, and the inductance value of the inductor filter circuit 322 decreases as the switch frequency fswitch increases. For example, when the bandwidth of the transmit signal TX31 meets the first bandwidth range, and the switch frequency fswitch meets a first frequency range, the part that is of the inductor filter circuit 322 and that is coupled between the envelope tracking modulator ETM31 and the first power amplifier circuit PA31 has the first inductance value. When the bandwidth of the transmit signal TX31 meets the second bandwidth range, and the switch frequency fswitch meets a second frequency range, the part that is of the inductor filter circuit 322 and that is coupled between the envelope tracking modulator ETM31 and the second power amplifier circuit PA32 has the second inductance value. The largest frequency in the first frequency range is less than the smallest frequency in the second frequency range, and the second inductance value is less than the first inductance value. This helps improve the precision of the electronic device in the first bandwidth mode, and can improve the efficiency of the electronic device in the second bandwidth mode.

Figure 9A:
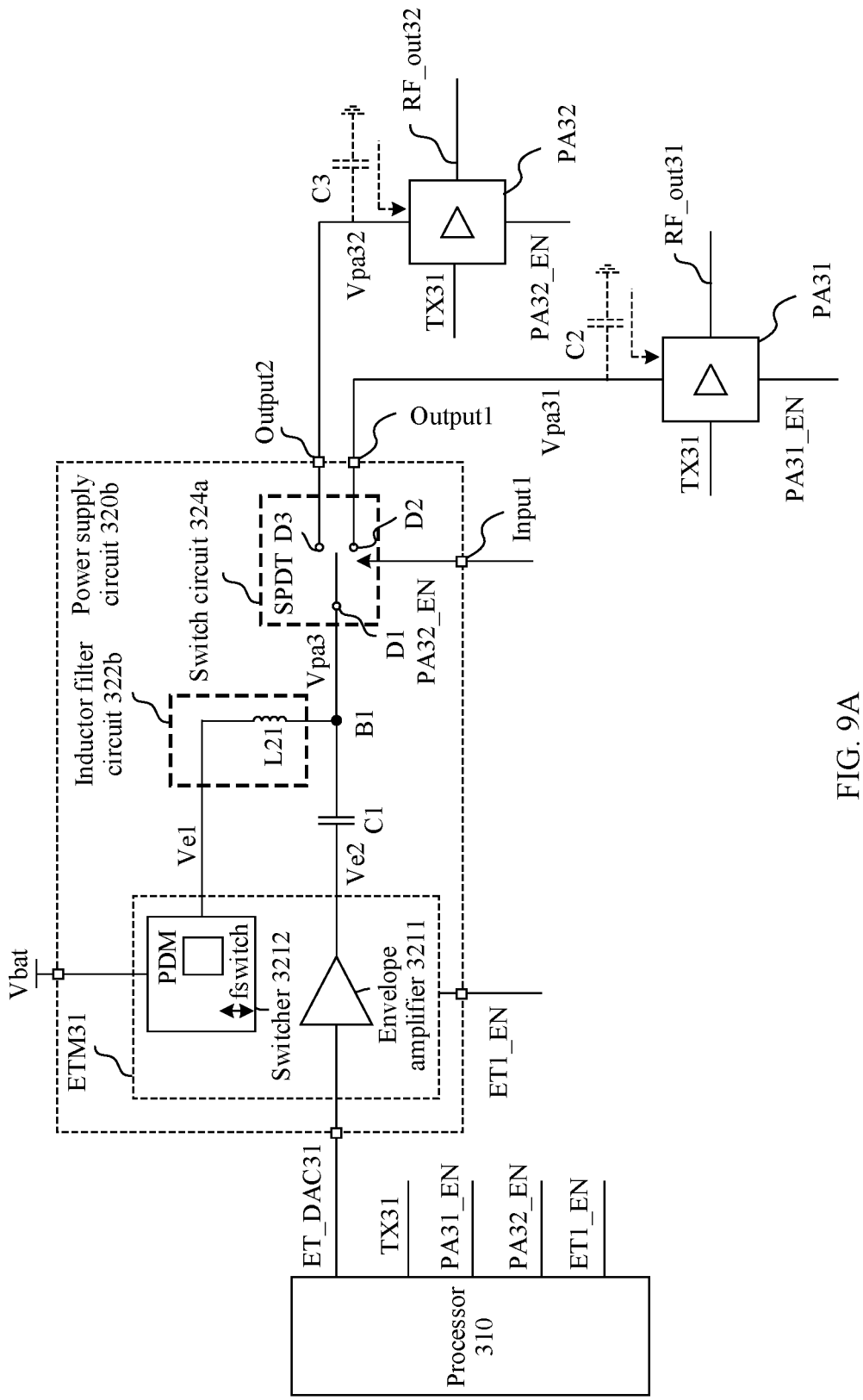
FIG. 9A is a schematic diagram of a structure of a wireless communications system according to an embodiment of this application.

A power supply circuit 320b in FIG. 9A includes an envelope tracking modulator ETM31, an inductor filter circuit 322b, and a switch circuit 324a. The inductor filter circuit 322b includes an inductor L21. A first end of the inductor 1 is coupled to an output end of a switcher 3212, and a second end of the inductor L21 is coupled to a second node B1. The second node B1 is coupled to a first power amplifier circuit PA31 and a second power amplifier circuit PA32 to provide a power supply voltage Vpa3. The power supply circuit 320b may further include a capacitor C1, to improve a filtering effect. For example, an output end of an envelope amplifier 3211 is coupled to a first end of the capacitor C1, and a second end of the capacitor C1 is coupled to the second node B1. The switch circuit 324a includes a single pole double throw (SPDT) switch. A first end D1 of the SPDT switch is coupled to the power supply voltage Vpa3 that is output by the inductor filter circuit 322, a second end D2 of the SPDT switch is configured to output a power supply voltage Vpa31 to the first power amplifier circuit PA31, and a third end D3 of the SPDT switch is configured to output a power supply voltage Vpa32 to the second power amplifier circuit PA32. A first enabling signal PA31_EN is used as a control signal Cs, and is coupled to a control end of the SPDT switch.

Figure 9B:
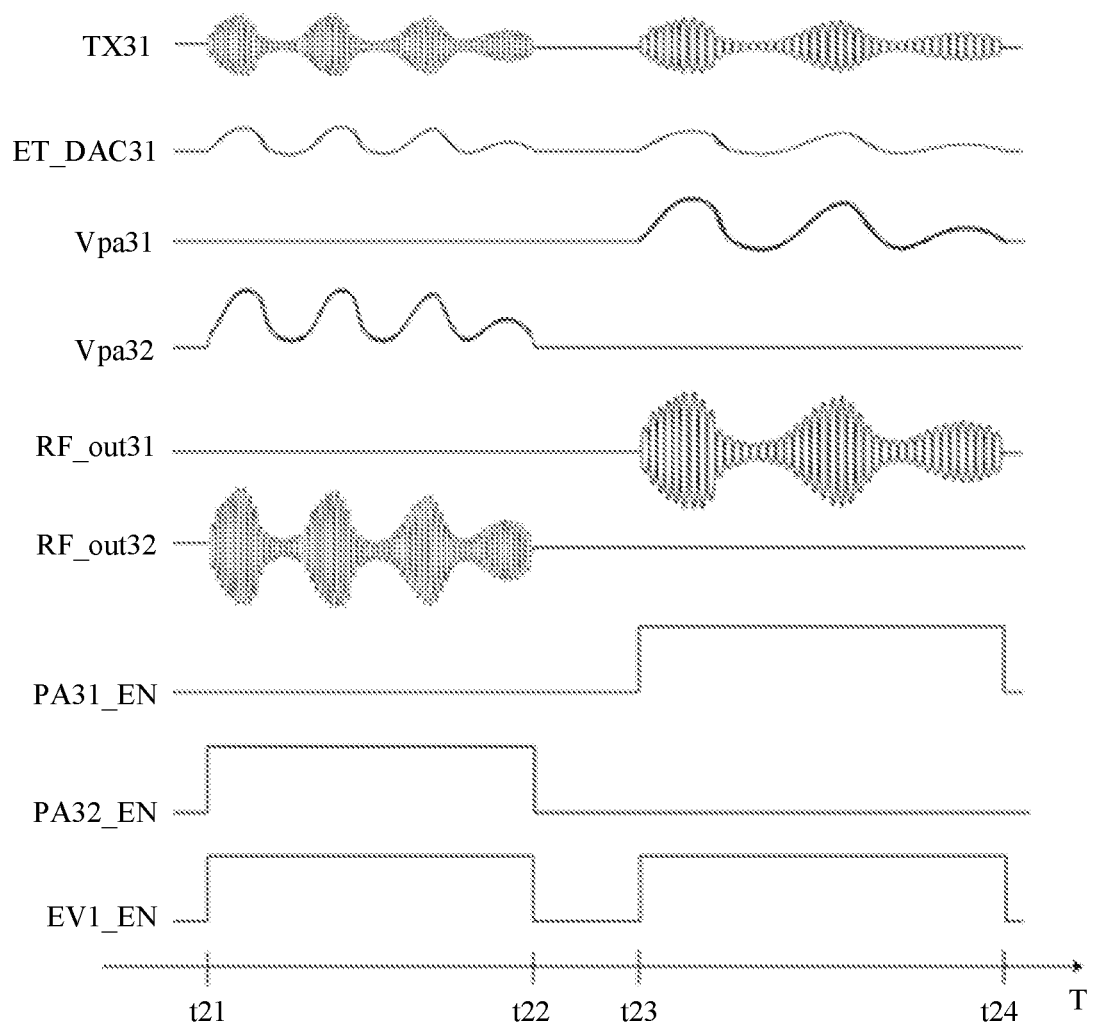
FIG. 9B is a schematic diagram of each signal in a wireless communications system according to an embodiment of this application.

FIG. 9B is a schematic diagram of each signal in FIG. 9A. A horizontal coordinate in FIG. 9B is time T. As shown in FIG. 9B, from a moment t21 to a moment t22, a bandwidth of a transmit signal TX31 meets a second bandwidth range, an envelope enabling signal ET1_EN is valid, and the envelope enabling signal ET1_EN enables the envelope tracking modulator ETM31. A second enabling signal PA32_EN controls the SPDT switch to connect the first end D1 and the third end D3, and the switch circuit 324a is configured to: provide the power supply voltage Vpa32 for the second power amplifier circuit PA32, disconnect power supply to the first power amplifier circuit PA31, and isolate the first power amplifier circuit PA31 from the second power amplifier circuit PA32 in a second bandwidth mode. The second enabling signal PA32_EN enables the second power amplifier circuit PA32, and transmission is performed on a transmit link of a second bandwidth. The second power amplifier circuit PA32 outputs a second amplified output signal RF_out32 based on the transmit signal TX31 and the power supply voltage Vpa32. The first enabling signal PA31_EN does not enable the first power amplifier circuit PA31, and transmission is not performed on a transmit link of a first bandwidth. In addition, the switch circuit 324a is configured to disconnect power supply from the envelope tracking modulator ETM31 to the first power amplifier circuit PA31, and a parasitic capacitor C2 of the second power amplifier circuit PA32 does not affect a transmit link within the second bandwidth range.

From a moment t23 to a moment t24, the bandwidth of the transmit signal TX31 meets a first bandwidth range, the envelope enabling signal ET1_EN is valid, and the envelope enabling signal ET1_EN enables the envelope tracking modulator ETM31. The second enabling signal PA32_EN controls the SPDT switch to connect the first end D1 and the second end D2, and the switch circuit 324c is configured to: provide the power supply voltage Vpa31 for the first power amplifier circuit PA31, disconnect power supply to the second power amplifier circuit PA32, and isolate the first power amplifier circuit PA31 from the second power amplifier circuit PA32 in a first bandwidth mode. The first enabling signal PA31_EN enables the first power amplifier circuit PA31, and transmission is performed on a transmit link of a first bandwidth. The first power amplifier circuit PA31 outputs a first amplified output signal RF_out31 based on the transmit signal TX31 and the power supply voltage Vpa31. The second enabling signal PA32_EN does not enable the second power amplifier circuit PA32, and transmission is not performed on a transmit link of a second bandwidth. In addition, the switch circuit 324a is configured to disconnect a power supply path from the envelope tracking modulator ETM31 to the second power amplifier circuit PA32, and a parasitic capacitor C3 of the second power amplifier circuit PA32 does not affect the transmit link of the first bandwidth.

The power supply circuit 320b in FIG. 9A and FIG. 9B may supply power to the first power amplifier circuit PA31 and the second power amplifier circuit PA32. This can save some space on a PCB. In an implementation, both the inductor filter circuit 322b and the switch circuit 324a are independent components, the envelope tracking modulator ETM31, the inductor filter circuit 322b, and the switch circuit 324a are packaged together to form the packaged power supply circuit 320b, and a first output end Output1 and a second output end Output2 are two pins of the packaged power supply circuit 320b for outputting a signal. In another implementation, the envelope tracking modulator ETM31 may be independently packaged, the inductor filter circuit 322a and the switch circuit 324a are independent components, and the inductor filter circuit 322a, the switch circuit 324a, and the packaged envelope tracking modulator ETM31 are mounted on the circuit board. In still another implementation, the switch circuit 324a and the envelope tracking modulator ETM31 are integrated into an integrated circuit, and the inductor filter circuit 322a is an independent component.

Figure 10:
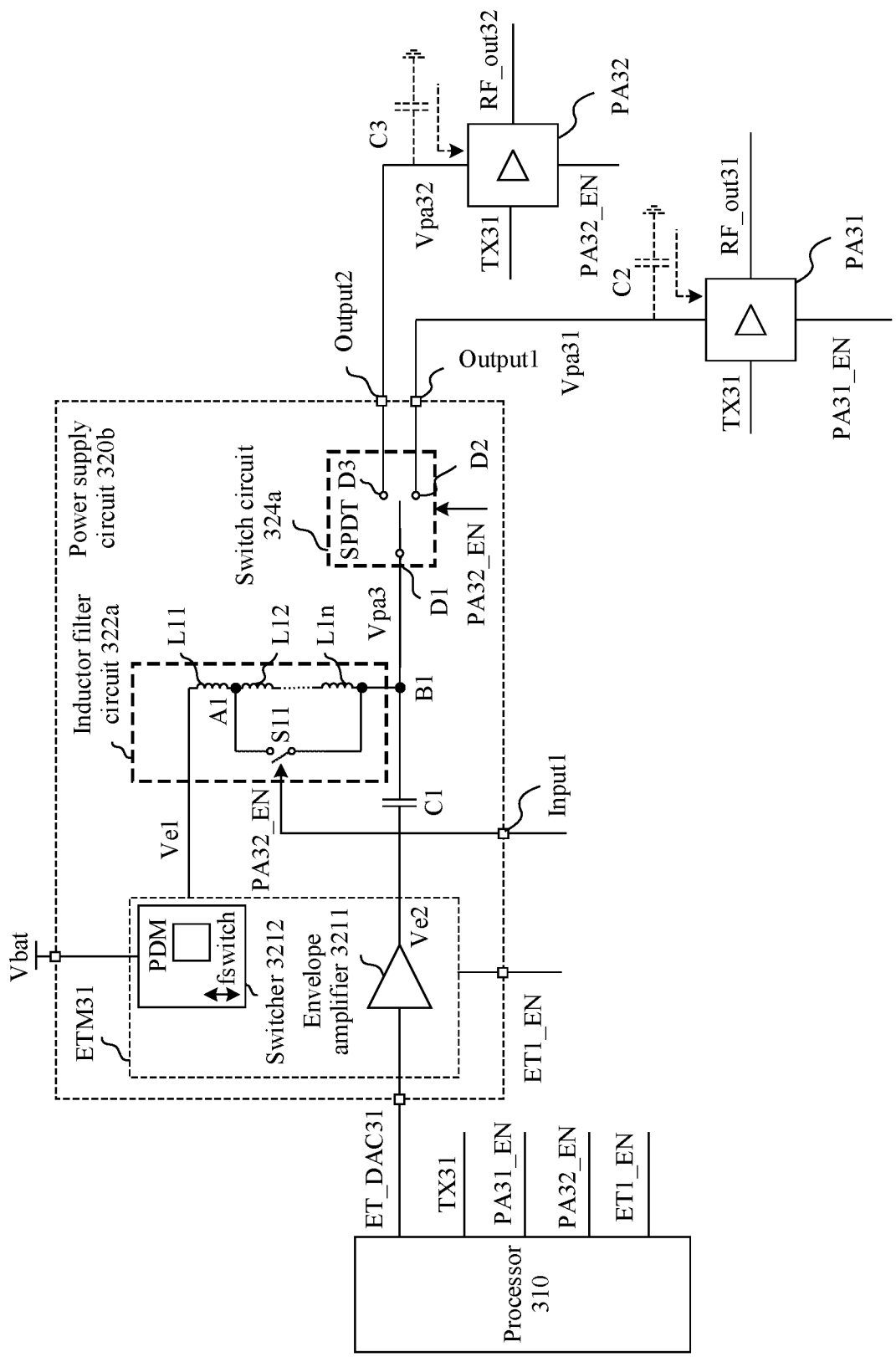
FIG. 10 is a schematic diagram of a structure of a wireless communications system according to an embodiment of this application.

The inductor filter circuit in the power supply circuit 320b is not limited to the structure shown in FIG. 9A. The inductor filter circuit may further have an adjustable inductance value. For example, in another embodiment, as shown in FIG. 10, the inductor filter circuit in the power supply circuit 320b may alternatively be the inductor filter circuit 322a shown in FIG. 8A. A waveform diagram of each signal in FIG. 10 is the same as a waveform diagram of each signal in FIG. 9B, a working manner of the inductor filter circuit 322a in FIG. 10 is the same as a working manner of the inductor filter circuit 322a in FIG. 8A, and a working manner of the switch circuit 324a in FIG. 10 is the same as a working manner of the switch circuit 324a in FIG. 9A. Details are not described herein again. The power supply circuit 320b in FIG. 10 may supply power to the first power amplifier circuit PA31 and the second power amplifier circuit PA32. This can save some space on a PCB. When a transmit signal TX1 has different bandwidths, the inductor filter circuit 322a has different effective inductance values. This can meet indicator requirements of an electronic device in different bandwidth modes. In addition, the switch circuit 324a in the power supply circuit 320b is configured to selectively supply power to the first power amplifier circuit PA31 or the second power amplifier circuit PA32 based on a bandwidth of the transmit signal TX1. This can effectively isolate the first power amplifier circuit PA31 from the second power amplifier circuit PA32, and avoid impact of a parasitic capacitor.

Figure 11A:
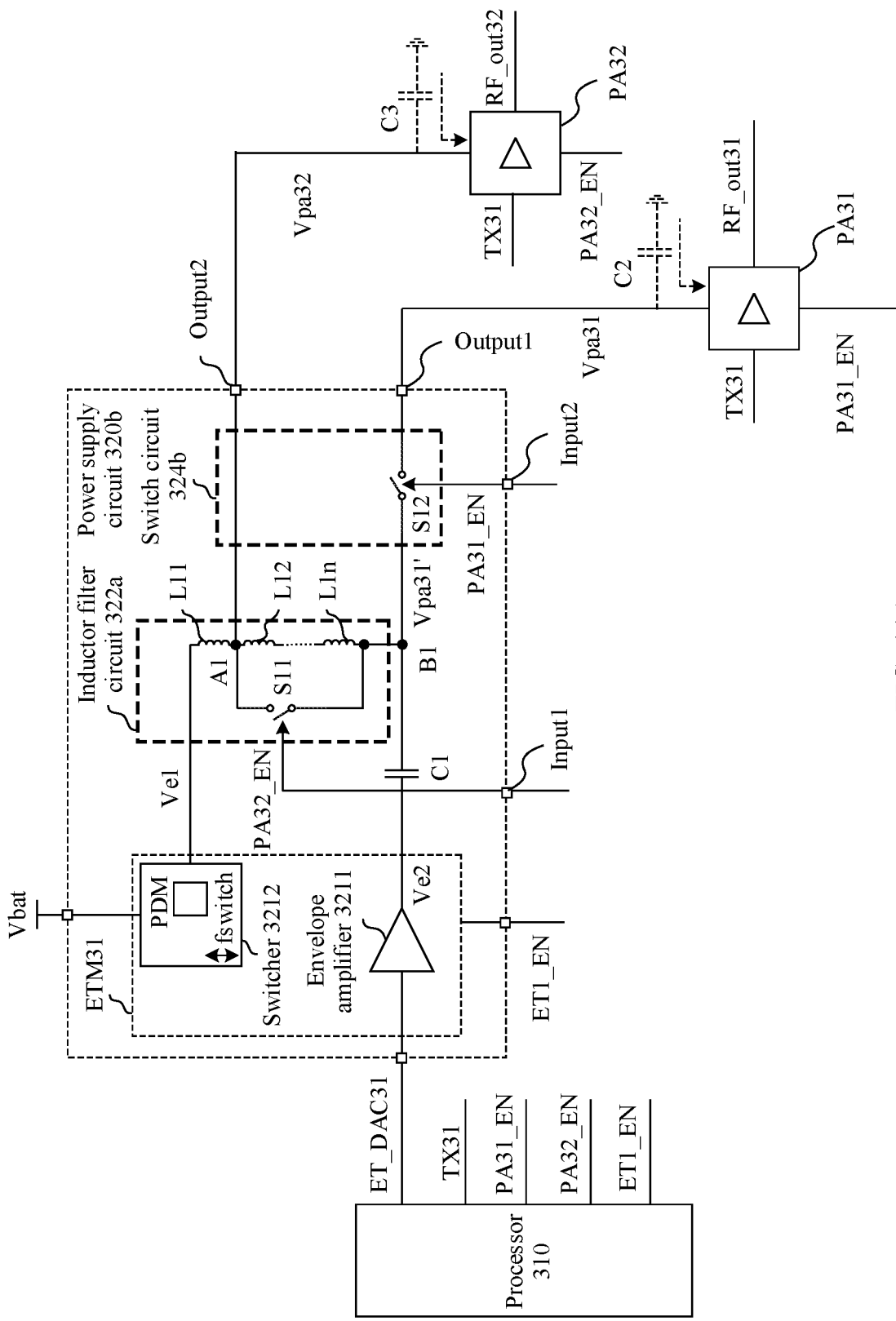
FIG. 11A is a schematic diagram of a structure of a wireless communications system according to an embodiment of this application.

FIG. 11A is a schematic diagram of a wireless communications system having a power supply circuit 320b according to an embodiment. The power supply circuit 320b includes an envelope tracking modulator ETM31, an inductor filter circuit 322a, and a switch circuit 324b. The inductor filter circuit 322a in FIG. 11A is the same as the inductor filter circuit 322a in FIG. 8A. Details are not described herein again. In an implementation, the power supply circuit 320b may further include a capacitor C1, to improve a filtering effect. For example, an output end of an envelope amplifier 3211 is coupled to a first end of the capacitor C1, and a second end of the capacitor C1 is coupled to a second node B1. A voltage of the second node is a power supply voltage Vpa31', and a voltage of a first node is a power supply voltage Vpa32. The power supply voltage Vpa31' and the power supply voltage Vpa32 are two branch voltages of a power supply voltage. The switch circuit 324b includes a switch S12. The switch S12 is coupled between the second node B1 and a first power amplifier circuit PA31, to selectively provide a power supply voltage Vpa31 for the first power amplifier circuit PA31. The switch circuit 324b continuously supplies power from the envelope tracking modulator ETM31 to a second power amplifier circuit PA32, and continuously provides the power supply voltage Vpa32 for the second power amplifier circuit PA32. A first enabling signal PA31_EN is used as a control signal Cs, and is coupled to a control end of the switch S12. In another embodiment, an inverted signal of a second enabling signal PA32_EN may be used as a control signal Cf, to isolate a power supply path of a first bandwidth from a power supply path of a second bandwidth. In still another embodiment, the second enabling signal PA32_EN may alternatively be used as the control signal Cf, and the switch S12 is configured to be turned off when the second enabling signal PA32_EN is valid and be turned on when the second enabling signal PA32_EN is invalid.

Figure 11B:
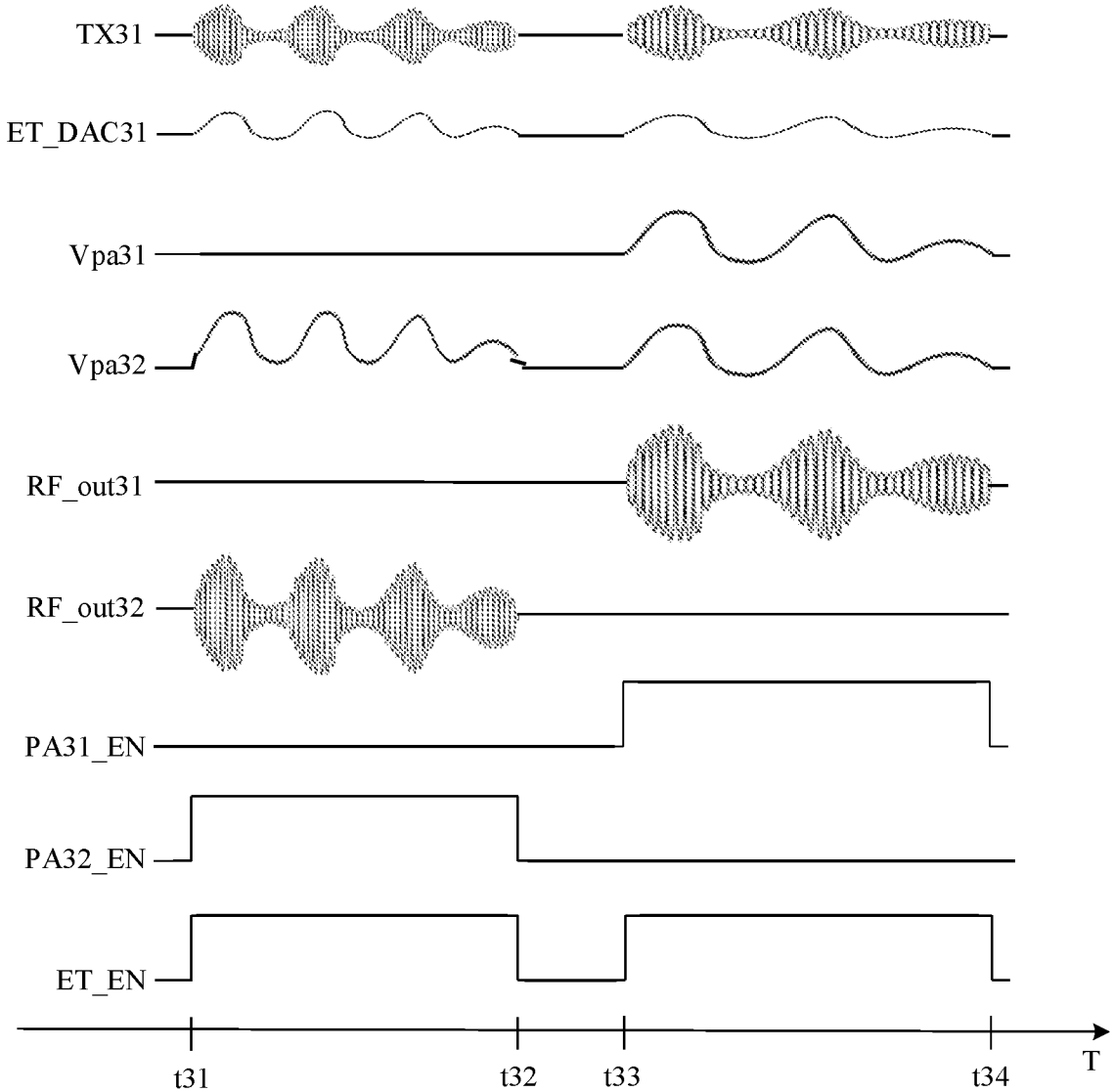
FIG. 11B is a schematic diagram of each signal in a wireless communications system according to an embodiment of this application.

The power supply circuit 320b may supply power to the first power amplifier circuit PA31 and the second power amplifier circuit PA32. This can save some space on a PCB. The power supply circuit 320b has a first output end Output1 and a second output end Output2. The first output end Output1 is configured to provide the power supply voltage Vpa31 for the first power amplifier circuit PA31, and the second output end Output2 is configured to provide the power supply voltage Vpa32 for the second power amplifier circuit PA32. For example, in an implementation, the envelope tracking modulator ETM31, the inductor filter circuit 322a, and the switch circuit 324b are packaged together to form the packaged power supply circuit 320b, and the first output end Output1 and the second output end Output2 are two output terminals or output pins of the packaged power supply circuit 320b. In another implementation, the envelope tracking modulator ETM31 is independently packaged, and the inductor filter circuit 322a and the switch circuit 324b both are independent components. In this case, the first output end Output1 and the second output end Output2 may be two output terminals or output pins of the switch circuit 324b; or the first output end Output1 is an output terminal or an output pin of the switch circuit 324b, and the second output end Output2 is an output pin of the inductor filter circuit 322a. The first power amplifier circuit PA31 has a parasitic capacitor C2, and the second power amplifier circuit PA32 has a parasitic capacitor C3. A capacitance value of the parasitic capacitor C2 is greater than (or even far greater than) a capacitance value of the parasitic capacitor C3. The following describes power supply situations of the power supply circuit 320b at different moments with reference to FIG. 11B, FIG. 11C, and FIG. 11D. FIG. 11B is a schematic diagram of each signal in FIG. 11A. A horizontal coordinate in FIG. 11B is time T.

Figure 11C:
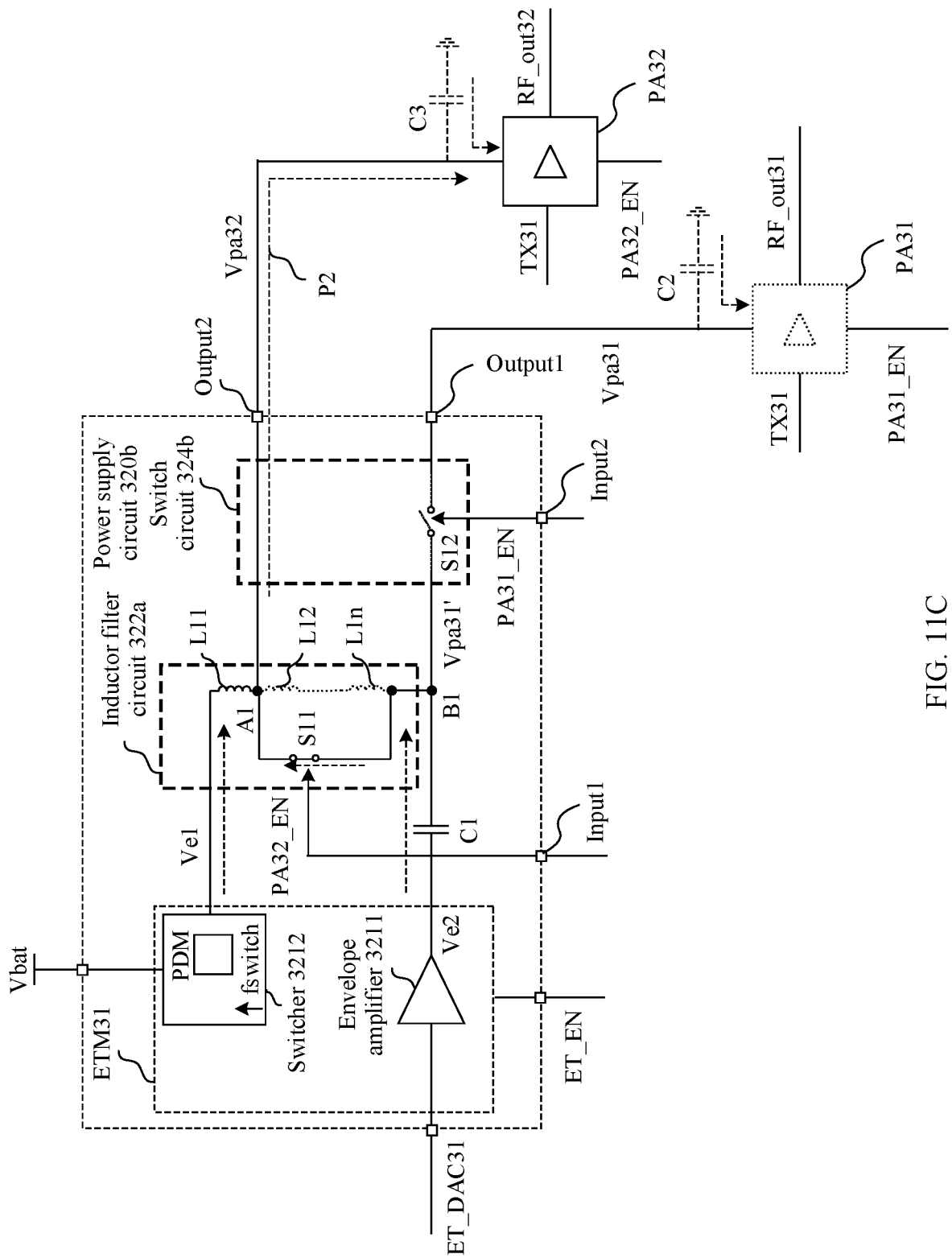
FIG. 11C is a schematic diagram of a wireless communications system in a mode according to an embodiment of this application.

As shown in FIG. 11B, from a moment t31 to a moment t32, a bandwidth of a transmit signal TX31 meets a second bandwidth range, and a switch frequency fswitch is greater than that of the first bandwidth range. An envelope enabling signal ET1_EN is valid, and the envelope enabling signal ET1_EN enables the envelope tracking modulator ETM31. As shown in FIG. 11C, the second enabling signal PA32_EN controls a filter switch S11 to be turned on; an inductor L12 to an inductor L1n are short-circuited; current that is output by the envelope amplifier 3211 flows to the first node A1 through the capacitor C1, the second node B1, and the filter switch S11; current that is output by a switcher 3212 flows to the first node A1 through an inductor L11, and converges, at the first node A1, with the current that is output by the envelope amplifier 3211; and the first node A1 provides the power supply voltage Vpa32 for the second power amplifier circuit PA32. Dashed-line arrows in FIG. 11C represent a power supply path P2 from the envelope tracking modulator ETM31 to the second power amplifier circuit PA32. The second enabling signal PA32_EN enables the second power amplifier circuit PA32, and transmission is performed on a transmit link of a second bandwidth. The second power amplifier circuit PA32 outputs a second amplified output signal RF_out32 based on the transmit signal TX31 and the power supply voltage Vpa32. As shown in FIG. 11B, an amplitude of the power supply voltage Vpa32 is greater than an amplitude of an envelope signal ET_DAC31, a frequency of the second amplified output signal RF_out32 follows a frequency of the transmit signal TX31, and an amplitude of the second amplified output signal RF_out32 is greater than an amplitude of the transmit signal TX31. From the moment t31 to the moment t32, only the inductor L11 is connected to the power supply path P2 from the envelope tracking modulator ETM31 to the second power amplifier circuit PA32. This helps improve efficiency of an electronic device in a second bandwidth mode. The first enabling signal PA31_EN does not enable the first power amplifier circuit PA31, and transmission is not performed on a transmit link of a first bandwidth. In addition, the first enabling signal PA31_EN controls the filter switch Si 1 to be turned off, the switch circuit 324b is configured to disconnect a power supply path from the envelope tracking modulator ETM31 to the first power amplifier circuit PA31, and the parasitic capacitor C2 does not affect the transmit link of the second bandwidth.

Figure 11D:
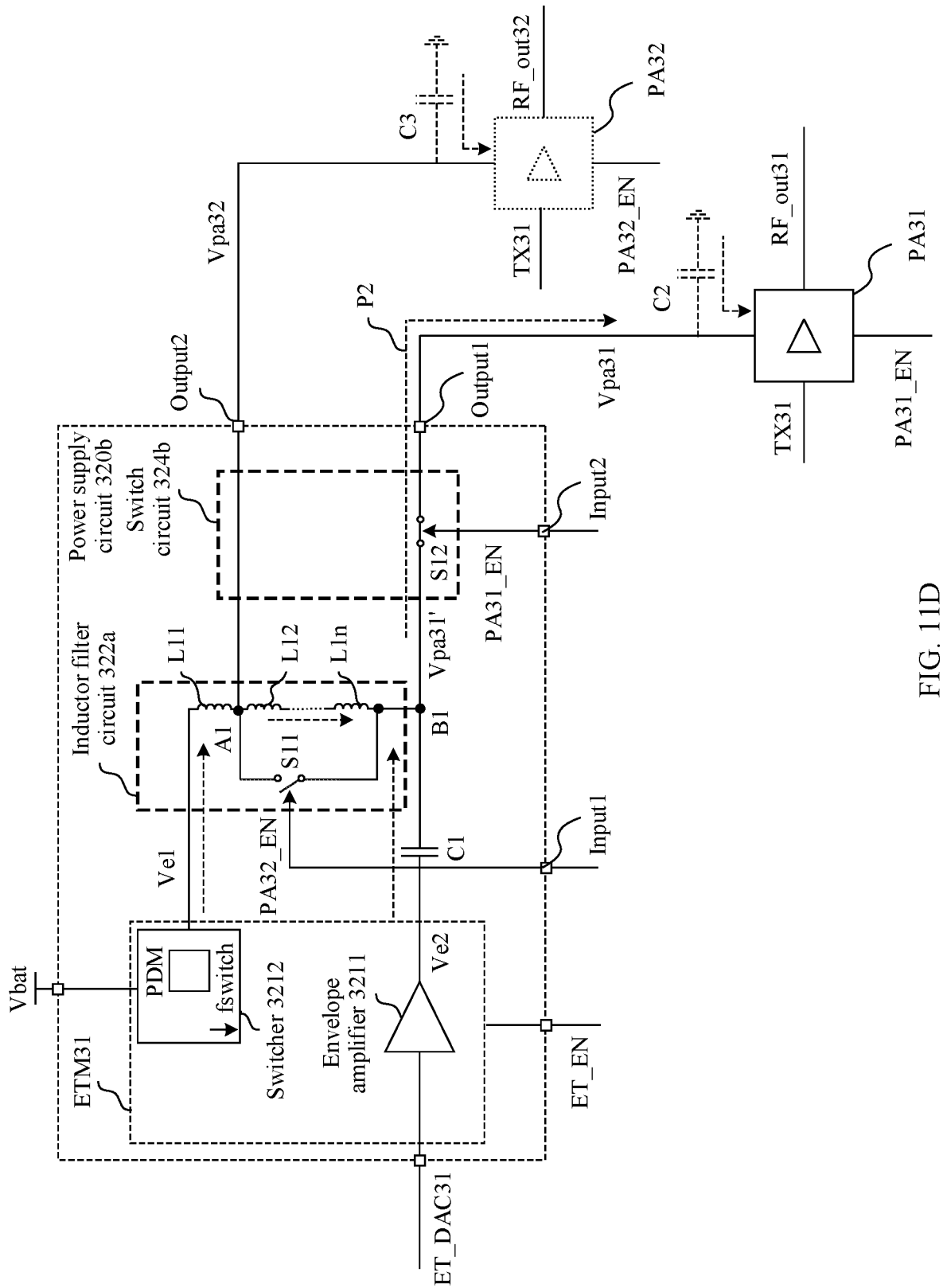
FIG. 11D is a schematic diagram of a wireless communications system in a mode according to an embodiment of this application.

From a moment t33 to a moment t34, the bandwidth of the transmit signal TX31 meets the first bandwidth range, and the switch frequency fswitch is less than that of the second bandwidth range. The envelope enabling signal ET1_EN is valid, and the envelope enabling signal ET1_EN enables the envelope tracking modulator ETM31. As shown in FIG. 11D, the second enabling signal PA32_EN controls the filter switch S11 to be turned off; the inductor L12 to the inductor L1n are connected to a power supply path; current that is output by the envelope amplifier 3211 flows to the second node B1 through the capacitor C1; current that is output by the switcher 3212 flows to the second node B1 through the inductor L11 and the inductor L12 to the inductor L1n, and converges, at the second node B1, with the current that is output by the envelope amplifier 3211; and the second node B1 provides the power supply voltage Vpa32 for the second power amplifier circuit PA32 through the second power supply path P2. Dashed-line arrows in FIG. 11D represent a power supply path P1 from the envelope tracking modulator ETM31 to the second power amplifier circuit PA32. The first enabling signal PA31_EN enables the first power amplifier circuit PA31, and transmission is performed on a transmit link of a first bandwidth. The first power amplifier circuit PA31 outputs a first amplified output signal RF_out31 based on the transmit signal TX31 and the power supply voltage Vpa31. As shown in FIG. 11B, an amplitude of the power supply voltage Vpa31 is greater than an amplitude of the envelope signal ET_DAC31, a frequency of the first amplified output signal RF_out31 follows a frequency of the transmit signal TX31, and an amplitude of the first amplified output signal RF_out31 is greater than an amplitude of the transmit signal TX31. From the moment t33 to the moment t34, the inductor L11 and the inductor L12 to the inductor L1n are simultaneously connected to the power supply path P1 from the envelope tracking modulator ETM31 to the second power amplifier circuit PA32. This helps reduce noise of the power supply voltage Vpa31 in a first bandwidth mode. The second enabling signal PA32_EN does not enable the second power amplifier circuit PA32, and transmission is not performed on a transmit link of a second bandwidth. Although the second power amplifier circuit PA32 is coupled to a power supply input end of the first power amplifier circuit PA31, because the capacitance value of the parasitic capacitor C2 is greater than (or even far greater than) the capacitance value of the parasitic capacitor C3, the parasitic capacitor C3 of the second power amplifier circuit PA32 does not affect the transmit link of the first bandwidth.

In some implementations, the switch S12 is an independent switch component, the inductor filter circuit 322a is an independent component, and the switch S12 and the inductor filter circuit 322a may be packaged together with the envelope tracking modulator ETM31. In another implementation, the switch S12 is an independent switch component, the inductor filter circuit 322a is an independent component, and the packaged envelope tracking modulator ETM31, the switch S12, and the inductor filter circuit 322a are mounted on the circuit board. In still other implementations, the switch S121 and the envelope tracking modulator ETM31 are integrated into an integrated circuit, and the inductor filter circuit 322a is an independent component; or the filter switch S11, the switch S121, and the envelope tracking modulator ETM31 are integrated into an integrated circuit, and the inductor L11 to the inductor L1n are n independent inductor components. The power supply circuit 320a has a second input end Input2 (that is, a control input end), and the second input end Input2 is configured to input the first enabling signal PA31_EN to the power supply circuit 320a.

Figure 12:
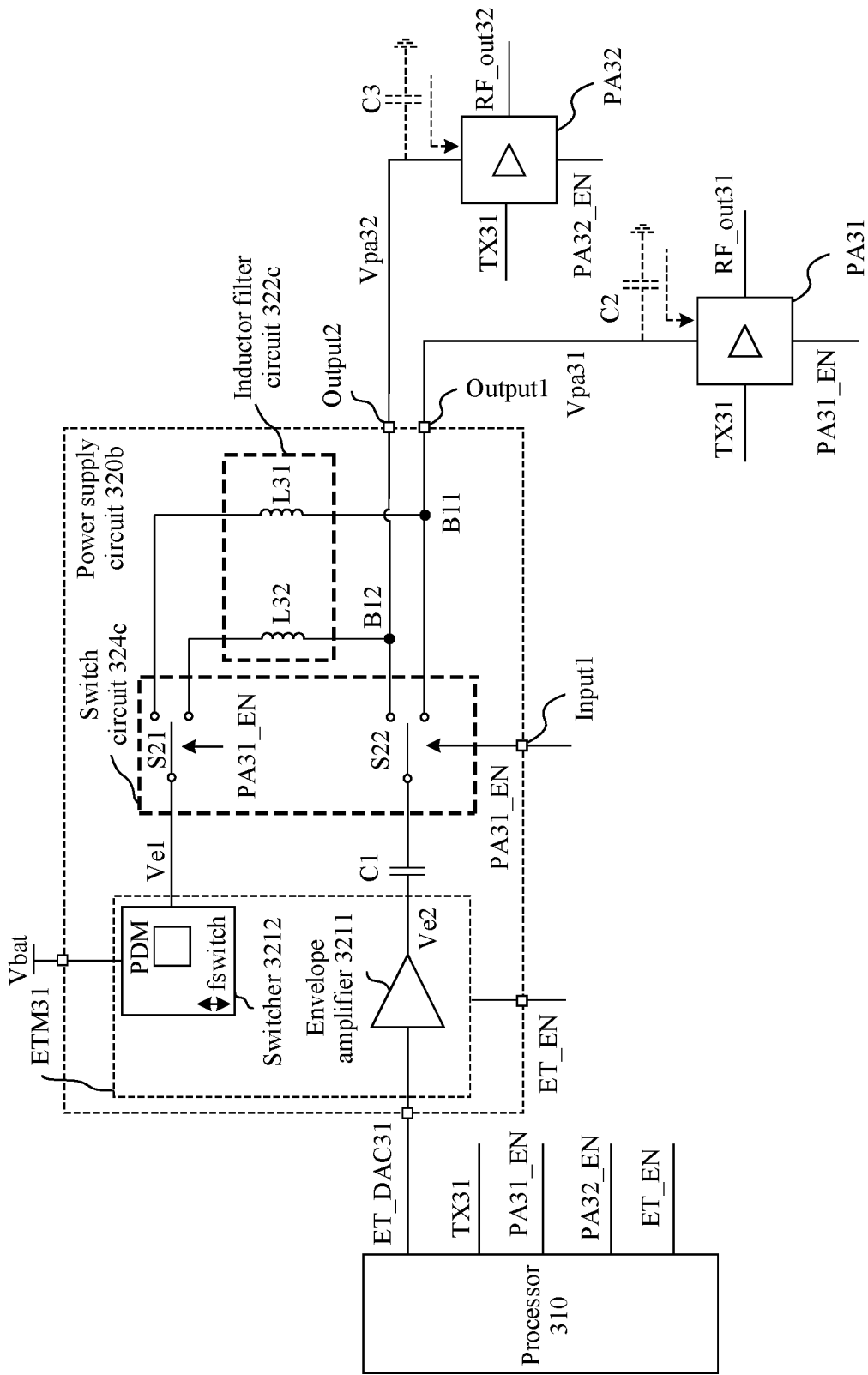
FIG. 12 is a schematic diagram of a structure of a wireless communications system according to an embodiment of this application.

FIG. 12 is a schematic diagram of a power supply circuit 320b according to an embodiment. The power supply circuit 320b includes an envelope tracking modulator ETM31, an inductor filter circuit 322c, and a switch circuit 324c. An envelope amplifier 3211 receives an envelope signal ET_DAC31, and generates an envelope voltage Ve2. A switcher 3212 provides a direct-current envelope voltage Ve1 based on a battery voltage Vbat. The inductor filter circuit 322c includes an inductor L31 and an inductor L32. The inductor L31 is configured to perform filtering on a transmit link of a first bandwidth, and the inductor L32 is configured to perform filtering on a transmit link of a second bandwidth. In an implementation, the inductor L31 has a first inductance value, and the inductor L32 has a second inductance value. A first end of the inductor L31 is coupled to an output end of the switcher 3212, a second end of the inductor L31 is coupled to a third node B11, and the third node B11 is coupled to a first power amplifier circuit PA31 to provide a power supply voltage Vpa31. A first end of the inductor L32 is coupled to the output end of the switcher 3212, a second end of the inductor L32 is coupled to a fourth node B12, and the fourth node B12 is coupled to a second power amplifier circuit PA32 to provide a power supply voltage Vpa32. The third node B11 and the fourth node B12 each are also coupled to an output end of the envelope amplifier 3211 to receive the envelope voltage Ve2. In an implementation, the power supply circuit 320b may further include a capacitor C1, to improve a filtering effect. For example, the output end of the envelope amplifier 3211 is coupled to a first end of the capacitor C1, and a second end of the capacitor C1 is coupled to the third node B11 and the fourth node B12. The switch circuit 324c includes a filter switch S21 and a filter switch S22. The filter switch S21 is configured to selectively connect power supply from the switcher 3212 to the first power amplifier circuit PA31 or the second power amplifier circuit PA32, and the filter switch S22 is configured to selectively connect power supply from the envelope amplifier 321 to the first power amplifier circuit PA31 or the second power amplifier circuit PA32. In FIG. 12, a control end of the filter switch S21 and a control end of the filter switch S22 each may receive a first enabling signal PA31_EN, and the first enabling signal PA31_EN is used as a control signal Cs. In another embodiment, the control end of the filter switch S21 and the control end of the filter switch S22 each may receive a second enabling signal PA32_EN, and the second enabling signal PA32_EN is used as the control signal Cs.

When a bandwidth of a transmit signal TX31 meets a second bandwidth range, the filter switch S21 is configured to connect power supply from the switcher 3212 to the inductor L32 and disconnect power supply to the inductor L31 based on the first enabling signal PA31_EN, and the filter switch S22 is configured to connect power supply from the envelope amplifier 3211 to the fourth node B12 and disconnect power supply to the third node B11 based on the first enabling signal PA31_EN, so that the fourth node B12 provides the power supply voltage Vpa32 for the second power amplifier circuit PA32. When the bandwidth of the transmit signal TX31 meets a first bandwidth range, the filter switch S21 is configured to connect power supply from the switcher 3212 to the inductor L31 and disconnect power supply to the inductor L32 based on the first enabling signal PA31_EN, and the filter switch S22 is configured to connect power supply from the envelope amplifier 3211 to the third node B11 and disconnect power supply to the fourth node B12 based on the first enabling signal PA31_EN, so that the third node B11 provides the power supply voltage Vpa31 for the first power amplifier circuit PA31. The power supply circuit 320b in FIG. 12 may supply power to the first power amplifier circuit PA31 and the second power amplifier circuit PA32. This can save space on a PCB. When a transmit signal TX1 has different bandwidths, the inductor filter circuit 322c has different effective inductance values (the effective inductance value is an inductance value for connection to a current power supply path). This can meet indicator requirements of an electronic device in different bandwidth modes. In addition, the switch circuit 324c in the power supply circuit 320b is configured to selectively supply power to the first power amplifier circuit PA31 or the second power amplifier circuit PA32 based on a bandwidth of the transmit signal TX1. This can effectively isolate the first power amplifier circuit PA31 from the second power amplifier circuit PA32, and avoid impact of a parasitic capacitor.

Figure 13A:
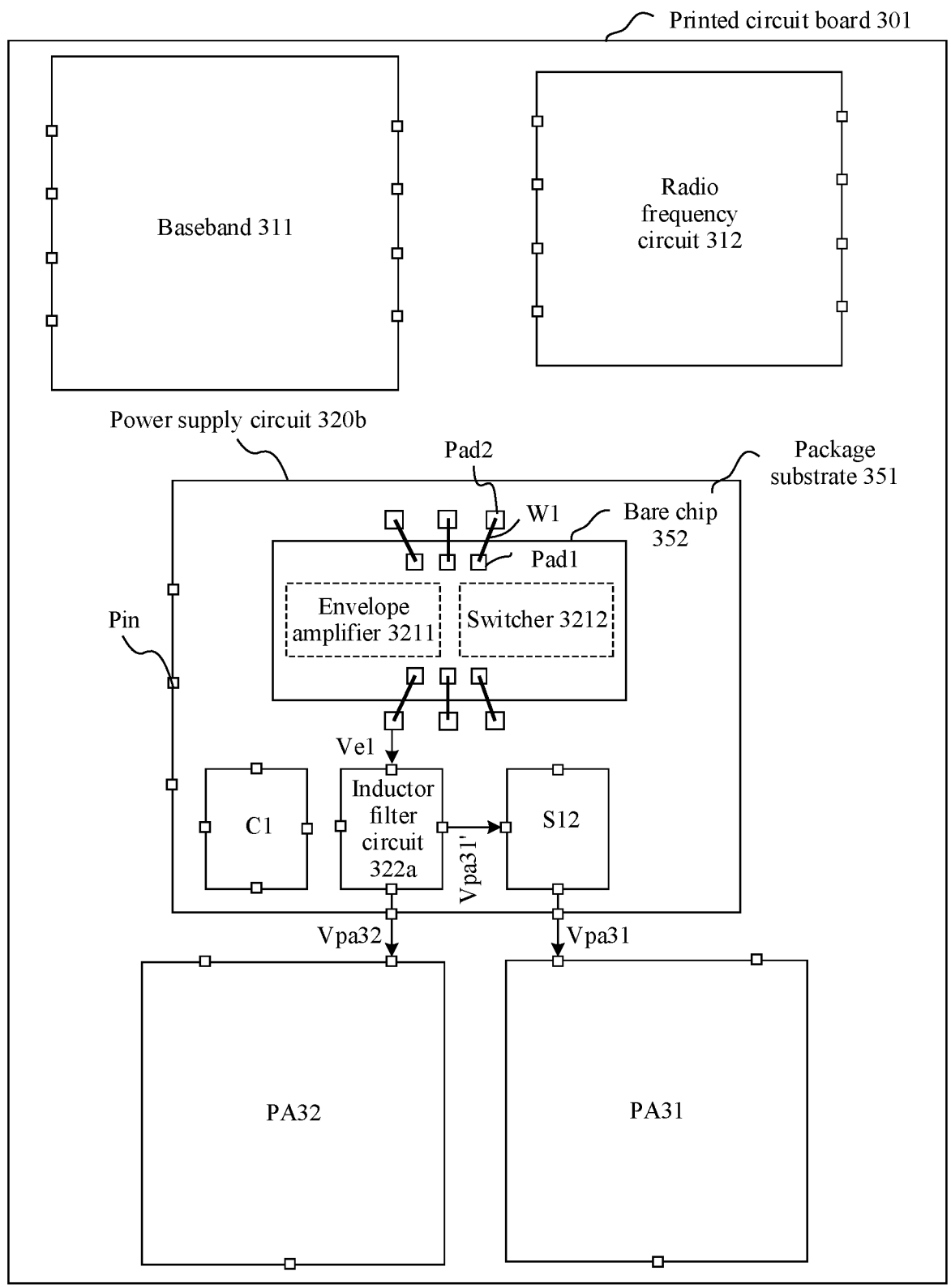
FIG. 13A is a schematic diagram of a structure of a circuit board in a wireless communications system according to an embodiment of this application.
Figure 13B:
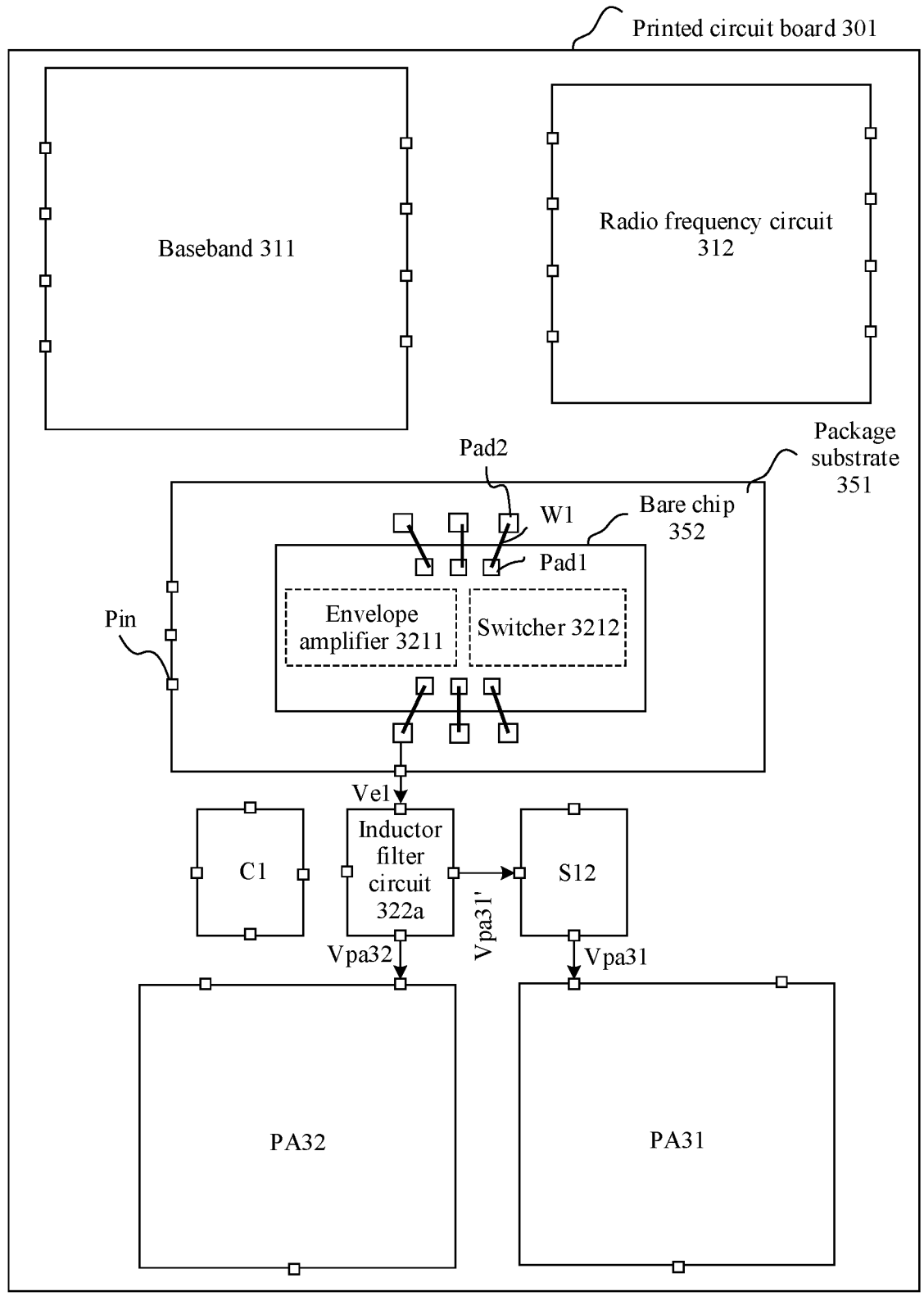
FIG. 13B is a schematic diagram of a structure of a circuit board in a wireless communications system according to an embodiment of this application.

FIG. 13A and FIG. 13B are brief schematic diagrams of two types of circuit packaging of a wireless communications system 300. In FIG. 13A and FIG. 13B, the wireless communications system 300 in FIG. 11A to FIG. 11D is used as an example for description. For clear presentation, in FIG. 13A and FIG. 13B, a line connection between a package substrate 351 and a printed circuit board 301 is omitted, and only a transmit link part is presented. The wireless communications system 300 includes the printed circuit board 301. A packaged baseband 311, a packaged radio frequency circuit 312, a packaged power supply circuit 320b, a packaged first power amplifier circuit PA31, and a packaged second power amplifier circuit PA32 are electrically connected to the printed circuit board 301 by using pins. To meet a frequency bandwidth requirement, in an implementation, the first power amplifier circuit PA31 and the second power amplifier circuit PA32 are mounted near the power supply circuit 320b. The packaged power supply circuit 320b includes the package substrate 351, and a bare chip 352, an inductor filter circuit 322d, a capacitor C1, and a filter switch S12 that are mounted on the package substrate 351. The bare chip 352 includes an envelope tracking modulator. For example, the bare chip 352 includes an envelope amplifier 3212 and a switcher 3211. A solder pad Pad1 on the bare chip 352 is electrically connected to a solder pad Pad2 on the package substrate 351 through a conducting wire W1. In FIG. 13A, the inductor filter circuit 322a, the capacitor C1, and the filter switch S12 are all independent components, and the inductor filter circuit 322a, the capacitor C1, and the filter switch S12 may be mounted on the package substrate 351 in a surface mounting manner. In another implementation, the filter switch S12 may alternatively be integrated into the bare chip 352. In FIG. 13A, the bare chip 352 sends an envelope voltage Ve1 to a first pin of the inductor filter circuit 322a by using one solder pad Pad2, a second pin of the inductor filter circuit 322a sends a power supply voltage Vpa31' to a first pin of the filter switch S12, a second pin of the filter switch S12 sends a power supply voltage Vpa31 to a power supply pin of the first power amplifier circuit PA31 through a first pin of the power supply circuit 320b, and the second pin of the inductor filter circuit 322a sends a power supply voltage Vpa32 to a power supply pin of the second power amplifier circuit PA32 through a second pin of the power supply circuit 320b.

In FIG. 13B, the inductor filter circuit 322a, the capacitor C1, and the filter switch S12 are all independent components, and the inductor filter circuit 322a, the capacitor C1, and the filter switch S12 may be mounted on the printed circuit board 301 in a surface mounting manner, and are electrically connected to the printed circuit board 301 by using pins. In another implementation, the filter switch S12 may alternatively be integrated into the bare chip 352. In FIG. 13B, one pin of the power supply circuit 320b sends the envelope voltage Ve1 to the first pin of the inductor filter circuit 322a, the second pin of the inductor filter circuit 322a sends the power supply voltage Vpa31' to the first pin of the filter switch S12, the second pin of the filter switch S12 sends the power supply voltage Vpa31 to the power supply pin of the first power amplifier circuit PA31, and the second pin of the inductor filter circuit 322a sends the power supply voltage Vpa32 to the power supply pin of the second power amplifier circuit PA32.

The baseband 311, the radio frequency circuit 312, the power supply circuit 320b, the first power amplifier circuit PA31, and the second power amplifier circuit PA32 may form a chipset, so as to process to-be-transmitted data and then transmit processed data through an antenna circuit. The chipset is a group of integrated circuits that work together.

Figure 14A:
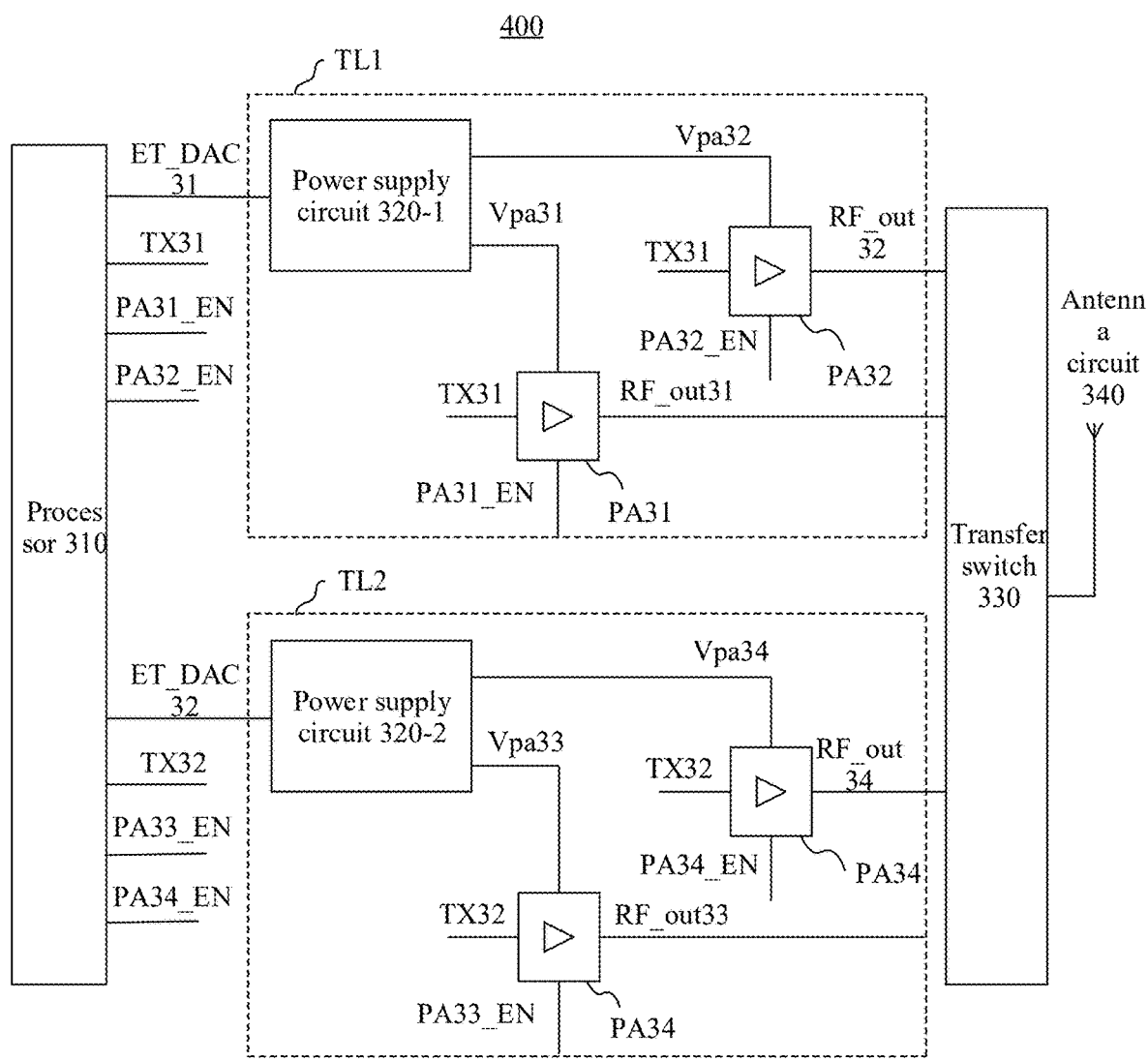
FIG. 14A is a schematic diagram of a structure of a wireless communications system according to an embodiment of this application.

FIG. 14A is a block diagram of a wireless communications system 400 having a plurality of bandwidths. The wireless communications system 400 includes two transmit circuits that are respectively used for a transmit signal TX31 and a transmit signal TX32. The transmit signal TX31 and the transmit signal TX32 are transmit signals on different channels. A power supply circuit 320-1 is located at a transmit circuit TL1 on a first channel, and a power supply circuit 320-2 is located at a transmit circuit TL2 on a second channel. The transmit signal TX31 is a transmit signal on the first channel, and the transmit signal TX32 is a transmit signal on the second channel. Both the transmit signal TX31 and the transmit signal TX32 are radio frequency signals. The wireless communications system 400 includes a processor 310, the transmit circuit TL1, and the transmit circuit TL2. Both the transmit circuit TL1 and the transmit circuit TL2 in FIG. 14A use the implementation of the transmit circuit TL1 shown in FIG. 4. The following describes in detail the wireless communications system 400 in FIG. 14A.

The processor 310 is configured to provide a signal for the transmit circuit TL1 and the transmit circuit TL2. The processor 310 may be configured to: receive to-be-transmitted data, perform processing (which may include encoding, modulation, conversion to analog, or the like) on the data, provide the first transmit signal TX31 and the second transmit signal TX32, provide an analog first envelope signal ET_DAC31, provide an analog second envelope signal ET_DAC32, provide a first enabling signal PA31_EN of a first power amplifier circuit PA31, provide a second enabling signal PA32_EN of a second power amplifier circuit PA32, provide an enabling signal PA33_EN of a third power amplifier circuit PA33, and provide an enabling signal PA34_EN of a fourth power amplifier circuit PA34. The processor 310 in FIG. 14A may use the implementation in FIG. 6. For example, in an embodiment, based on the to-be-transmitted data, the baseband 311 provides a baseband signal used to generate the first transmit signal TX31, a baseband signal used to generate the second transmit signal TX32, the first envelope signal ET_DAC31, the second envelope signal ET_DAC32, the first enabling signal PA31_EN, the second enabling signal PA32_EN, the enabling signal PA33_EN, and the enabling signal PA34_EN; the radio frequency circuit 312 generates the first transmit signal TX31 based on the baseband signal Bs used to generate the first transmit signal TX31; and the radio frequency circuit 312 generates the second transmit signal TX32 based on the baseband signal Bs used to generate the second transmit signal TX32. In another embodiment, the baseband 311 further generates an enabling signal used to enable the power supply circuit 320-1 and the power supply circuit 320-2, and generates an enabling signal used to enable the power supply circuit 320-1 and the power supply circuit 320-2.

The transmit circuit TL1 in FIG. 14A is the same as the transmit circuit in FIG. 4, and the power supply circuit 320-1 in FIG. 14A is the same as the power supply circuit 320 in FIG. 4. Details are not described herein again. The transmit circuit TL2 includes the power supply circuit 320-2, the third power amplifier circuit PA33, and the fourth power amplifier circuit PA34. Based on the second envelope signal ET_DAC32, the power supply circuit 320-2 may be configured to: provide the third power amplifier circuit PA33 with a power supply voltage Vpa33 that varies with an envelope, and provide the fourth power amplifier circuit PA34 with a power supply voltage Vpa34 that varies with an envelope. Either or both of the power supply circuit 320-1 and the power supply circuit 320-2 may use any structure shown in FIG. 7A or FIG. 7B. A structure and a working manner of the third power amplifier circuit PA33 may be the same as those of the first power amplifier circuit PA31, and a structure and a working manner of the fourth power amplifier circuit PA34 may be the same as those of the second power amplifier circuit PA32. The third power amplifier circuit PA33 is configured to: when the enabling signal PA33_EN is valid, amplify output power of the transmit signal TX32 based on the power supply voltage Vpa33, and output a third amplified output signal RF_out33. The fourth power amplifier circuit PA34 is configured to: when the enabling signal PA34_EN is valid, amplify the output power of the transmit signal TX32 based on the power supply voltage Vpa34, and output a fourth amplified output signal RF_out34. The enabling signals PA33_EN and PA34_EN are valid when being configured to be high, or the enabling signals PA33_EN and PA34_EN are valid when being configured to be low. In another embodiment, the transmit circuit TL2 may alternatively not use the implementation of the transmit circuit TL shown in FIG. 4. For example, in another embodiment, the transmit circuit TL2 may alternatively use two power supply circuits to respectively supply power to the third power amplifier circuit PA33 and the fourth power amplifier circuit PA34.

In FIG. 14A, the processor 310 provides the first enabling signal PA31_EN, the second enabling signal PA32_EN, the enabling signal PA33_EN, and the enabling signal PA34_EN, but the wireless communications system 400 is not limited to that shown in FIG. 14A. For example, in another embodiment, the processor 310 may alternatively provide the first enabling signal PA31_EN for the first power amplifier circuit PA31, and provide an inverted signal of the first enabling signal PA31_EN for the second power amplifier circuit PA32, so that the first power amplifier circuit PA31 and the second power amplifier circuit PA32 can be enabled at different moments or in different modes; and the processor 310 may alternatively provide the enabling signal PA33_EN for the third power amplifier circuit PA33, and provide an inverted signal of the enabling signal PA33_EN for the fourth power amplifier circuit PA34, so that the third power amplifier circuit PA33 and the fourth power amplifier circuit PA34 can be enabled at different moments or in different modes. In still another embodiment, the processor 310 may alternatively provide the second enabling signal PA32_EN for the second power amplifier circuit PA32, and provide an inverted signal of the second enabling signal PA32_EN for the first power amplifier circuit PA31, so that the first power amplifier circuit PA31 and the second power amplifier circuit PA32 can be enabled at different moments or in different modes; and the processor 310 may alternatively provide the enabling signal PA34_EN for the fourth power amplifier circuit PA34, and provide an inverted signal of the enabling signal PA34_EN for the third power amplifier circuit PA33, so that the third power amplifier circuit PA33 and the fourth power amplifier circuit PA34 can be enabled at different moments or in different modes.

The wireless communications system 400 may further include a transfer switch 330 and an antenna circuit 340. The transfer switch 330 is coupled to the first power amplifier circuit PA31, the second power amplifier circuit PA32, the third power amplifier circuit PA33, the fourth power amplifier circuit PA34, and the antenna circuit 340. The transfer switch 330 selectively transmits a first amplified output signal Rf_out31 and a second amplified output signal Rf_out32, or the first amplified output signal RF_out31, or the second amplified output signal RF_out32 through the antenna circuit 340.

Figures 1, 14B:
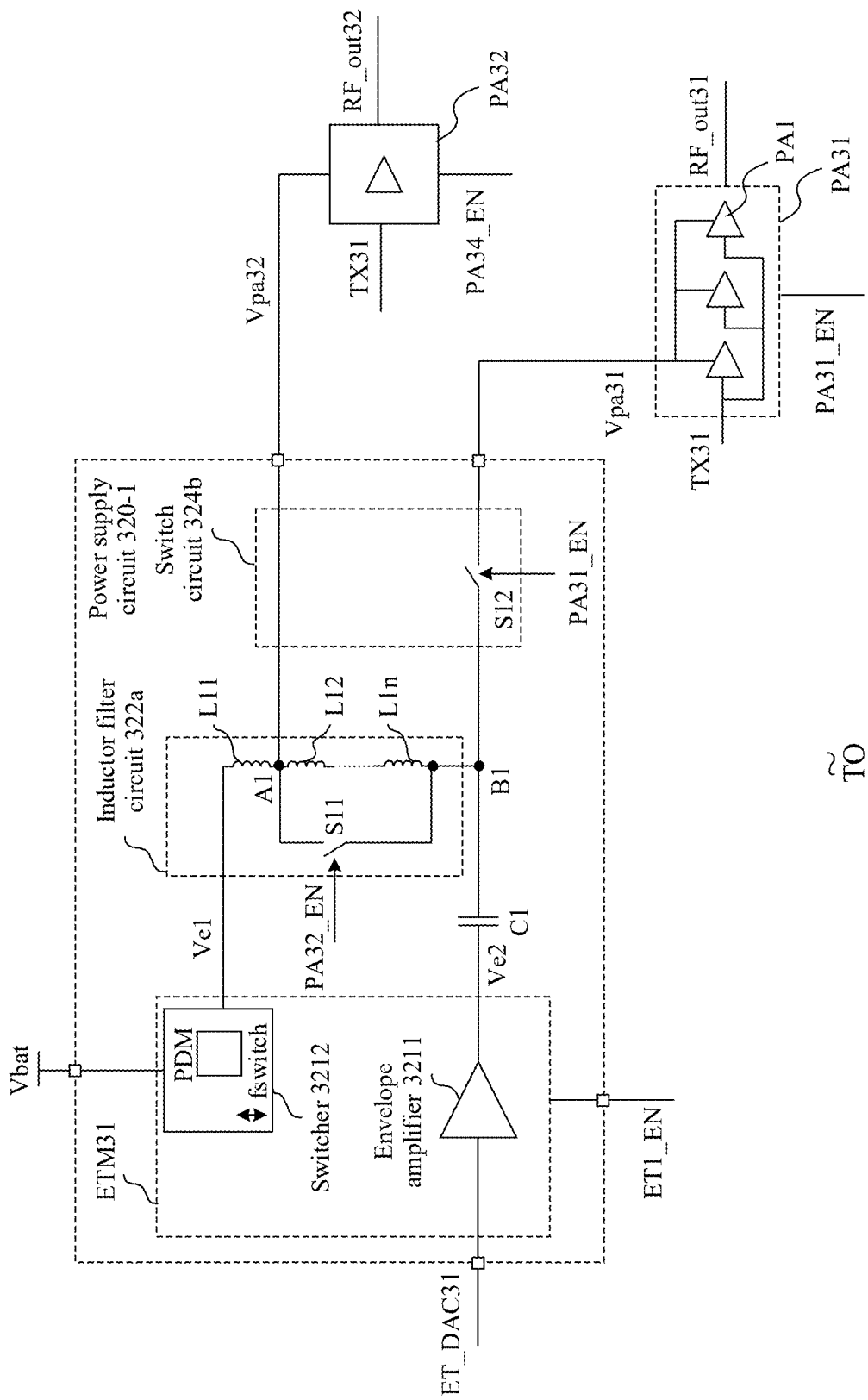

FIG. 14B-1 and FIG. 14B-2 are a schematic diagram of the power supply circuit 320-1 and the power supply circuit 320-2 according to an embodiment. In FIG. 14B-1 and FIG. 14B-2, both the power supply circuit 320-1 and the power supply circuit 320-2 use the implementation of the power supply circuit 320b shown in FIG. 11A. In another embodiment, one of the power supply circuit 320-1 and the power supply circuit 320-2 may use the implementation of the power supply circuit 320b shown in FIG. 11A, and the other may use the implementation of the power supply circuit shown in FIG. 8A and FIG. 8B, FIG. 9A and FIG. 9B, FIG. 10, or FIG. 12. The following describes an electronic device in FIG. 14B-1 and FIG. 14B-2 in detail.

A structure and a working manner of the power supply circuit 320-1 are the same as those of the power supply circuit 320b in FIG. 11A. Details are not described herein again. The power supply circuit 320-2 includes an envelope tracking modulator ETM32, an inductor filter circuit 323, and a switch circuit 325. The envelope tracking modulator ETM32 receives an envelope signal ET_DAC32 and an enabling signal EV2_EN. The enabling signal EV2_EN is used to enable the envelope tracking modulator ETM32. The enabling signal EV2_EN is generated by the processor 310. For example, the enabling signal EV2_EN may be generated by the baseband processor 3112 shown in FIG. 6, or the enabling signal EV2_EN is obtained by performing an AND operation on the enabling signal PA33_EN and the enabling signal PA34_EN. In a non-limiting embodiment, the envelope tracking modulator ETM32 includes an envelope amplifier 3213 and a switcher 3214. The envelope amplifier 3213 is a linear amplifier. The envelope amplifier 3213 receives the envelope signal ET_DAC32, and generates an envelope voltage Ve4. The switcher 3214 provides a direct-current envelope voltage Ve3 based on a battery voltage Vbat. The inductor filter circuit 323 includes a filter switch S41 and n inductors sequentially connected in series: an inductor L41, an inductor L42, . . . , and an inductor L4n, where the n inductors form an n-order reconfigurable filter network, and n is a natural number greater than or equal to 3. A first end of the inductor L41 is coupled to the envelope voltage Ve3, a second end of the inductor L41 is coupled to a fifth node A4, the inductor L42 to the inductor L4n are connected between the fifth node A4 and a sixth node B4 in series, and the filter switch S41 is coupled between the fifth node A4 and the sixth node B4. The enabling signal PA34_EN is coupled to a control end of the filter switch S41 to selectively turn off or turn on the filter switch S41. The sixth node B4 is coupled to the envelope voltage Ve4, the sixth node B4 is coupled to the third power amplifier circuit PA33 to provide the power supply voltage Vpa33, and the fifth node A4 is coupled to the fourth power amplifier circuit PA34 to provide the power supply voltage Vpa34. In an implementation, the power supply circuit 320-2 may further include a capacitor C4, to improve a filtering effect. For example, an output end of the envelope amplifier 3211 is coupled to a first end of the capacitor C4, and a second end of the capacitor C4 is coupled to the sixth node B4.

In a non-limiting embodiment, when the transmit signal TX31 meets a first bandwidth range and a second bandwidth range, both the first amplified output signal RF_out31 and the second amplified output signal RF_out32 are transmitted through a first antenna or a first group of antennas in the antenna circuit 340. In a non-limiting embodiment, when the transmit signal TX32 meets the first bandwidth range and the second bandwidth range, both the third amplified output signal RF_out33 and the fourth amplified output signal RF_out34 are transmitted through a second antenna or a second group of antennas in the antenna circuit 340. The first antenna is different from the second antenna, and the first group of antennas is different from the second group of antennas.

The wireless communications system 400 in FIG. 14A and FIG. 14B-1 and FIG. 14B-2 can implement four transmission scenarios by using only two power supply circuits. Compared with the wireless communications system 200 shown in FIG. 2, this can save two envelope tracking modulators and a peripheral device (for example, a peripheral device such as a capacitor or an inductor). Table 1 shows examples of transmit signal bandwidth modes in different scenarios.

second power amplifier circuit PA32, and the transmit signal TX31 is transmitted on a transmit link of a second bandwidth. The second power amplifier circuit PA32 outputs the second amplified output signal RF_out32 based on the transmit signal TX31 and the power supply voltage Vpa32. A frequency of the second amplified output signal RF_out32 follows a frequency of the transmit signal TX31, and an amplitude of the second amplified output signal RF_out32 is greater than an amplitude of the transmit signal TX31. In the scenario 1, only the inductor L11 is connected to the transmit link of the second bandwidth. This helps improve efficiency of the electronic device in a second bandwidth mode. The first enabling signal PA31_EN does not enable the first power amplifier circuit PA31, and the transmit signal TX31 is not transmitted on a transmit link of a first bandwidth. In addition, the first enabling signal PA31_EN controls the switch S12 to be turned off, the switch circuit 324b is configured to disconnect a power supply path from the envelope tracking modulator ETM31 to the first power amplifier circuit PA31, and a parasitic capacitor of the first power amplifier circuit PA31 does not affect the transmit link of the second bandwidth.

On a transmit link of the transmit signal TX32, the enabling signal EV2_EN is valid, and the enabling signal EV2_EN enables the envelope tracking modulator ETM32. The enabling signal PA34_EN controls the filter switch S41 to be turned off; the inductor L42 to the inductor L4n are short-circuited; current that is output by the envelope amplifier 3213 flows to the fifth node A4 through the capacitor C4, the sixth node B4, and the filter switch S41; current that is

TABLE 1

| Scenario description | | Power amplifier working in the transmit circuit TL1 | Power amplifier working in the transmit circuit TL2 |
| --- | --- | --- | --- |
| Scenario 1 | 5G NR TX-MIMO 5G NR TX-Diversity | PA32 supporting the second bandwidth range | PA34 supporting the second bandwidth range |
| Scenario 2 | 5G NR + 4G EN-DC dual-transmit 5G NR + 4G SUL alternate-transmit | PA32 supporting the second bandwidth range | PA33 supporting the first bandwidth range |
| Scenario 3 | 5G NR + 4G EN-DC dual-transmit 5G NR + 4G SUL alternate-transmit | PA31 supporting the first bandwidth range | PA34 supporting the second bandwidth range |
| Scenario 4 | 4G dual UL | PA31 supporting the first bandwidth range | PA33 supporting the first bandwidth range |

The scenario 1 may be a 5G NR TX-MIMO (multiple-input multiple-output transmission) scenario, or the scenario 1 may be a 5G NR TX-Diversity (diversity transmission) scenario.

On a transmit link of the transmit signal TX31, the enabling signal ET1_EN is valid, and the enabling signal ET1_EN enables the envelope tracking modulator ETM31. The second enabling signal PA32_EN controls the filter switch S11 to be turned on; the inductor L11 to the inductor L1n are short-circuited; current that is output by the envelope amplifier 3211 flows to the first node A1 through the capacitor C1, the second node B1, and the filter switch S12; current that is output by the switcher 3212 flows to the first node A1 through the inductor L11, and converges, at the first node A1, with the current that is output by the envelope amplifier 3211; and the first node A1 provides the power supply voltage Vpa32 for the second power amplifier circuit PA32. The second enabling signal PA32_EN enables the output by the switcher 3214 flows to the fifth node A4 through the inductor L41, and converges, at the fifth node A4, with the current that is output by the envelope amplifier 3213; and the fifth node A4 provides the power supply voltage Vpa34 for the fourth power amplifier circuit PA34. The enabling signal PA34_EN enables the fourth power amplifier circuit PA34, and the transmit signal TX32 is transmitted on a transmit link of a second bandwidth. The fourth power amplifier circuit PA34 outputs the fourth amplified output signal RF_out34 based on the transmit signal TX32 and the power supply voltage Vpa34. A frequency of the fourth amplified output signal RF_out34 follows a frequency of the transmit signal TX32, and an amplitude of the fourth amplified output signal RF_out34 is greater than an amplitude of the transmit signal TX32. In the scenario 1, only the inductor L41 is connected to the transmit link of the second bandwidth. This helps improve efficiency of the electronic device in a second bandwidth mode. The enabling signal PA33_EN does not enable the third power amplifier circuit PA33, and the transmit signal TX32 is not transmitted on a transmit link of a first bandwidth. In addition, the enabling signal PA33_EN controls the switch S42 to be turned off, the switch circuit 325 is configured to disconnect a power supply path from the envelope tracking modulator ETM32 to the third power amplifier circuit PA33, and a parasitic capacitor of the third power amplifier circuit PA33 does not affect the transmit link of the second bandwidth.

The scenario 2 may be a 5G NR+4G EN-DC (EUTRA-NR Dual Connection, EUTRA-NR dual connection) dual-transmit scenario, or the scenario 2 is a 5G NR+4G SUL (Supplementary Uplink, supplementary uplink) alternate-transmit scenario.

States of a transmit link and a power supply path of the transmit signal TX31 in the scenario 2 are the same as those of the transmit link and the power supply path of the transmit signal TX31 in the scenario 1. Details are not described herein again. On a transmit link of the transmit signal TX32, the enabling signal EV2_EN is valid, and the enabling signal EV2_EN enables the envelope tracking modulator ETM32. The enabling signal PA34_EN controls the filter switch S41 to be turned on; the inductor L42 to the inductor L4$n$ are connected to a current power supply path; current that is output by the envelope amplifier 3213 flows to the sixth node B4 through the capacitor C4; current that is output by the switcher 3214 flows to the sixth node B4 through the inductor L41 and the inductor L42 to the inductor L4$n$, and converges, at the sixth node B4, with the current that is output by the envelope amplifier 3213; and the sixth node B4 provides the power supply voltage Vpa34 for the fourth power amplifier circuit PA34 through a second power supply path P22. The enabling signal PA33_EN enables the third power amplifier circuit PA33, and transmission is performed on a transmit link of a first bandwidth. The third power amplifier circuit PA33 outputs the third amplified output signal RF_out33 based on the transmit signal TX32 and the power supply voltage Vpa33. A frequency of the third amplified output signal RF_out33 follows a frequency of the transmit signal TX31. In the scenario 2, the inductor L41 and the inductor L42 to the inductor L4$n$ are simultaneously connected to the transmit link of the second bandwidth. This helps reduce noise of the envelope tracking modulator ETM32 in a first bandwidth mode. The enabling signal PA34_EN does not enable the fourth power amplifier circuit PA34, and transmission is not performed on a transmit link of a second bandwidth. Although the fourth power amplifier circuit PA34 is coupled to a power supply input end of the third power amplifier circuit PA33, a parasitic capacitor of the fourth power amplifier circuit PA34 does not affect the transmit link of the first bandwidth.

The scenario 3 may be a 5G NR+4G EN-DC dual-transmit scenario, or the scenario 3 is a 5G NR+4G SUL alternate-transmit scenario.

On a transmit link of the transmit signal TX31, a curve of the envelope signal ET_DAC31 matches an envelope curve of the transmit signal TX31. The enabling signal ET1_EN is valid, and the enabling signal ET1_EN enables the envelope tracking modulator ETM31. The enabling signal PA4_EN controls the filter switch S12 to be turned off; the inductor L11 to the inductor L1$n$ are connected to a current power supply path; current that is output by the envelope amplifier 3211 flows to the second node B1 through the capacitor C1; and current that is output by the switcher 3212 flows to the second node B1 through the inductor L11 and the inductor L11 to the inductor L1$n$, and converges, at the second node B1, with the current that is output by the envelope amplifier 3211. The first enabling signal PA31_EN enables the first power amplifier circuit PA31, and transmission is performed on a transmit link of a first bandwidth. The first power amplifier circuit PA31 outputs the first amplified output signal RF_out31 based on the transmit signal TX31 and the power supply voltage Vpa31. A frequency of the first amplified output signal RF_out31 follows a frequency of the transmit signal TX31, and an amplitude of the first amplified output signal RF_out31 is greater than an amplitude of the transmit signal TX31. In the scenario 3, the inductor L11 and the inductor L11 to the inductor L1$n$ are simultaneously connected to the transmit link of the first bandwidth. This helps reduce noise of the envelope tracking modulator ETM31 in a first bandwidth mode. The second enabling signal PA32_EN does not enable the second power amplifier circuit PA32, and transmission is not performed on a transmit link of a second bandwidth. Although the second power amplifier circuit PA32 is coupled to a power supply input end of the first power amplifier circuit PA31, a parasitic capacitor of the second power amplifier circuit PA32 does not affect the transmit link of the first bandwidth. States of a transmit link and a power supply path of the transmit signal TX32 in the scenario 3 are the same as those of the transmit link and the power supply path of the transmit signal TX32 in the scenario 1. Details are not described herein again.

The scenario 4 may be a 4G dual UL (dual uplink) scenario. States of a transmit link and a power supply path of the transmit signal TX31 in the scenario 4 are the same as those of the transmit link and the power supply path of the transmit signal TX31 in the scenario 3. Details are not described herein again. States of a transmit link and a power supply path of the transmit signal TX32 in the scenario 4 are the same as those of the transmit link and the power supply path of the transmit signal TX32 in the scenario 2. Details are not described herein again.

Therefore, this solution is applicable to a current scenario in which a 4G technology and a 5G technology are used together. An envelope tracking modulator may be shared for transmit signals on a same channel. This can effectively save space on a PCB. When a transmit signal has different bandwidths, an effective inductance value may be configured for an inductor filter circuit. This can meet indicator requirements of an electronic device in different bandwidth modes. In addition, a power supply circuit may selectively supply power to a power amplifier based on a bandwidth of a transmit signal. This can effectively avoid impact of a parasitic capacitor between power amplifiers. In addition to the foregoing scenarios, this solution may be further applied to a Wi-Fi technology and a future 6G technology or a later generation mobile communications technology, to resolve the foregoing problem in the Wi-Fi technology and the future 6G technology or the later generation mobile communications technology.

This application provides a wireless communications system, a wireless communications method, a power supply system, and a terminal device, so that one envelope tracking modulator can supply power to power amplifier circuits that have different bandwidths. This can reduce the quantity of power supply circuits, effectively save space of a printed circuit board, and help reduce costs.

Embodiment 1: A wireless communications system is provided, including: a power supply circuit, configured to: receive an envelope signal, and supply power to a first power amplifier circuit and/or a second power amplifier circuit. The power supply circuit includes an envelope tracking modulator, and the envelope tracking modulator is configured to be coupled to the first power amplifier circuit and the second power amplifier circuit. The first power amplifier circuit is configured to: receive a transmit signal; and when the bandwidth of the transmit signal meets a first bandwidth range, amplify the transmit signal to output a first amplified output signal; and the second power amplifier circuit is configured to: receive the transmit signal; and when the bandwidth of the transmit signal meets a second bandwidth range, amplify the transmit signal to output a second amplified output signal.

Embodiment 2: According to the wireless communications system in Embodiment 1, the power supply circuit supplies power to the first power amplifier circuit in a first power supply mode; and the power supply circuit supplies power to the second power amplifier circuit in a second power supply mode. The first power supply mode and the second power supply mode have different requirements on noise and efficiency.

Embodiment 3: According to the wireless communications system in Embodiment 1 or 2, the envelope tracking modulator is configured to: receive the envelope signal, and output an envelope voltage; and the power supply circuit further includes: an inductor filter circuit, configured to: receive the envelope voltage, and be coupled to the first power amplifier circuit and the second power amplifier circuit.

Embodiment 4: According to the wireless communications system in Embodiment 3, an inductance value of the inductor filter circuit is changeable.

Embodiment 5: According to the wireless communications system in Embodiment 4, when the bandwidth of the transmit signal meets the first bandwidth range, the part of the inductor filter circuit that is coupled between the envelope tracking modulator and the first power amplifier circuit has a first inductance value; and when the bandwidth of the transmit signal meets the second bandwidth range, the part of the inductor filter circuit that is coupled between the envelope tracking modulator and the second power amplifier circuit has a second inductance value. The largest value in the first bandwidth range is less than the smallest value in the second bandwidth range, and the first inductance value is greater than the second inductance value.

Embodiment 6: According to the wireless communications system in Embodiment 4, the inductor filter circuit is configured to change the inductance value based on a signal for enabling the first power amplifier circuit and/or the second power amplifier circuit.

Embodiment 7: According to the wireless communications system in Embodiment 4, the first power amplifier circuit is configured to amplify the transmit signal based on a first enabling signal that is output by a controller, and the second power amplifier circuit is configured to amplify the transmit signal based on a second enabling signal that is output by the controller.

Embodiment 8: According to the wireless communications system in Embodiment 7, the inductor filter circuit is configured to change the inductance value based on the first enabling signal and/or the second enabling signal.

Embodiment 9: According to the wireless communications system in Embodiment 4, the first power amplifier circuit is configured to amplify the transmit signal based on a third enabling signal that is output by a processor, and the second power amplifier circuit is configured to amplify the transmit signal based on an inverted signal of the third enabling signal; or the first power amplifier circuit is configured to amplify the transmit signal based on an inverted signal of a third enabling signal that is output by a processor, and the second power amplifier circuit is configured to amplify the transmit signal based on the third enabling signal.

Embodiment 10: According to the wireless communications system in Embodiment 9, the inductor filter circuit is configured to change the inductance value based on the third enabling signal or the inverted signal of the third enabling signal.

Embodiment 11: According to the wireless communications system in any one of Embodiments 1 to 10, the power supply circuit further includes: a switch circuit. The switch circuit is coupled to the power supply circuit and the first power amplifier circuit, and is configured to: when the bandwidth of the transmit signal meets the second bandwidth range, disable the coupling of the power supply circuit to the first power amplifier circuit; and when the bandwidth of the transmit signal meets the first bandwidth range, enable the coupling of the power supply circuit to the first power amplifier circuit.

Embodiment 12: According to the wireless communications system in Embodiment 11, the switch circuit is configured to enable or disable the coupling between the power supply circuit and the first power amplifier circuit based on the signal for enabling the first power amplifier circuit and/or the second power amplifier circuit.

Embodiment 13: According to the wireless communications system in Embodiment 11, the switch circuit is further configured to: when the bandwidth of the transmit signal meets the second bandwidth range, enable the coupling of the power supply circuit to the second power amplifier circuit; and when the bandwidth of the transmit signal is the first bandwidth range, disable the coupling of the power supply circuit to the second power amplifier circuit.

Embodiment 14: According to the wireless communications system in Embodiment 13, the switch circuit is configured to enable or disable the coupling between the power supply circuit and the second power amplifier circuit based on the signal for enabling the first power amplifier circuit and/or the second power amplifier circuit.

Embodiment 15: According to the wireless communications system in any one of Embodiments 1 to 14, in different time periods, the transmit signal has different bandwidths but has a same channel.

Embodiment 16: According to the wireless communications system in any one of Embodiments 1 to 14, the bandwidth value in the first bandwidth range is less than the bandwidth value in the second bandwidth range, and the bandwidth value in the second bandwidth range is greater than or equal to 20 MHz, 40 MHz, 60 MHz, 100 MHz, or 150 MHz.

Embodiment 17: According to the wireless communications system in any one of Embodiments 1 to 14, the first bandwidth range includes a bandwidth of a frequency band in a 4G technology and a bandwidth of a first part of frequency band in a 5G technology, the second bandwidth range is a bandwidth of a second part of frequency band in the 5G technology, the first part of frequency band includes a frequency band on which a bandwidth in the 5G technology overlaps a bandwidth in the 4G technology, and the second part of frequency band includes a frequency band on which a bandwidth in the 5G technology is greater than a bandwidth in the 4G technology.

Embodiment 18: According to the wireless communications system in any one of Embodiments 1 to 14, the first bandwidth range includes a bandwidth of a 2.4G frequency band in a Wi-Fi technology and a bandwidth of a 5G frequency band in the Wi-Fi technology.

Embodiment 19: According to the wireless communications system in any one of Embodiments 1 to 14, the wireless communications system further includes: an antenna circuit, where the antenna circuit is coupled to the first power amplifier circuit and is configured to transmit the first amplified output signal, and the antenna circuit is further coupled to the second power amplifier circuit and is configured to transmit the second amplified output signal; and a switching circuit, where the switching circuit is coupled to the first power amplifier circuit, the second power amplifier, and the antenna circuit, and is configured to: selectively connect the first power amplifier circuit and the antenna circuit, and selectively connect the second power amplifier circuit and the antenna circuit.

Embodiment 20: According to the wireless communications system in any one of Embodiments 1 to 14, the wireless communications apparatus further includes:

another power supply circuit, configured to: receive another envelope signal, and supply power to a third power amplifier circuit and a fourth power amplifier circuit, where the other power supply circuit includes another envelope tracking modulator, and the other envelope tracking modulator is configured to be coupled to the third power amplifier circuit and the fourth power amplifier circuit.

The third power amplifier circuit is configured to: receive another transmit signal; and when the bandwidth of the other transmit signal meets the first bandwidth range, amplify power of the other transmit signal to output a third amplified output signal.

The fourth power amplifier circuit is configured to: receive the other transmit signal; and when the bandwidth of the other transmit signal meets the second bandwidth range, amplify the power of the other transmit signal to output a fourth amplified output signal.

The transmit signal and the other transmit signal are signals on different channels.

Embodiment 21: According to the wireless communications system in any one of Embodiments 1 to 14, the wireless communications system further includes:

a processor, configured to output the transmit signal and the envelope signal.

Embodiment 22: According to the wireless communications system in any one of Embodiments 1 to 14, the wireless communications system is a terminal device, a chip, or a chip group.

Embodiment 23: A wireless communications method is provided. The method is applied to a wireless communications system. The wireless communications system includes an envelope tracking modulator, a first power amplifier circuit, and a second power amplifier circuit. The method includes:

The envelope tracking modulator receives an envelope signal, and follows the envelope signal to provide an envelope voltage.

The first power amplifier circuit receives a transmit signal; and when the bandwidth of the transmit signal meets a first bandwidth range, amplifies power of the transmit signal that is output by a processor, to output a first amplified output signal.

The second power amplifier circuit receives the transmit signal; and when the bandwidth of the transmit signal meets a second bandwidth range, amplifies the power of the transmit signal to output a second amplified output signal.

Embodiment 24: According to the wireless communications method in Embodiment 23, the wireless communications system further includes an adjustment circuit. The method further includes: outputting the envelope voltage through the adjustment circuit, to supply power to the first power amplifier circuit in the first power supply mode; and outputting the envelope voltage through the adjustment circuit, to supply power to the second power amplifier circuit in the second power supply mode. The first power supply mode and the second power supply mode have different requirements on noise and efficiency.

Embodiment 25: According to the wireless communications method in Embodiment 23 or 24, the method further includes:

After performing filtering on the envelope voltage that is output by the envelope tracking modulator, the adjustment circuit supplies power to the first power amplifier circuit and/or the second power amplifier circuit.

Embodiment 26: According to the wireless communications method in Embodiment 25, the adjustment circuit changes an inductance value based on a signal for enabling the first power amplifier and/or the second power amplifier.

Embodiment 27: According to the wireless communications method in Embodiment 25, when the bandwidth of the transmit signal meets the first bandwidth range, the part of the inductor filter circuit that is coupled between the envelope tracking modulator and the first power amplifier circuit has a first inductance value; and when the bandwidth of the transmit signal meets the second bandwidth range, the part of the inductor filter circuit that is coupled between the envelope tracking modulator and the second power amplifier circuit has a second inductance value. The largest value in the first bandwidth range is less than the smallest value in the second bandwidth range, and the first inductance value is greater than the second inductance value.

Embodiment 28: According to the wireless communications method in any one of Embodiments 22 to 27, the method further includes: selectively enabling the coupling between the envelope tracking modulator and the first power amplifier circuit.

Embodiment 29: According to the wireless communications method in Embodiment 28, the method further includes: selectively enabling the coupling between the envelope tracking modulator and the first power amplifier circuit based on the signal for enabling the first power amplifier and/or the second power amplifier.

Embodiment 29: According to the wireless communications method in Embodiment 28, the method further includes: when the bandwidth of the transmit signal meets the second bandwidth range, enabling the coupling of the power supply circuit to the second power amplifier circuit; and when the bandwidth of the transmit signal is the first bandwidth range, disabling the coupling of the power supply circuit to the second power amplifier circuit.

Embodiment 30: According to the wireless communications system in Embodiment 28, the method further includes: selectively enabling the coupling between the envelope tracking modulator and the second power amplifier circuit based on the signal for enabling the first power amplifier and/or the second power amplifier.

Embodiment 31: According to the wireless communications method in any one of Embodiments 23 to 30, in different time periods, the transmit signal has different bandwidths but has a same channel.

Embodiment 32: According to the wireless communications method in any one of Embodiments 23 to 30, the bandwidth value in the first bandwidth range is less than the bandwidth value in the second bandwidth range, and the bandwidth value in the second bandwidth range is greater than or equal to 20 MHz, 40 MHz, 60 MHz, 100 MHz, or 150 MHz.

Embodiment 33: According to the wireless communications method in any one of Embodiments 23 to 30, the first bandwidth range includes a bandwidth of a frequency band in a 4G technology and a bandwidth of a first part of frequency band in a 5G technology, the second bandwidth range is a bandwidth of a second part of frequency band in the 5G technology, the first part of frequency band includes a frequency band on which a bandwidth in the 5G technology overlaps a bandwidth in the 4G technology, and the second part of frequency band includes a frequency band on which a bandwidth in the 5G technology is greater than a bandwidth in the 4G technology.

Embodiment 34: According to the wireless communications method in any one of Embodiments 23 to 30, the first bandwidth range includes a bandwidth of a 2.4G frequency band in a Wi-Fi technology and a bandwidth of a 5G frequency band in the Wi-Fi technology.

Embodiment 35: According to the wireless communications method in any one of Embodiments 23 to 30, the wireless communications system further includes another envelope tracking modulator, a third power amplifier circuit, and a fourth power amplifier circuit. The method further includes:

The other envelope tracking modulator receives another envelope signal, and follows the other envelope signal to provide another envelope voltage.

The third power amplifier circuit receives a transmit signal; and when a bandwidth of the other transmit signal meets the first bandwidth range, amplifies power of the transmit signal that is output by the processor, to output a third amplified output signal.

The fourth power amplifier circuit receives the other transmit signal; and when the bandwidth of the other transmit signal meets the second bandwidth range, amplifies the power of the other transmit signal to output a second amplified output signal.

Embodiment 36: A power supply system is provided, including: a first output end; a second output end; and an envelope tracking modulator. The envelope tracking modulator is coupled to the first output end and the second output end, and is configured to supply power to the outside based on an envelope signal by using the first output end and the second output end.

Embodiment 37: According to the power supply system in Embodiment 36, power is supplied to the outside by using the first output end in a first power supply mode; and power is supplied to the outside by using the second output end in a second power supply mode. The first power supply mode and the second power supply mode have different requirements on noise and efficiency.

Embodiment 38: According to the power supply system in Embodiment 36 or 37, the power supply system further includes:
an inductor filter circuit, configured to: receive an envelope voltage, and be coupled to the first output end and the second output end.

Embodiment 39: According to the power supply system in Embodiment 38, an inductance value of the inductor filter circuit is changeable.

Embodiment 40: According to the power supply system in Embodiment 39, the power supply system further includes:
a control input end, configured to input a control signal, where the control input end is coupled to the inductor filter circuit, and the inductor filter circuit changes the inductance value based on the control signal.

Embodiment 41: According to the power supply system in any one of Embodiments 36 to 40, the power supply system further includes:
a switch circuit, configured to selectively enable the coupling between the envelope tracking modulator and the first output end.

Embodiment 42: According to the power supply system in Embodiment 41, the power supply system further includes:
a control input end, configured to input a control signal.
The switch circuit is coupled to the control input end, and the switch circuit enables or disables the coupling between the envelope tracking modulator and the first output end based on the control signal.

Embodiment 43: According to the power supply system in Embodiment 41, the switch circuit is configured to selectively enable the coupling between the envelope tracking modulator and the first output end.

Embodiment 44: A terminal device is provided. The terminal device includes:
a housing and the following components disposed in the housing:
a battery, configured to supply power;
a baseband chip, configured to output a baseband signal and an envelope signal;
a radio frequency circuit, where the radio frequency circuit is coupled to the baseband chip, and is configured to: receive the baseband signal, and output a transmit signal; and
a power supply circuit, where the power supply circuit is coupled to the baseband chip, the radio frequency circuit, and the battery, and is configured to: receive the envelope signal, and supply power to a first power amplifier circuit and/or a second power amplifier circuit, the power supply circuit includes an envelope tracking modulator, and the envelope tracking modulator is configured to be coupled to the first power amplifier circuit and the second power amplifier circuit.

The first power amplifier circuit is configured to: when a bandwidth of the transmit signal meets a first bandwidth range, amplify power of the transmit signal to output a first amplified output signal. The first amplified output signal is transmitted through an antenna circuit.

The second power amplifier circuit is configured to: when the bandwidth of the transmit signal meets a second bandwidth range, amplify the power of the transmit signal to output a second amplified output signal. The second amplified output signal is transmitted through the antenna circuit.

Embodiment 45: According to the terminal device in Embodiment 44, the power supply circuit supplies power to the first power amplifier circuit in a first power supply mode; and the power supply circuit supplies power to the second power amplifier circuit in a second power supply mode. The first power supply mode and the second power supply mode have different requirements on noise and efficiency.

Embodiment 46: According to the terminal device in Embodiment 44 or 46, the envelope tracking modulator is configured to: receive the envelope signal, and output an envelope voltage; and the power supply circuit further includes: an inductor filter circuit, configured to: receive the envelope voltage, and be coupled to the first power amplifier circuit and the second power amplifier circuit.

Embodiment 47: According to the terminal device in Embodiment 46, an inductance value of the inductor filter circuit is changeable.

Embodiment 48: According to the terminal device in Embodiment 47, when the bandwidth of the transmit signal meets the first bandwidth range, the part of the inductor filter circuit that is coupled between the envelope tracking modulator and the first power amplifier circuit has a first inductance value; and when the bandwidth of the transmit signal meets the second bandwidth range, the part of the inductor filter circuit that is coupled between the envelope tracking modulator and the second power amplifier circuit has a second inductance value. The largest value in the first bandwidth range is less than the smallest value in the second bandwidth range, and the first inductance value is greater than the second inductance value.

Embodiment 49: According to the terminal device in Embodiment 47, the inductor filter circuit is configured to change the inductance value based on a signal for enabling the first power amplifier circuit and/or the second power amplifier circuit.

Embodiment 50: According to the terminal device in Embodiment 47, the first power amplifier circuit is configured to amplify the transmit signal based on a first enabling signal that is output by a controller, and the second power amplifier circuit is configured to amplify the transmit signal based on a second enabling signal that is output by the controller.

Embodiment 51: According to the terminal device in Embodiment 50, the inductor filter circuit is configured to change the inductance value based on the first enabling signal and/or the second enabling signal.

Embodiment 52: According to the terminal device in Embodiment 47, the first power amplifier circuit is configured to amplify the transmit signal based on a third enabling signal that is output by a processor, and the second power amplifier circuit is configured to amplify the transmit signal based on an inverted signal of the third enabling signal; or the first power amplifier circuit is configured to amplify the transmit signal based on an inverted signal of a third enabling signal that is output by a processor, and the second power amplifier circuit is configured to amplify the transmit signal based on the third enabling signal.

Embodiment 53: According to the terminal device in Embodiment 52, the inductor filter circuit is configured to change the inductance value based on the third enabling signal or the inverted signal of the third enabling signal.

Embodiment 54: According to the terminal device in any one of Embodiments 44 to 53, the power supply circuit further includes: a switch circuit. The switch circuit is coupled to the power supply circuit and the first power amplifier circuit, and is configured to: when the bandwidth of the transmit signal meets the second bandwidth range, disable the coupling of the power supply circuit to the first power amplifier circuit; and when the bandwidth of the transmit signal meets the first bandwidth range, enable the coupling of the power supply circuit to the first power amplifier circuit.

Embodiment 55: According to the terminal device in Embodiment 54, the switch circuit is configured to enable or disable the coupling between the power supply circuit and the first power amplifier circuit based on the signal for enabling the first power amplifier circuit and/or the second power amplifier circuit.

Embodiment 56: According to the terminal device in Embodiment 54, the switch circuit is further configured to: when the bandwidth of the transmit signal meets the second bandwidth range, enable the coupling of the power supply circuit to the second power amplifier circuit; and when the bandwidth of the transmit signal is the first bandwidth range, disable the coupling of the power supply circuit to the second power amplifier circuit.

Embodiment 57: According to the terminal device in Embodiment 56, the switch circuit is configured to enable or disable the coupling between the power supply circuit and the second power amplifier circuit based on the signal for enabling the first power amplifier circuit and/or the second power amplifier circuit.

Embodiment 58: According to the terminal device in any one of Embodiments 44 to 57, in different time periods, the transmit signal has different bandwidths but has a same channel.

Embodiment 59: According to the terminal device in any one of Embodiments 44 to 57, a bandwidth value in the first bandwidth range is less than a bandwidth value in the second bandwidth range, and the bandwidth value in the second bandwidth range is greater than or equal to 20 MHz, 40 MHz, 60 MHz, 100 MHz, or 150 MHz.

Embodiment 60: According to the terminal device in any one of Embodiments 44 to 57, the first bandwidth range includes a bandwidth of a frequency band in a 4G technology and a bandwidth of a first part of frequency band in a 5G technology, the second bandwidth range is a bandwidth of a second part of frequency band in the 5G technology, the first part of frequency band includes a frequency band on which a bandwidth in the 5G technology overlaps a bandwidth in the 4G technology, and the second part of frequency band includes a frequency band on which a bandwidth in the 5G technology is greater than a bandwidth in the 4G technology.

Embodiment 61: According to the terminal device in any one of Embodiments 44 to 57, the first bandwidth range includes a bandwidth of a 2.4G frequency band in a Wi-Fi technology and a bandwidth of a 5G frequency band in the Wi-Fi technology.

Embodiment 62: According to the terminal device in any one of Embodiments 44 to 57, the terminal device further includes: an antenna circuit, where the antenna circuit is coupled to the first power amplifier circuit and is configured to transmit the first amplified output signal, and the antenna circuit is further coupled to the second power amplifier circuit and is configured to transmit the second amplified output signal; and a switching circuit, where the switching circuit is coupled to the first power amplifier circuit, the second power amplifier, and the antenna circuit, and is configured to: selectively connect the first power amplifier circuit and the antenna circuit, and selectively connect the second power amplifier circuit and the antenna circuit.

Embodiment 63: According to the terminal device in any one of Embodiments 44 to 57, the wireless communications apparatus further includes:

another power supply circuit, configured to: receive another envelope signal, and supply power to a third power amplifier circuit and a fourth power amplifier circuit, where the other power supply circuit includes another envelope tracking modulator, and the other envelope tracking modulator is configured to be coupled to the third power amplifier circuit and the fourth power amplifier circuit.

The third power amplifier circuit is configured to: receive another transmit signal; and when a bandwidth of the other transmit signal meets the first bandwidth range, amplify power of the other transmit signal to output a third amplified output signal.

The fourth power amplifier circuit is configured to: receive the other transmit signal; and when the bandwidth of the other transmit signal meets the second bandwidth range, amplify the power of the other transmit signal to output a fourth amplified output signal.

The transmit signal and the other transmit signal are signals on different channels.

Embodiment 64: According to the terminal device in any one of Embodiments 44 to 57, the terminal device further includes:

a processor, configured to output the transmit signal and the envelope signal.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A wireless communications system, comprising:
a power supply circuit configured to receive an envelope signal and supply power to a first power amplifier circuit and a second power amplifier circuit, wherein
the power supply circuit comprises an envelope tracking modulator coupled to the first power amplifier circuit and the second power amplifier circuit and is configured to receive the envelope signal and output an envelope voltage, and the power supply circuit further comprises an inductor filter circuit coupled to the first power amplifier circuit and the second power amplifier circuit and configured to receive the envelope voltage, wherein
the first power amplifier circuit is configured to receive a transmit signal; and when a bandwidth of the transmit signal meets a first bandwidth range, amplify the transmit signal to output a first amplified output signal; and
the second power amplifier circuit is configured to receive the transmit signal; and when the bandwidth of the transmit signal meets a second bandwidth range, amplify the transmit signal to output a second amplified output signal.

2. The wireless communications system according to claim 1, wherein
the power supply circuit supplies power to the first power amplifier circuit in a first power supply mode; and
the power supply circuit supplies power to the second power amplifier circuit in a second power supply mode, wherein the first power supply mode and the second power supply mode have different requirements on noise and efficiency.

3. The wireless communications system according to claim 1, wherein an inductance value of the inductor filter circuit is changeable.

4. The wireless communications system according to claim 3, wherein when the bandwidth of the transmit signal meets the first bandwidth range, a part of the inductor filter circuit coupled between the envelope tracking modulator and the first power amplifier circuit has a first inductance value; and when the bandwidth of the transmit signal meets the second bandwidth range, a part of the inductor filter circuit coupled between the envelope tracking modulator and the second power amplifier circuit has a second inductance value, wherein a largest value in the first bandwidth range is less than a smallest value in the second bandwidth range, and the first inductance value is greater than the second inductance value.

5. The wireless communications system according to claim 3, wherein the inductor filter circuit is configured to change the inductance value in response to signal.

6. The wireless communications system according to claim 3, wherein the first power amplifier circuit is configured to amplify the transmit signal based on a first enabling signal that is output by a controller, and the second power amplifier circuit is configured to amplify the transmit signal based on a second enabling signal that is output by the controller.

7. The wireless communications system according to claim 6, wherein the inductor filter circuit is configured to change the inductance value based on the first enabling signal or the second enabling signal.

8. The wireless communications system according to claim 3, wherein
the first power amplifier circuit is configured to amplify the transmit signal based on a third enabling signal that is output by a processor, and the second power amplifier circuit is configured to amplify the transmit signal based on an inverted signal of the third enabling signal; or
the first power amplifier circuit is configured to amplify the transmit signal based on an inverted signal of a third enabling signal that is output by the processor, and the second power amplifier circuit is configured to amplify the transmit signal based on the third enabling signal.

9. The wireless communications system according to claim 8, wherein the inductor filter circuit is configured to change the inductance value based on the third enabling signal or the inverted signal of the third enabling signal.

10. The wireless communications system according to claim 1, wherein the power supply circuit further comprises:
a switch circuit, wherein the switch circuit is coupled to the power supply circuit and the first power amplifier circuit, and is configured to:
when the bandwidth of the transmit signal meets the second bandwidth range, decouple the power supply circuit from the first power amplifier circuit; and when the bandwidth of the transmit signal meets the first bandwidth range, couple the power supply circuit to the first power amplifier circuit.

11. The wireless communications system according to claim 10, wherein
the switch circuit is configured to couple or decouple the power supply circuit and the first power amplifier circuit based on an enabling signal.

12. The wireless communications system according to claim 10, wherein the switch circuit is further configured to:
when the bandwidth of the transmit signal meets the second bandwidth range, couple the power supply circuit and the second power amplifier circuit; and
when the bandwidth of the transmit signal meets the first bandwidth range, decouple the power supply circuit from the second power amplifier circuit.

13. The wireless communications system according to claim 12, wherein the switch circuit is configured to couple or decouple the power supply circuit and the second power amplifier circuit based on an enabling signal.

14. The wireless communications system according to claim 1, wherein in different time periods, the transmit signal has different bandwidths but has a same channel.

15. The wireless communications system according to claim 1, wherein a bandwidth value in the first bandwidth range is less than a bandwidth value in the second bandwidth range, and the bandwidth value in the second bandwidth range is greater than or equal to 20 MHz, 40 MHz, 60 MHz, 100 MHz, or 150 MHz.

16. The wireless communications system according to claim 1, wherein the first bandwidth range comprises a frequency band in a 4G technology and a first part of a frequency band in a 5G technology, the second bandwidth range is a second part of the frequency band in the 5G technology, the first part of the frequency band in the 5G technology overlaps the bandwidth in the 4G technology, and the second part of the frequency band in the 5G technology is greater than the bandwidth in the 4G technology.

17. The wireless communications system according to claim 1, wherein the first bandwidth range comprises a bandwidth of a 2.4G frequency band in a Wi-Fi technology and a bandwidth of a 5G frequency band in the Wi-Fi technology.

18. The wireless communications system according to claim 1, further comprising:
    an antenna circuit coupled to the first power amplifier circuit and configured to transmit the first amplified output signal, and further coupled to the second power amplifier circuit and is configured to transmit the second amplified output signal; and
    a switching circuit coupled to the first power amplifier circuit, the second power amplifier, and the antenna circuit, and configured to selectively connect the first power amplifier circuit and the antenna circuit or the second power amplifier circuit and the antenna circuit.

19. The wireless communications system according to claim 1, further comprising:
    another power supply circuit configured to receive another envelope signal and supply power to a third power amplifier circuit and a fourth power amplifier circuit, wherein the other power supply circuit comprises another envelope tracking modulator, and the other envelope tracking modulator is configured to be coupled to the third power amplifier circuit and the fourth power amplifier circuit, wherein
    the third power amplifier circuit is configured to receive another transmit signal; and when a bandwidth of the other transmit signal meets the first bandwidth range, amplify power of the other transmit signal to output a third amplified output signal; and
    the fourth power amplifier circuit is configured to receive the other transmit signal; and when the bandwidth of the other transmit signal meets the second bandwidth range, amplify the power of the other transmit signal to output a fourth amplified output signal, wherein
    the transmit signal and the other transmit signal are signals on different channels.

* * * * *